SOLD TO:

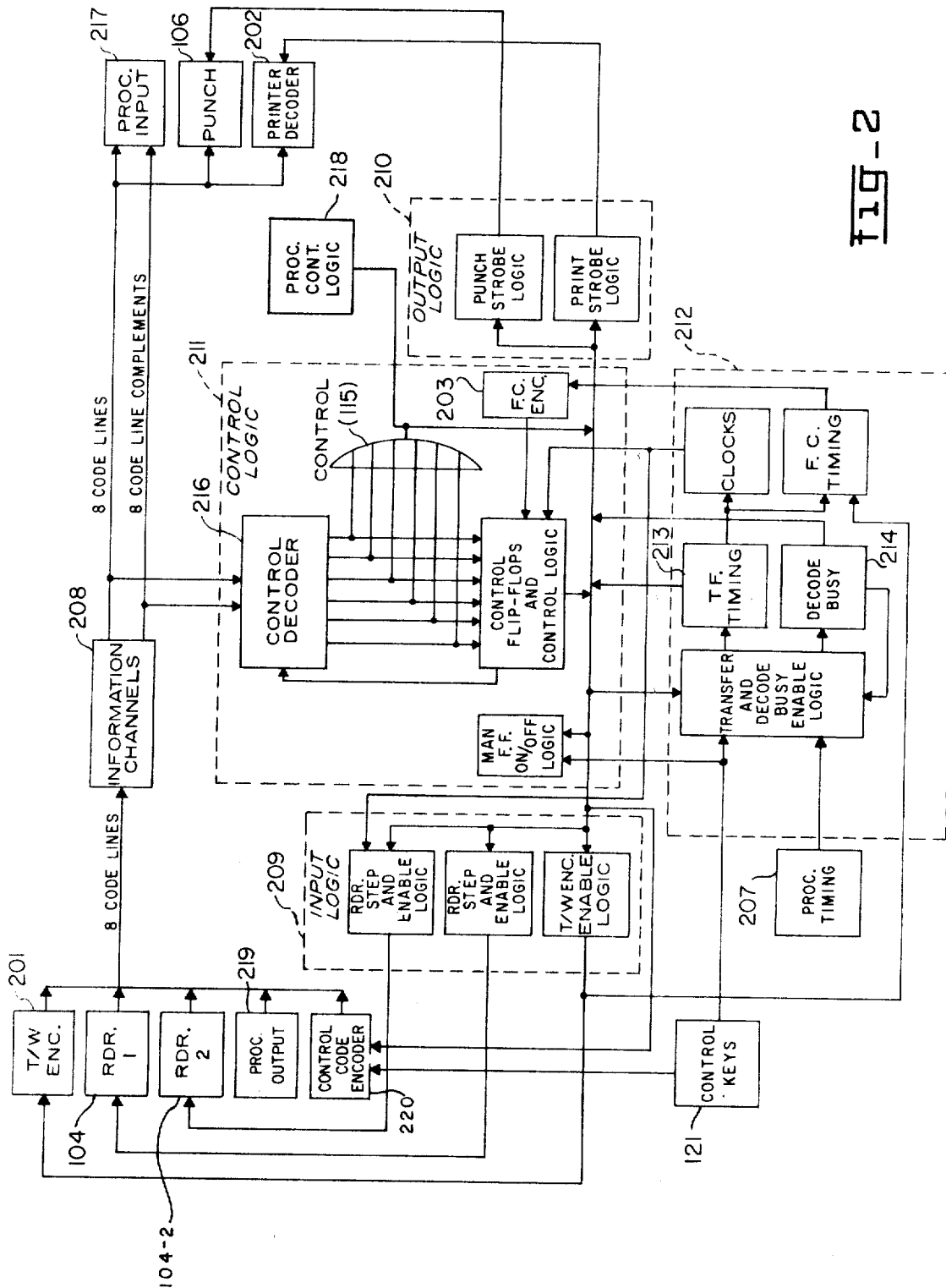

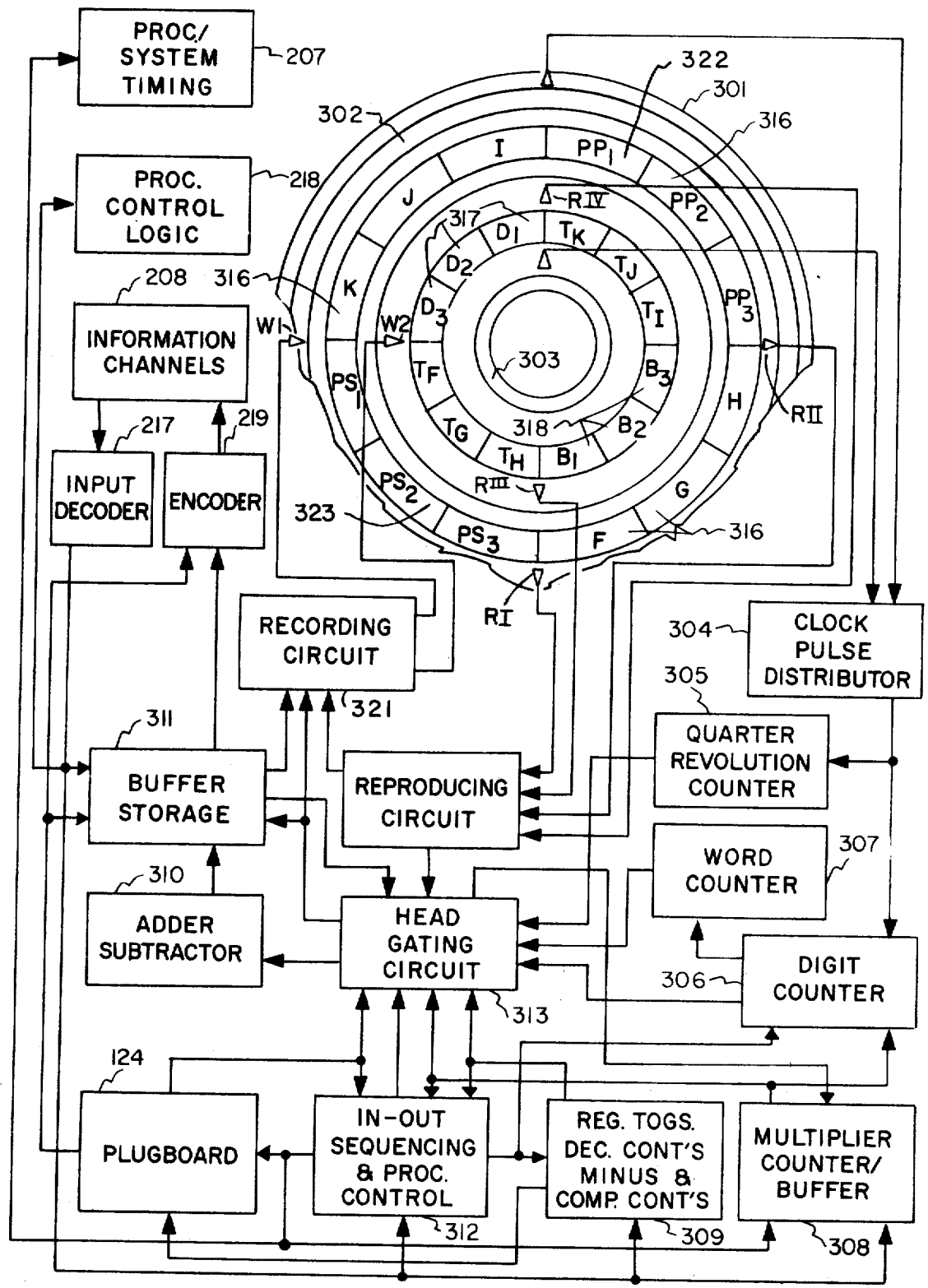
fig_3_

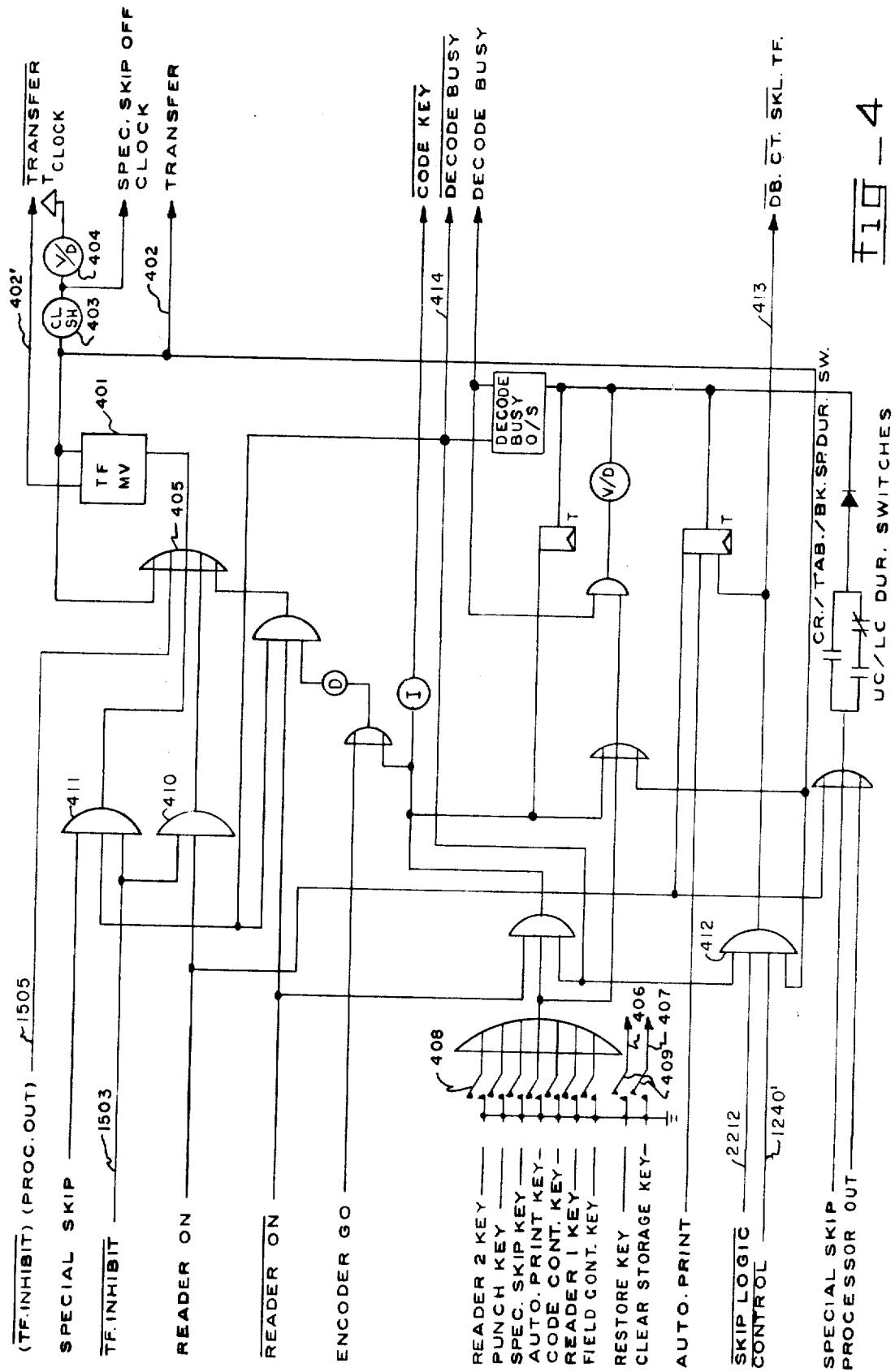

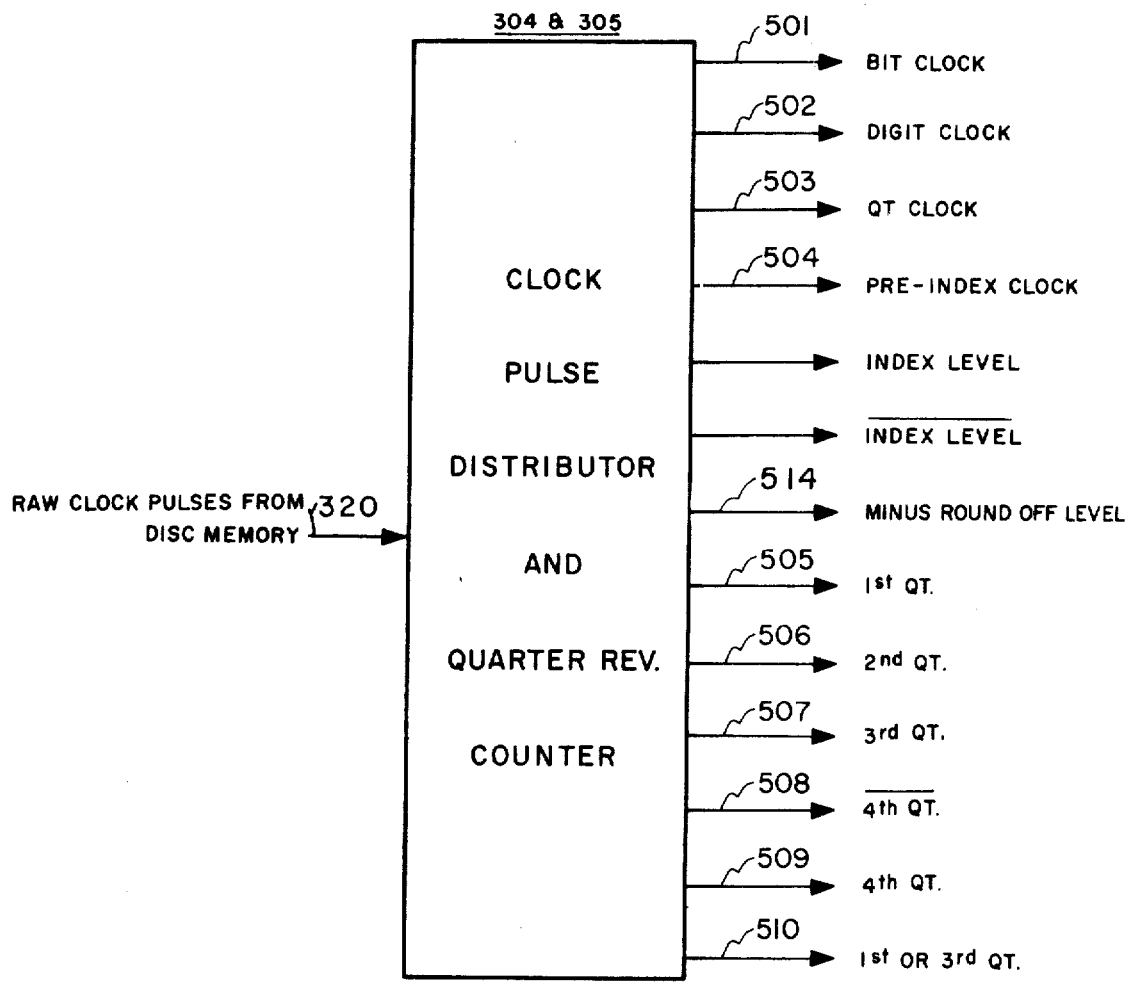
fig_5 (a)
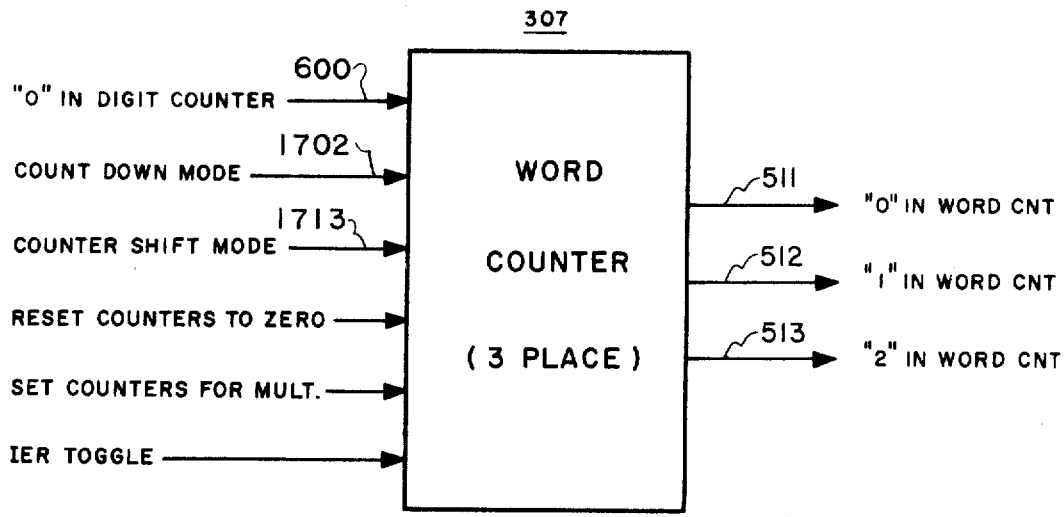
fig_5 (b)

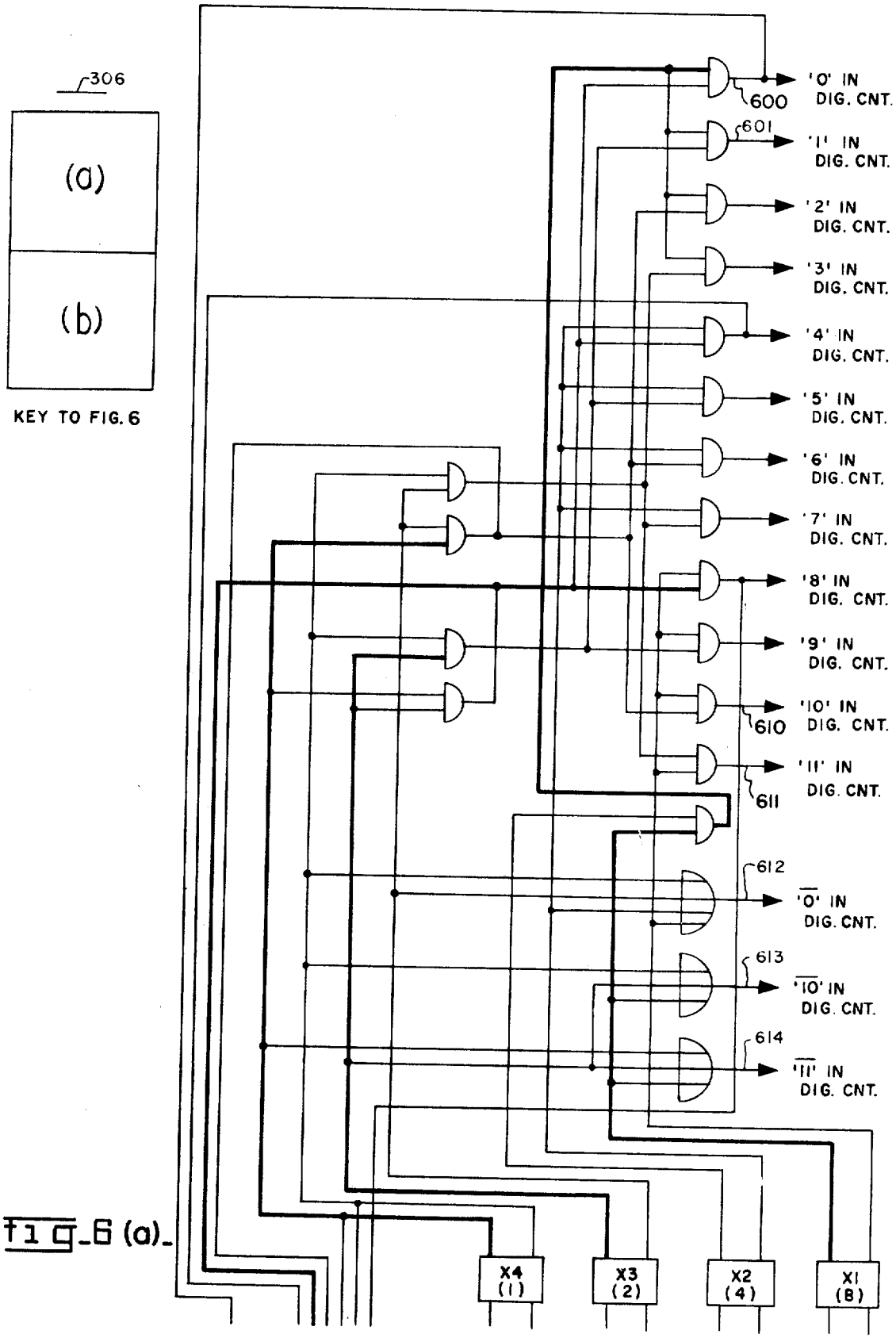
fig_6(a).

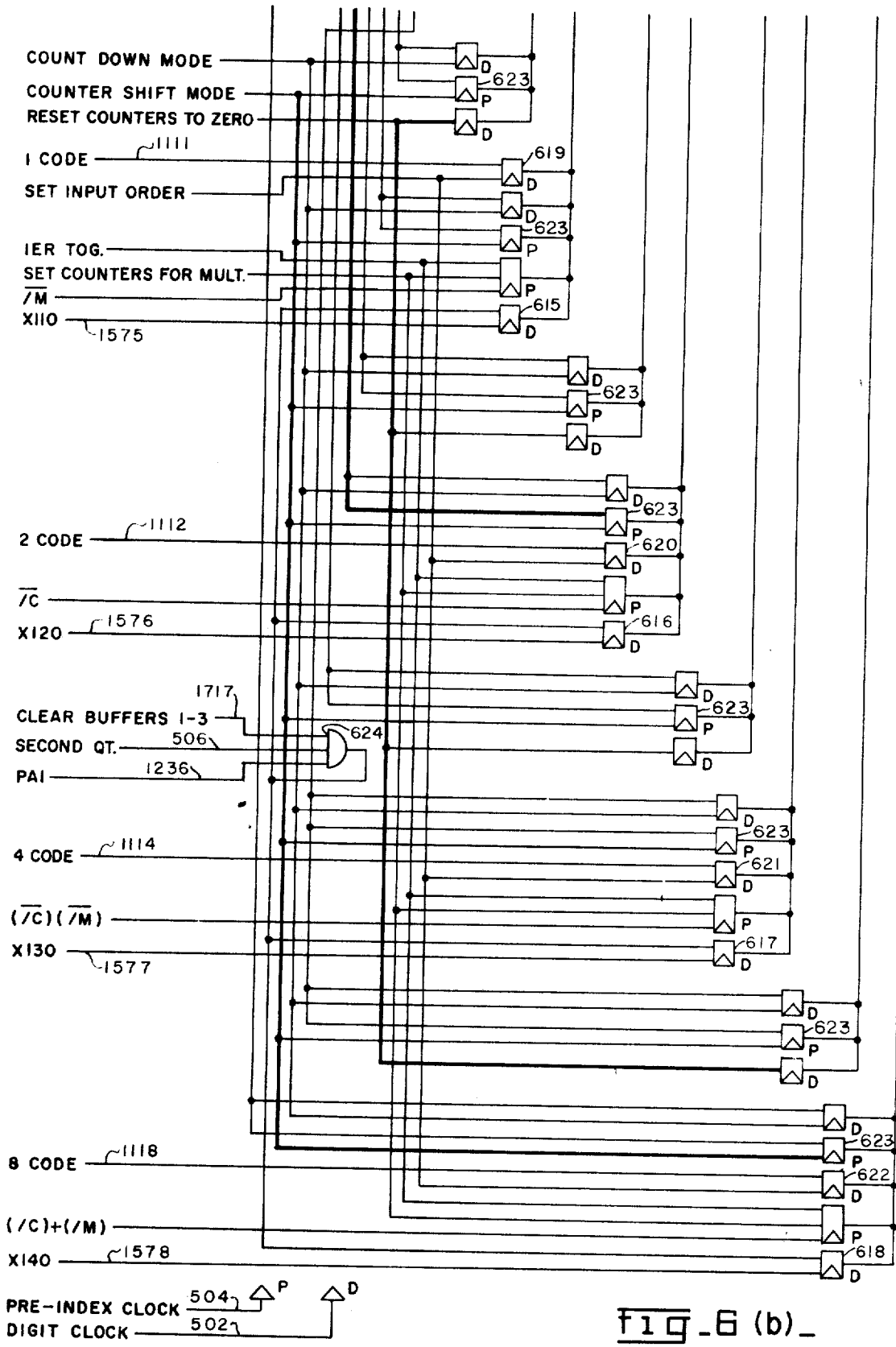
fig_6(b)

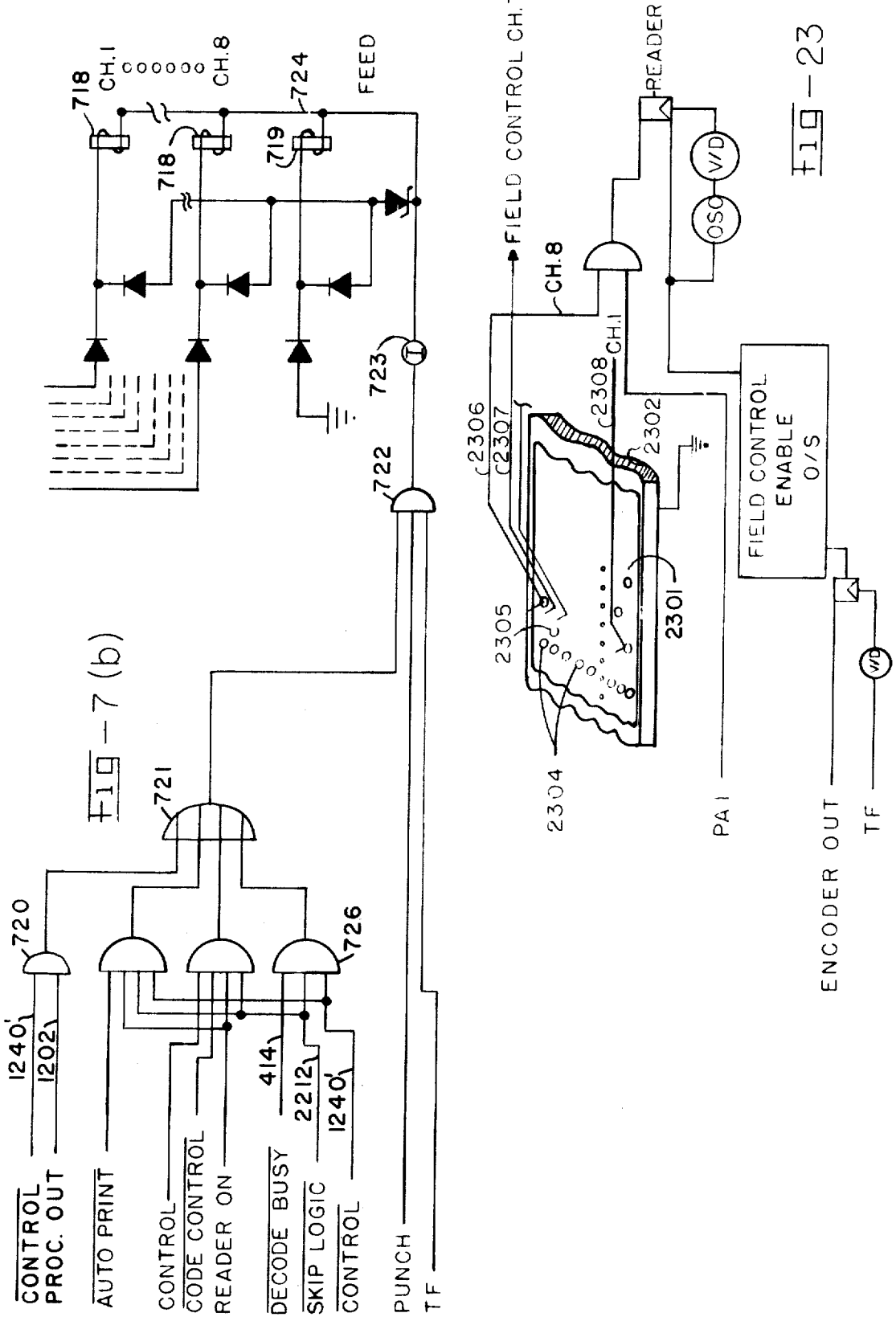

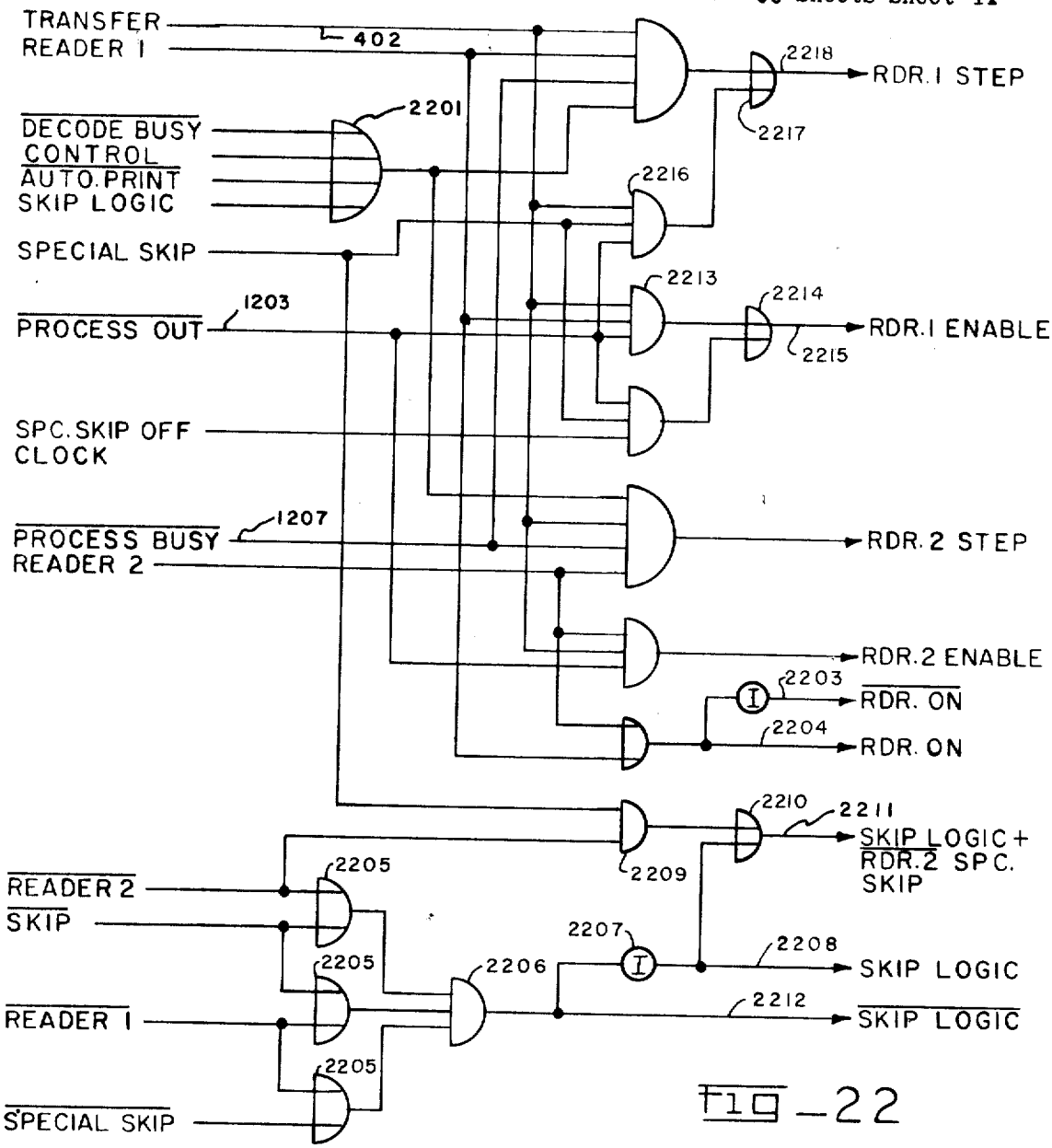
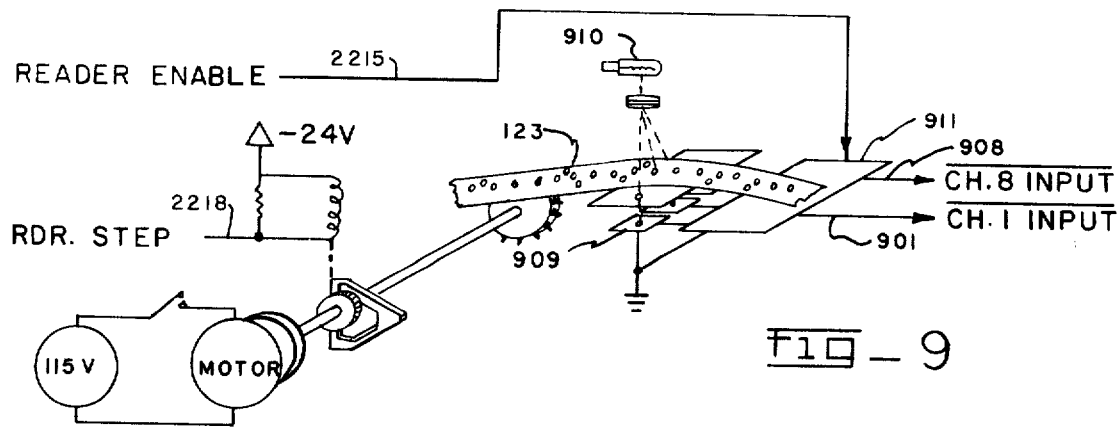

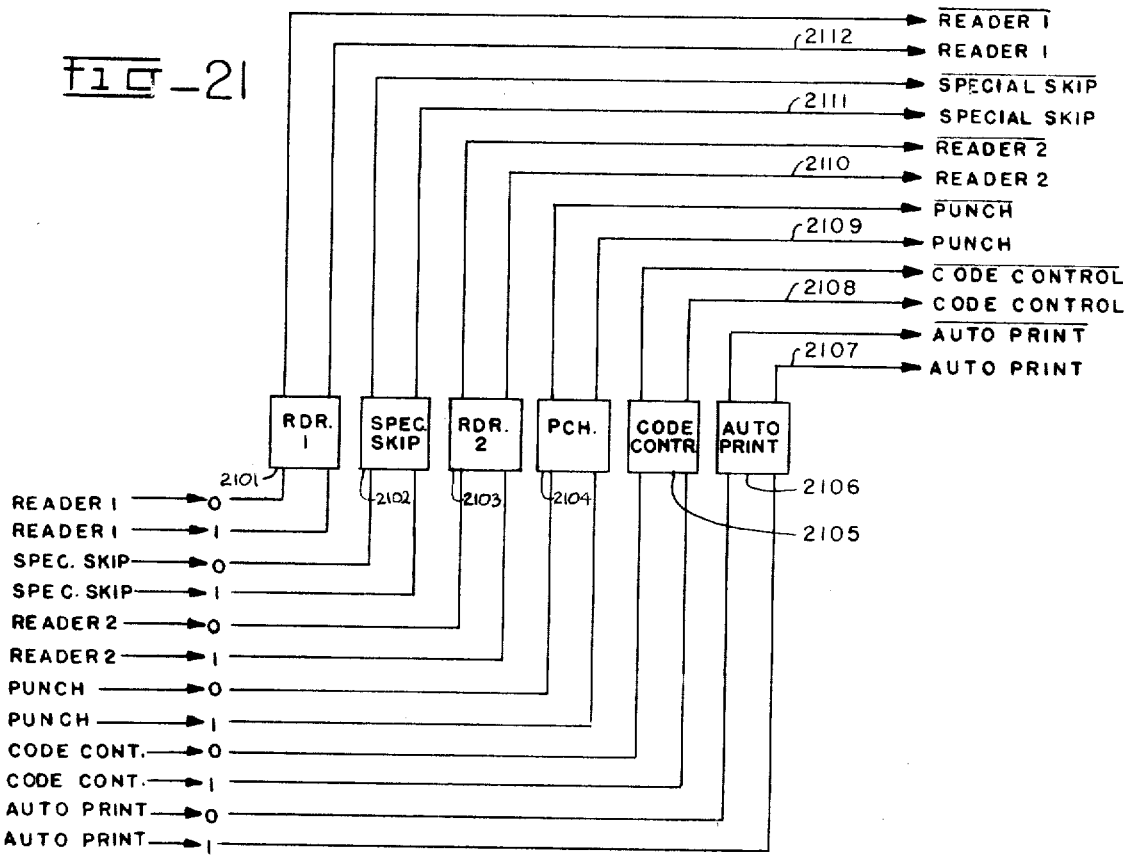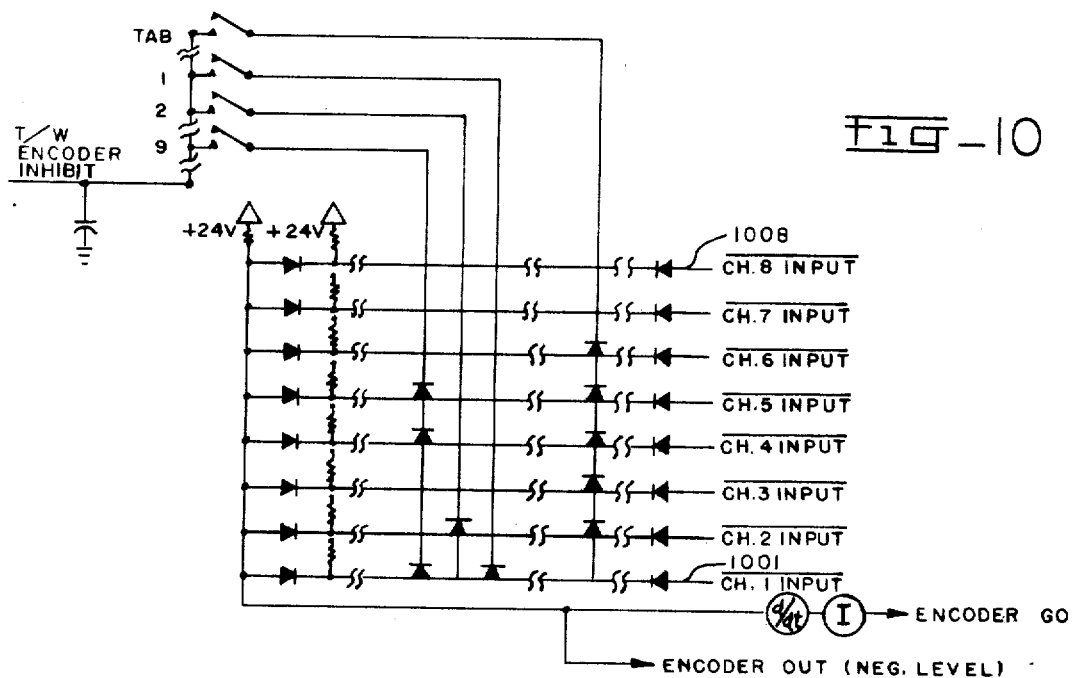

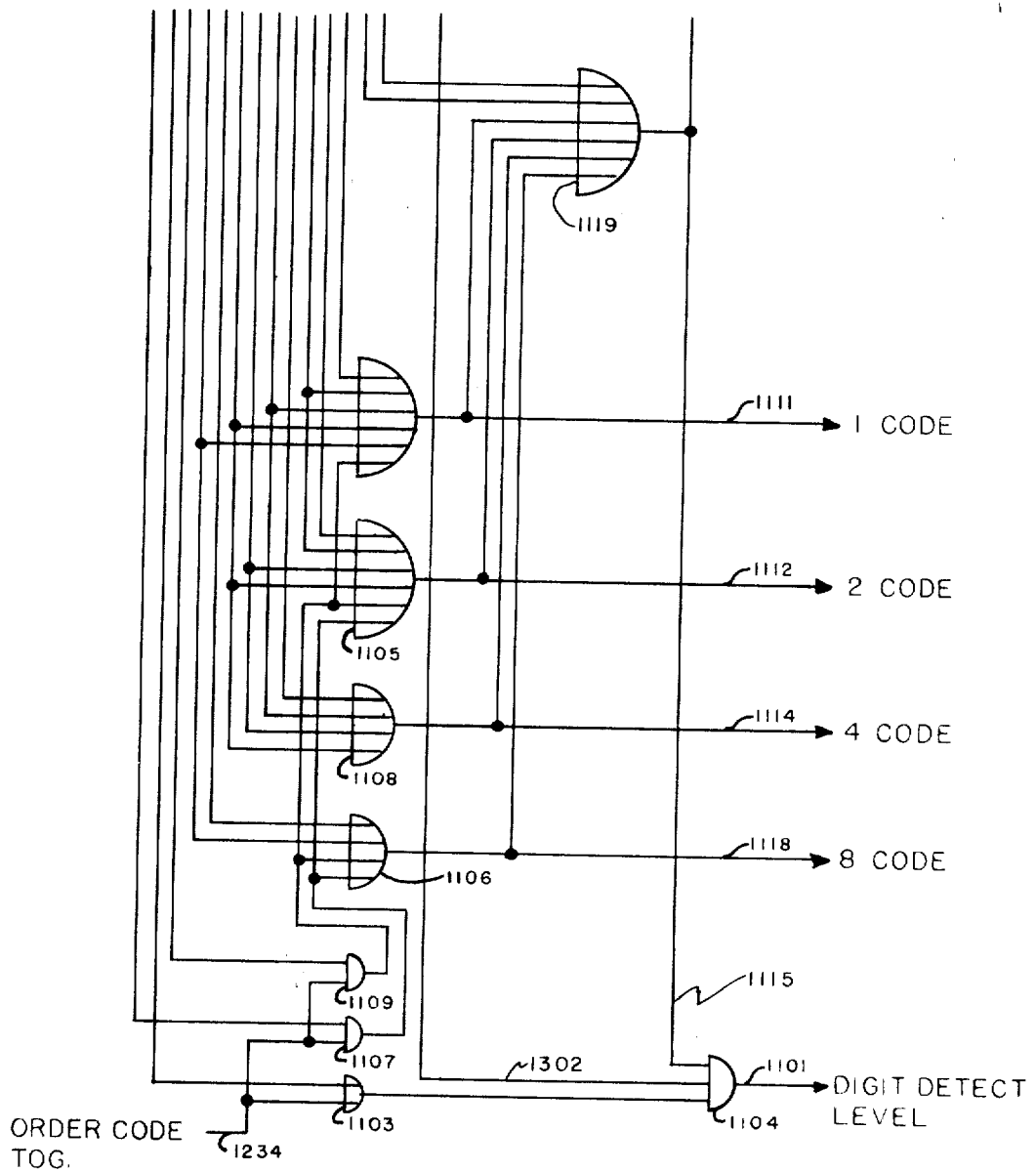
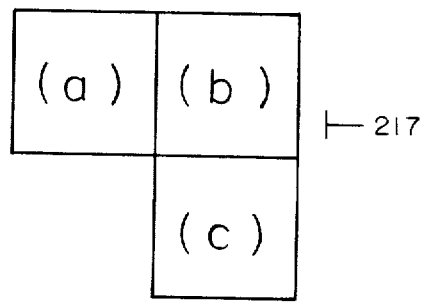
KEY TO FIG. 11
FIG-11(c)

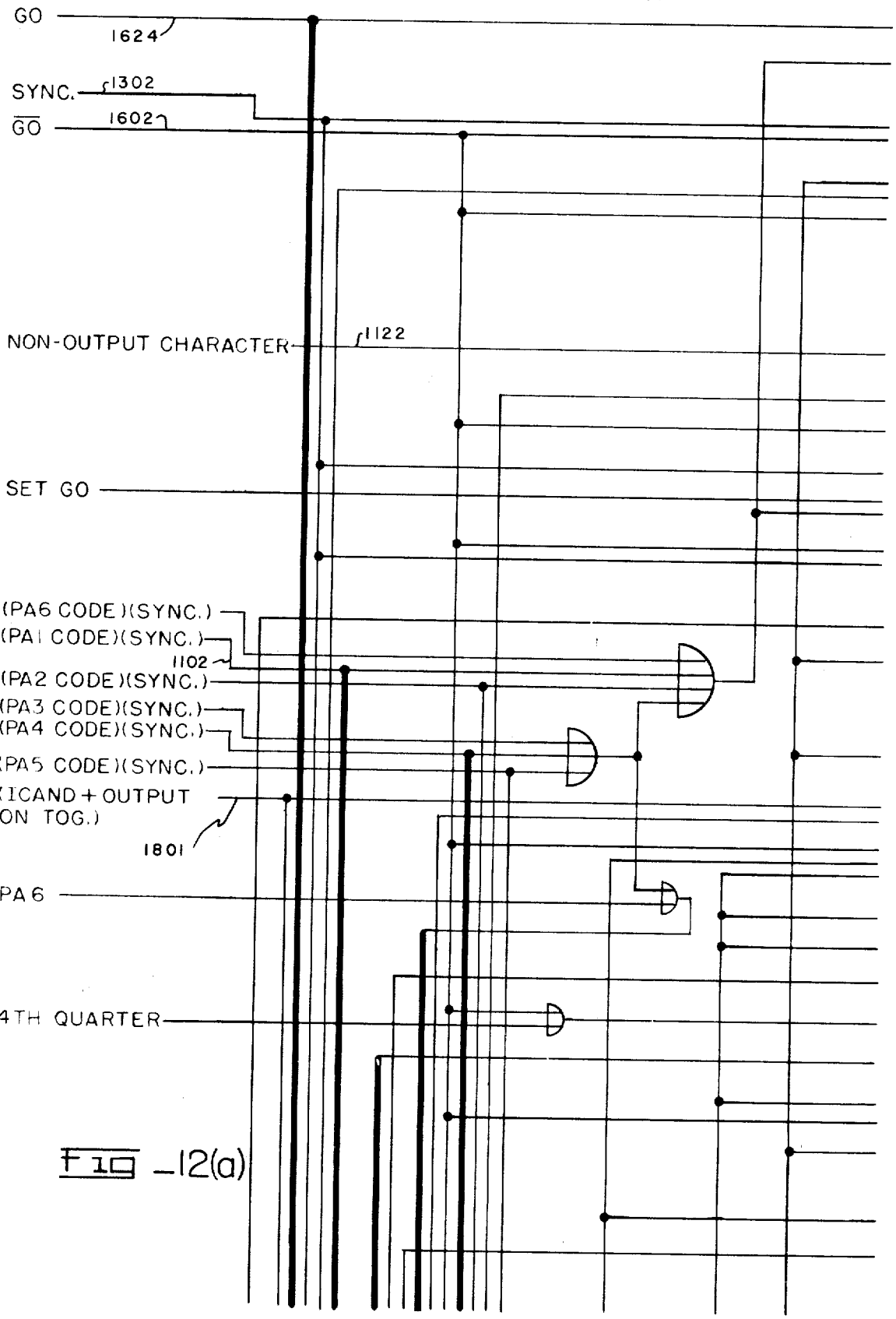

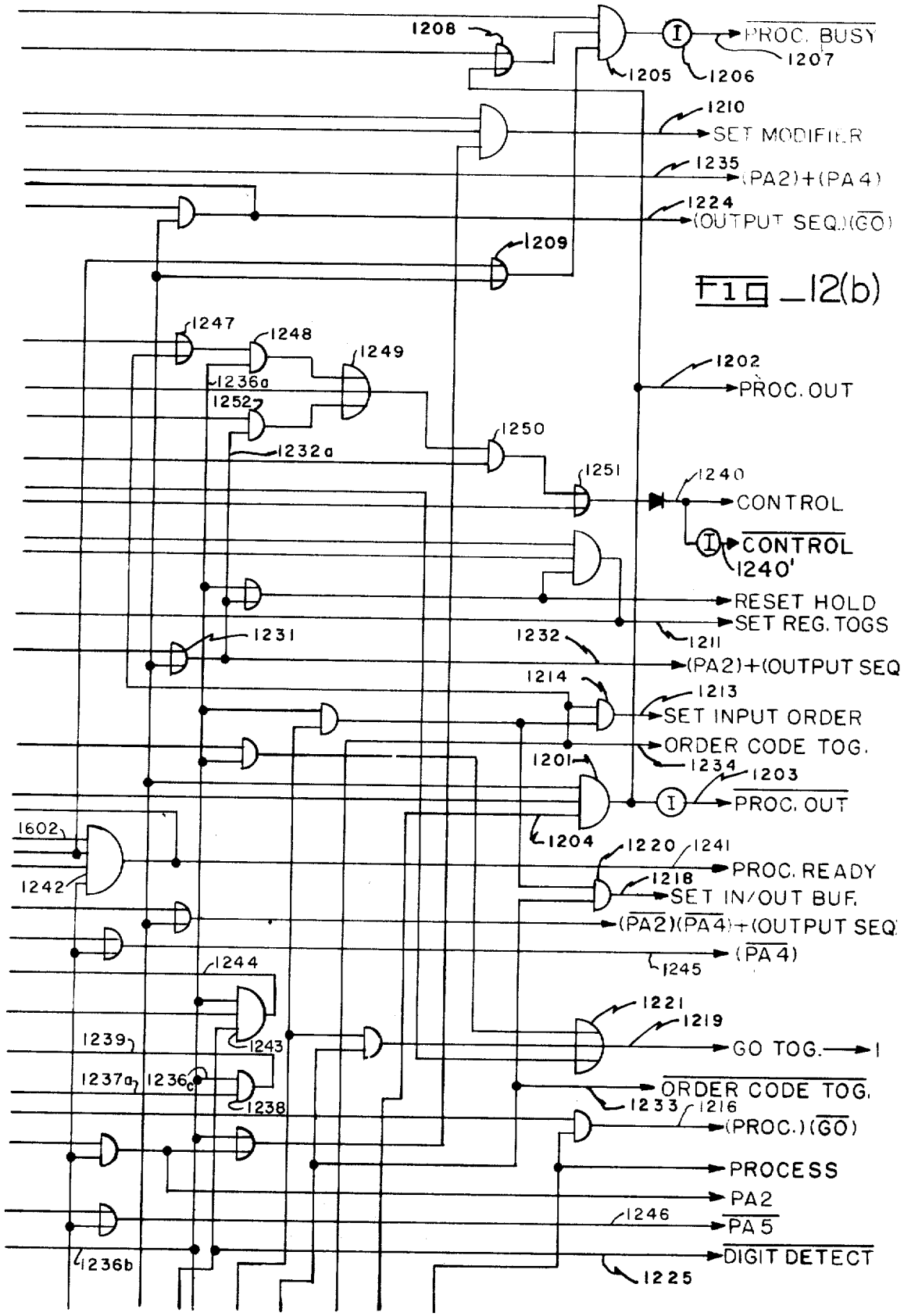

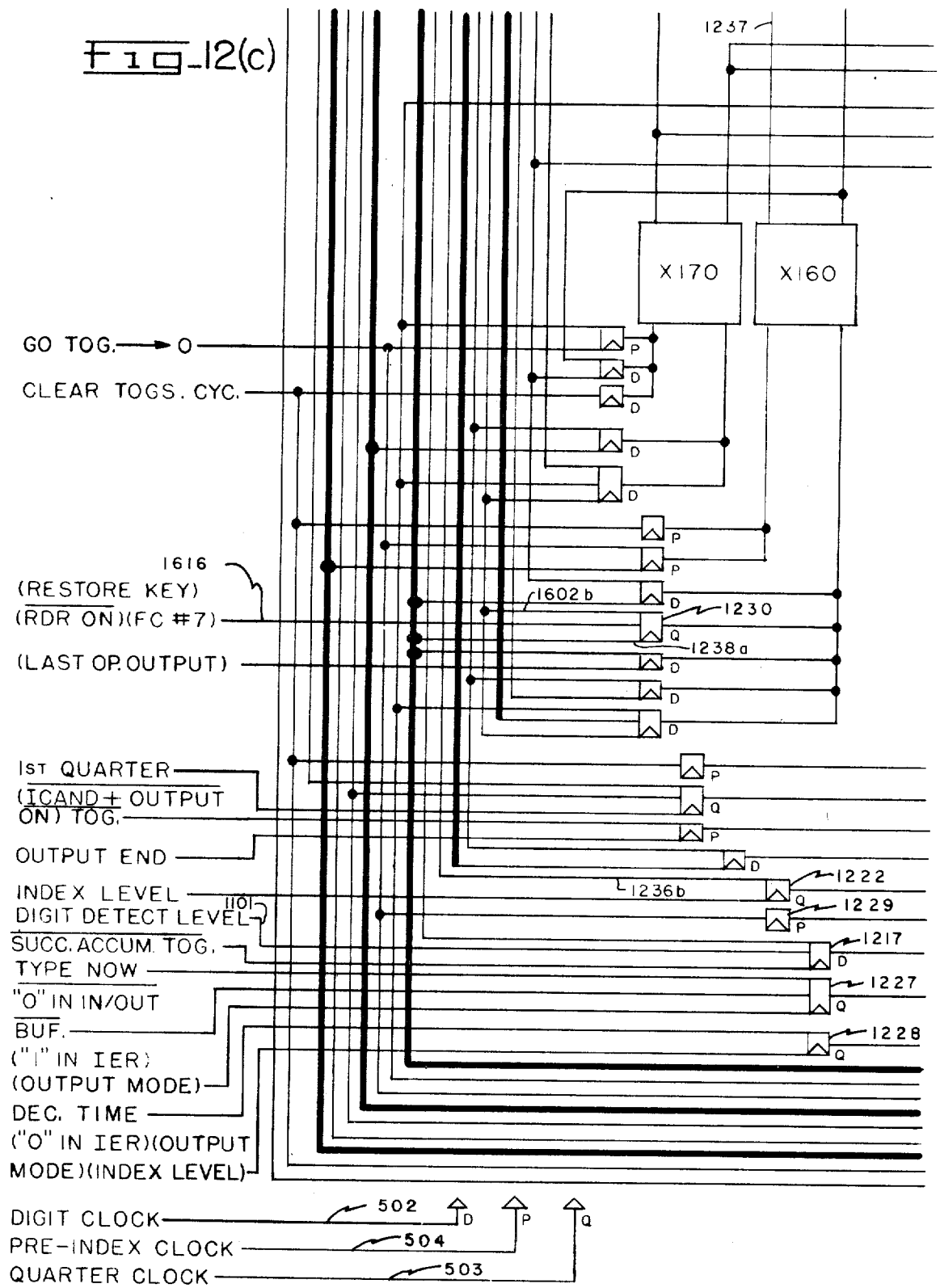

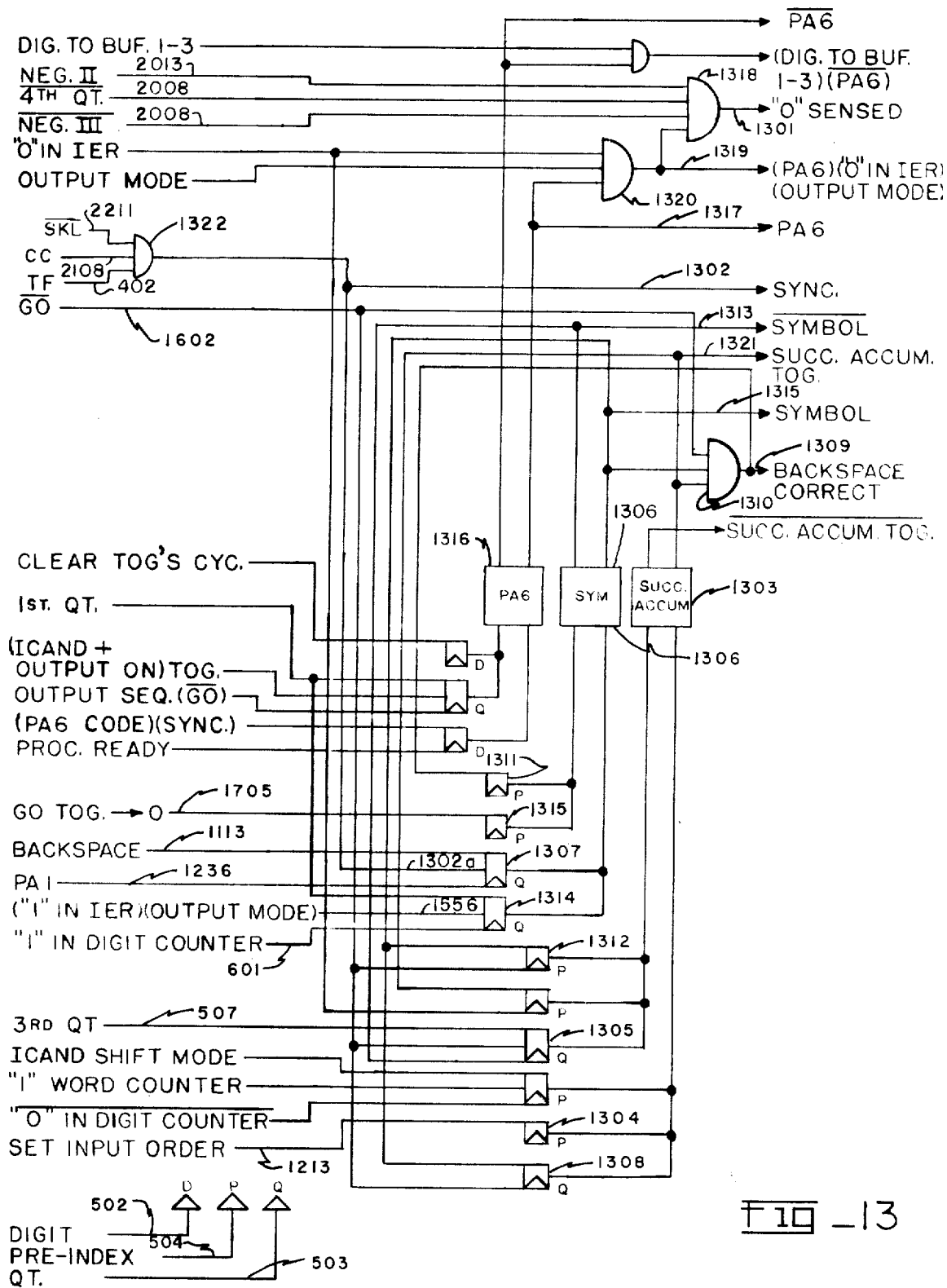

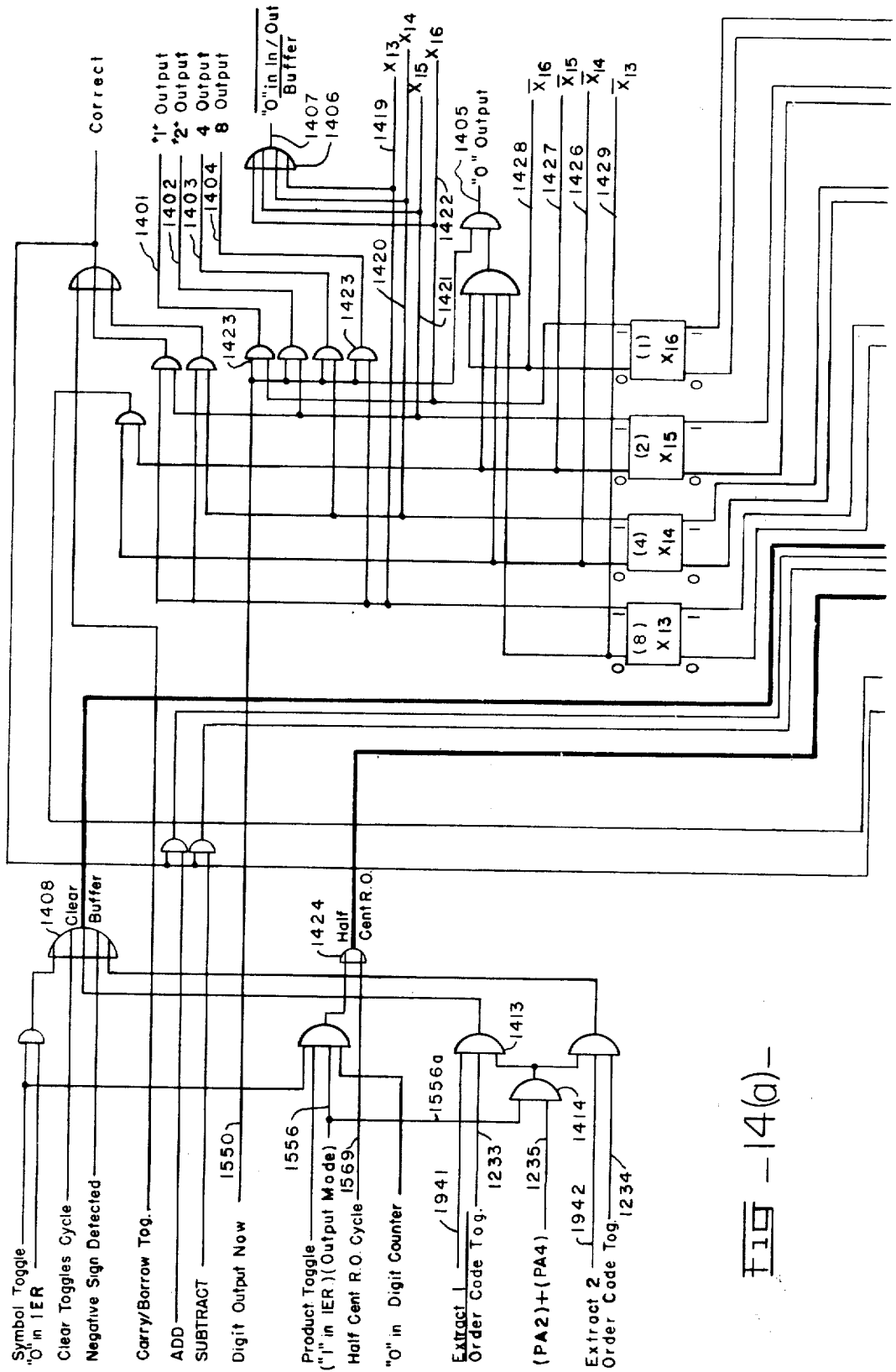

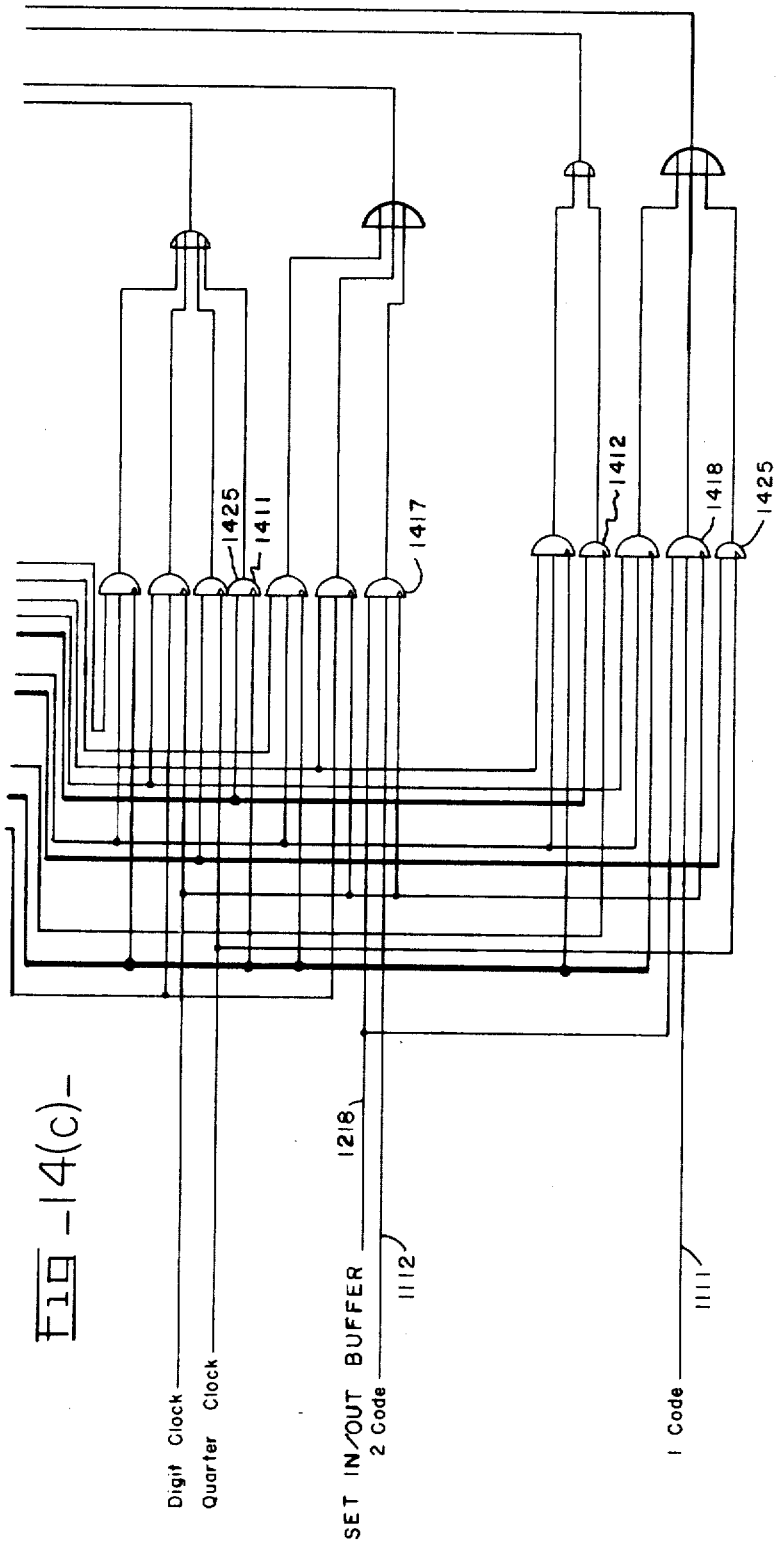

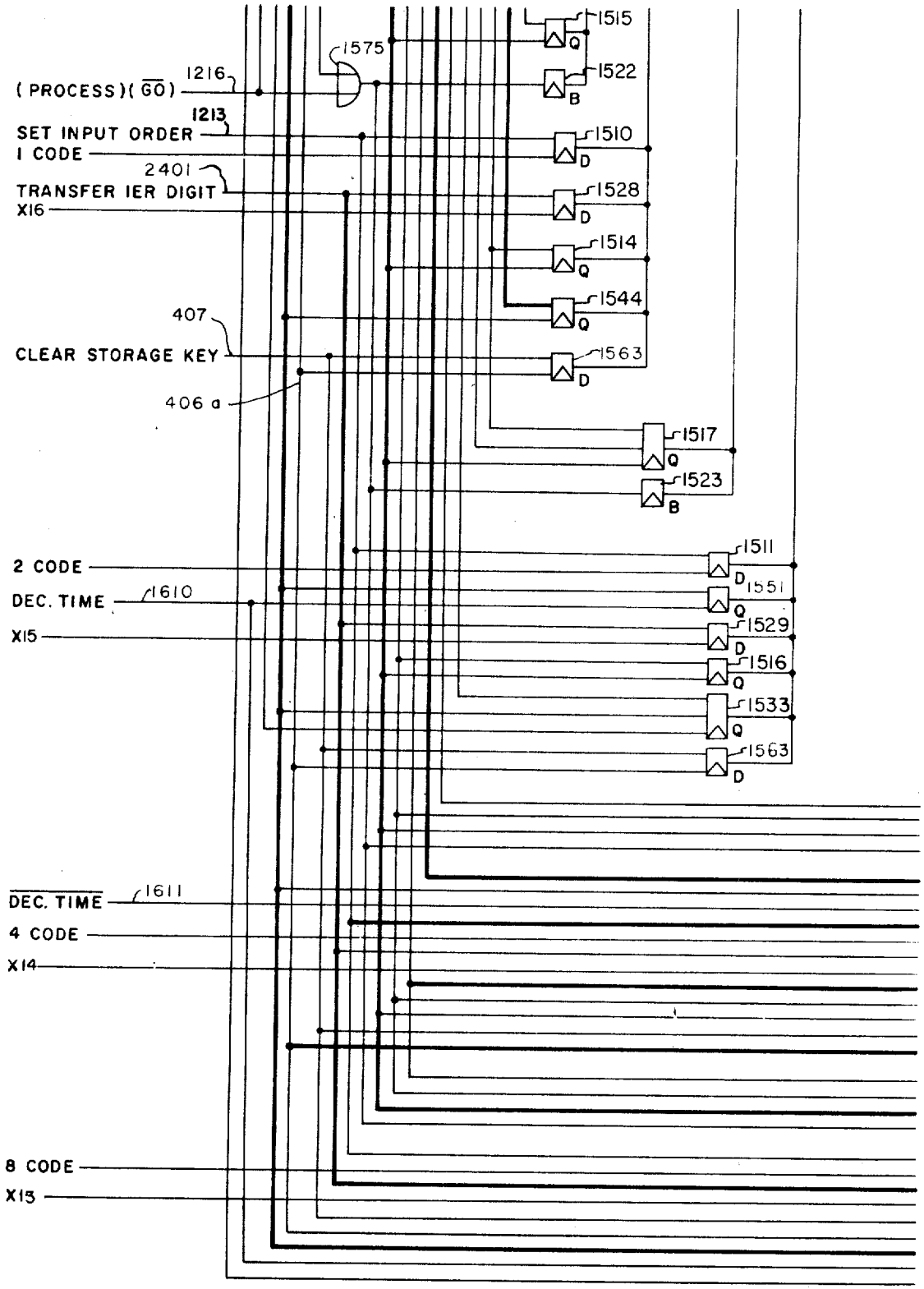
fig_15 (c)

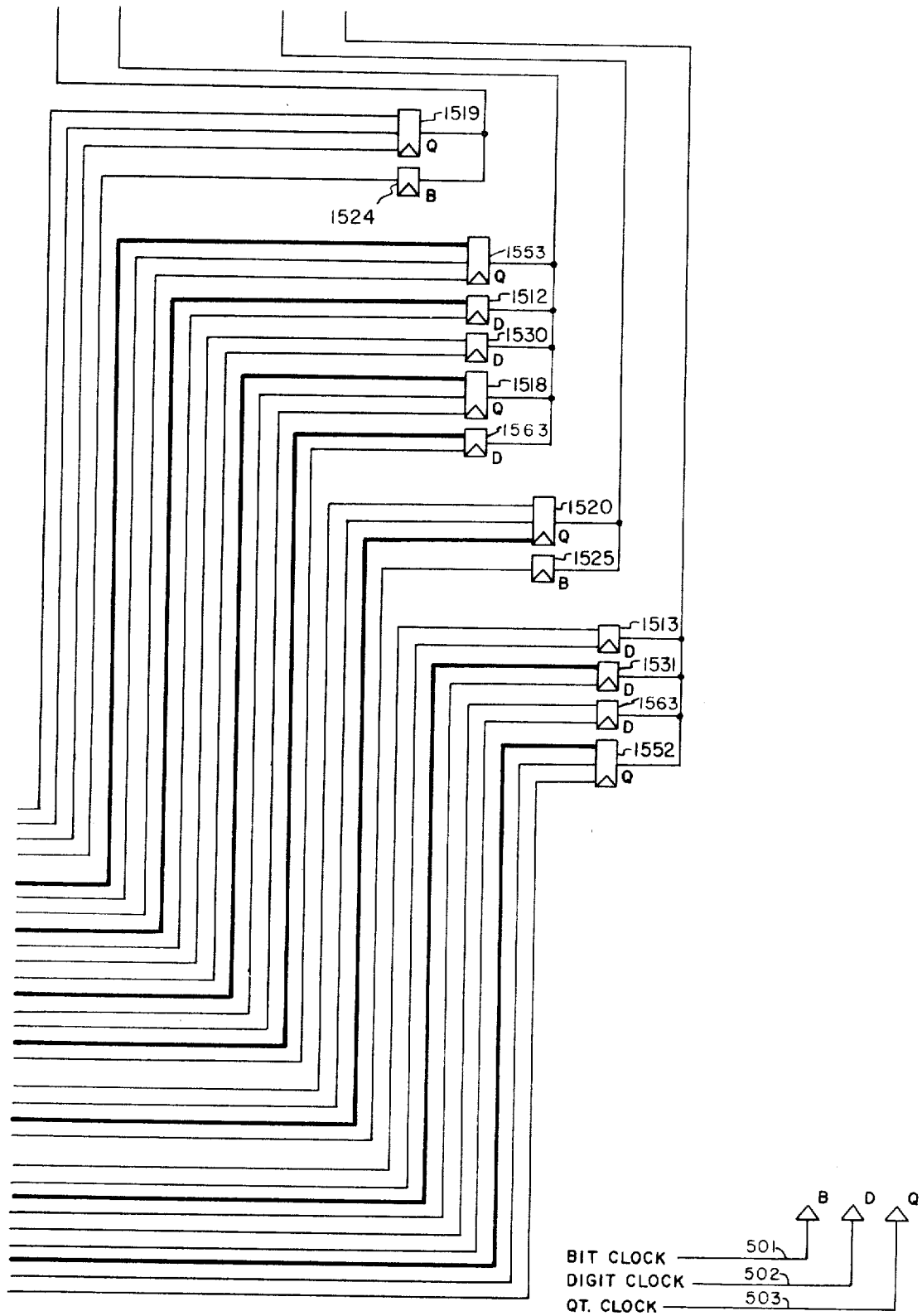
Fig_15 (d)

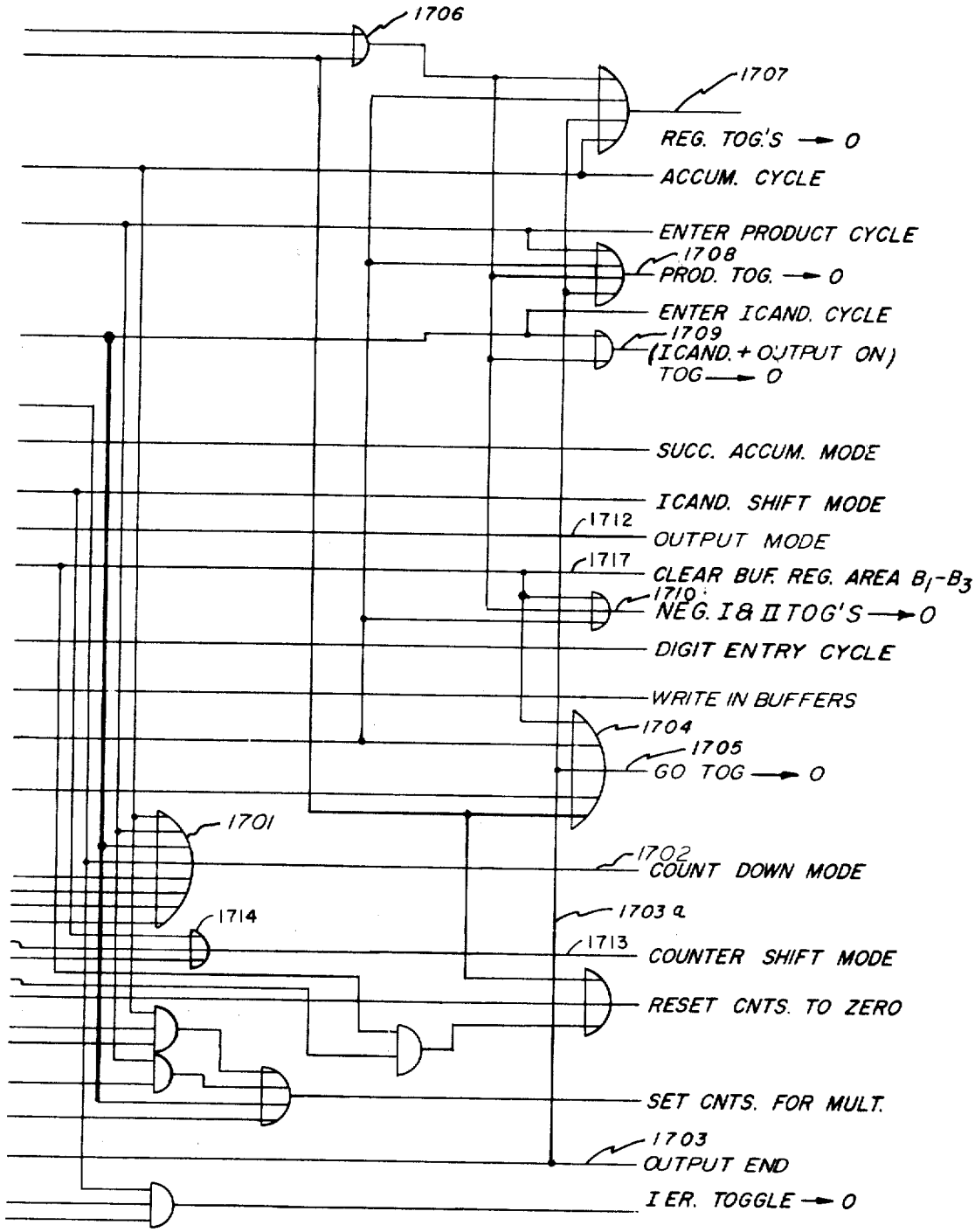
Fig_17 (b)

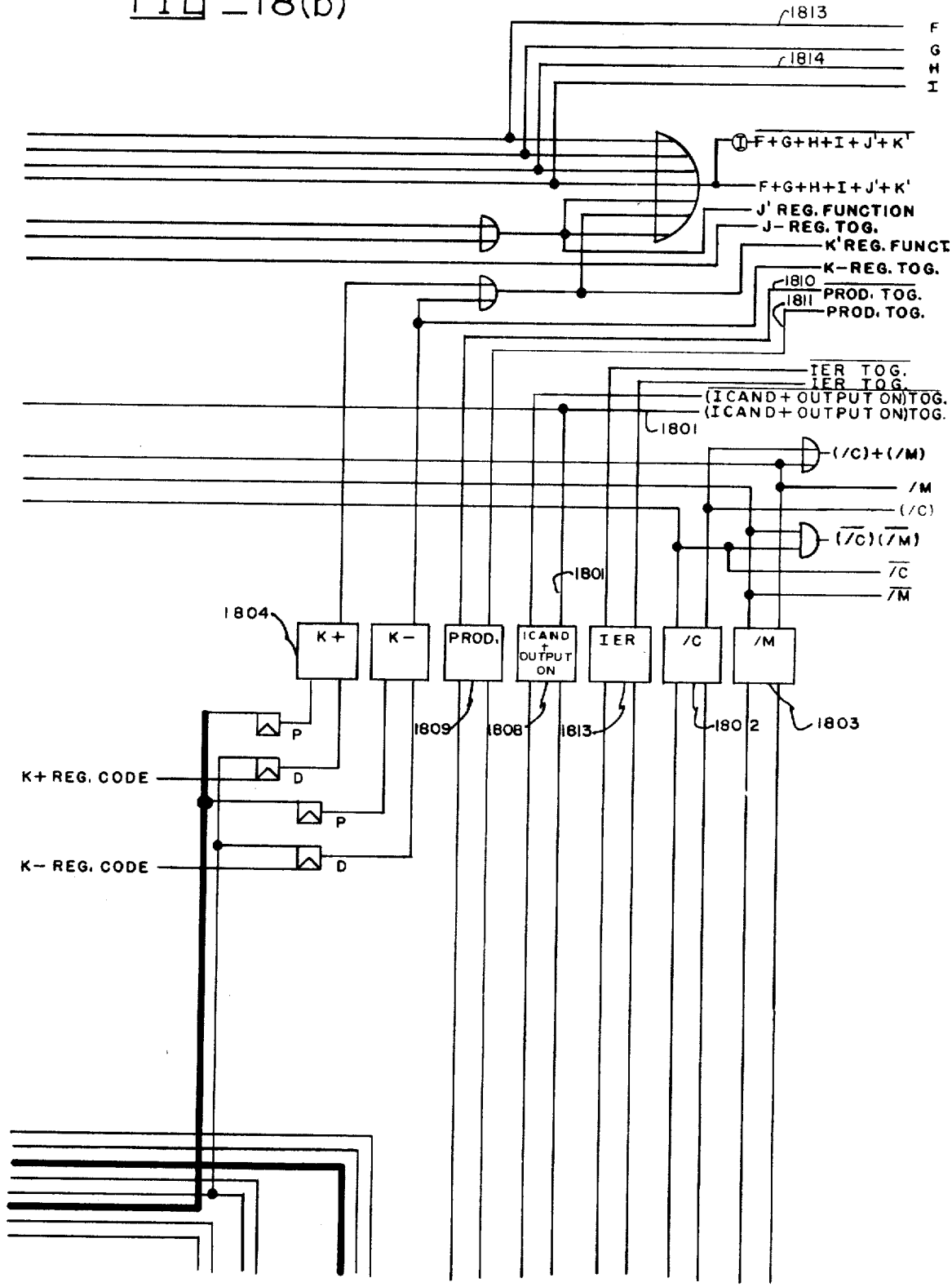
FIG_18(b)

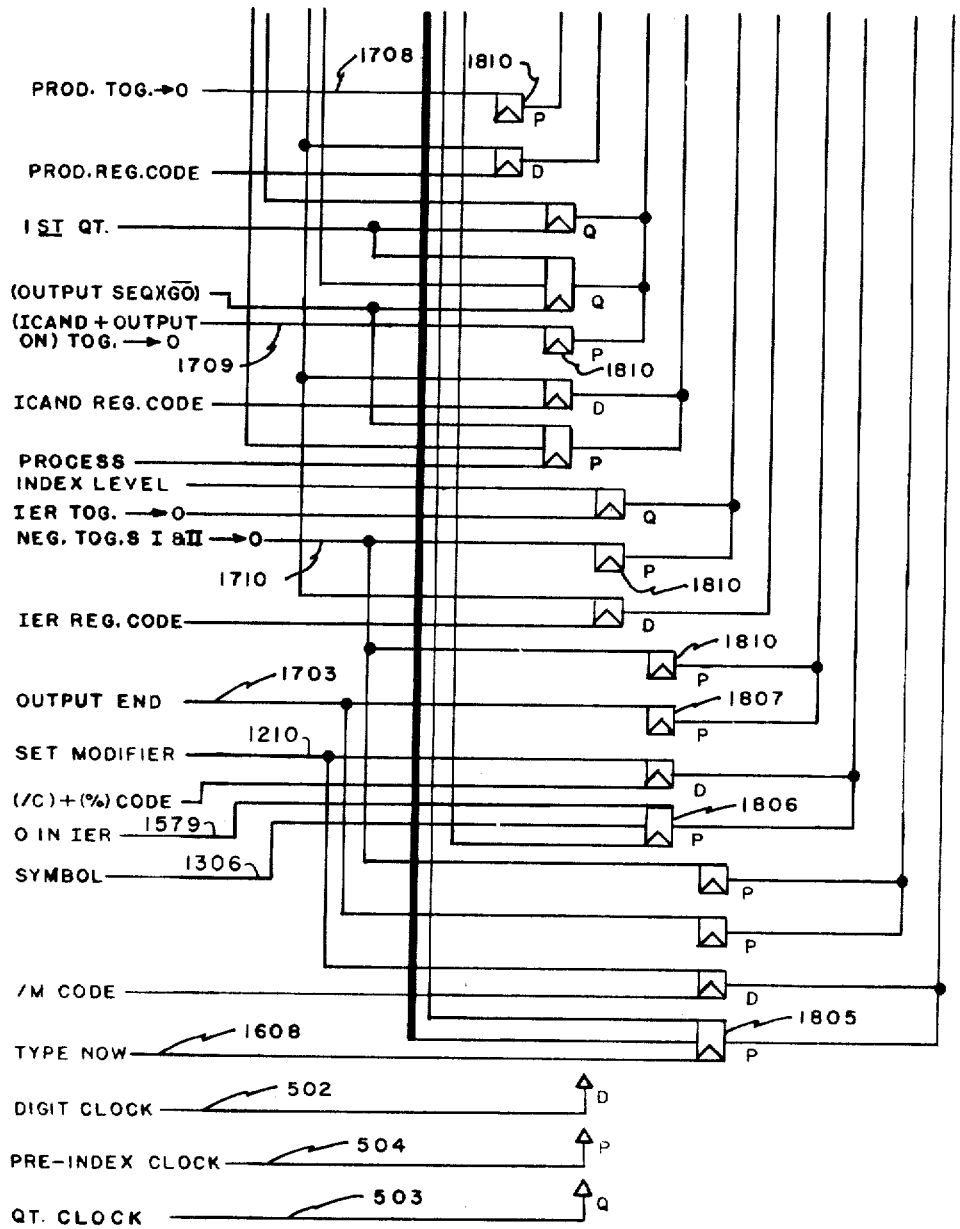
FIG_18(c)
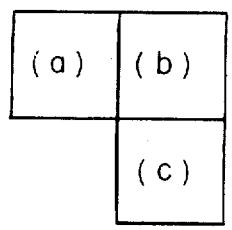
KEY TO FIG.18

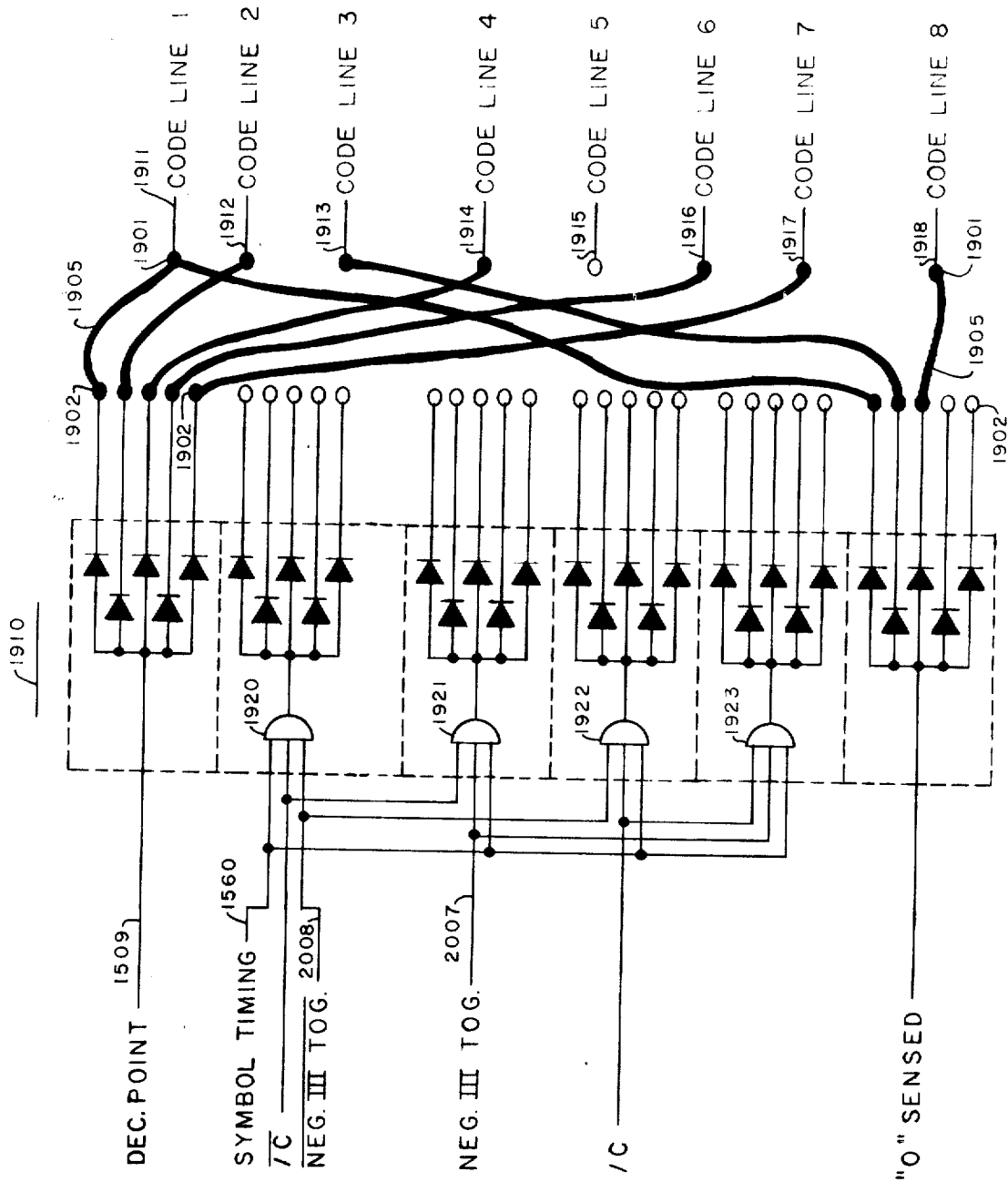

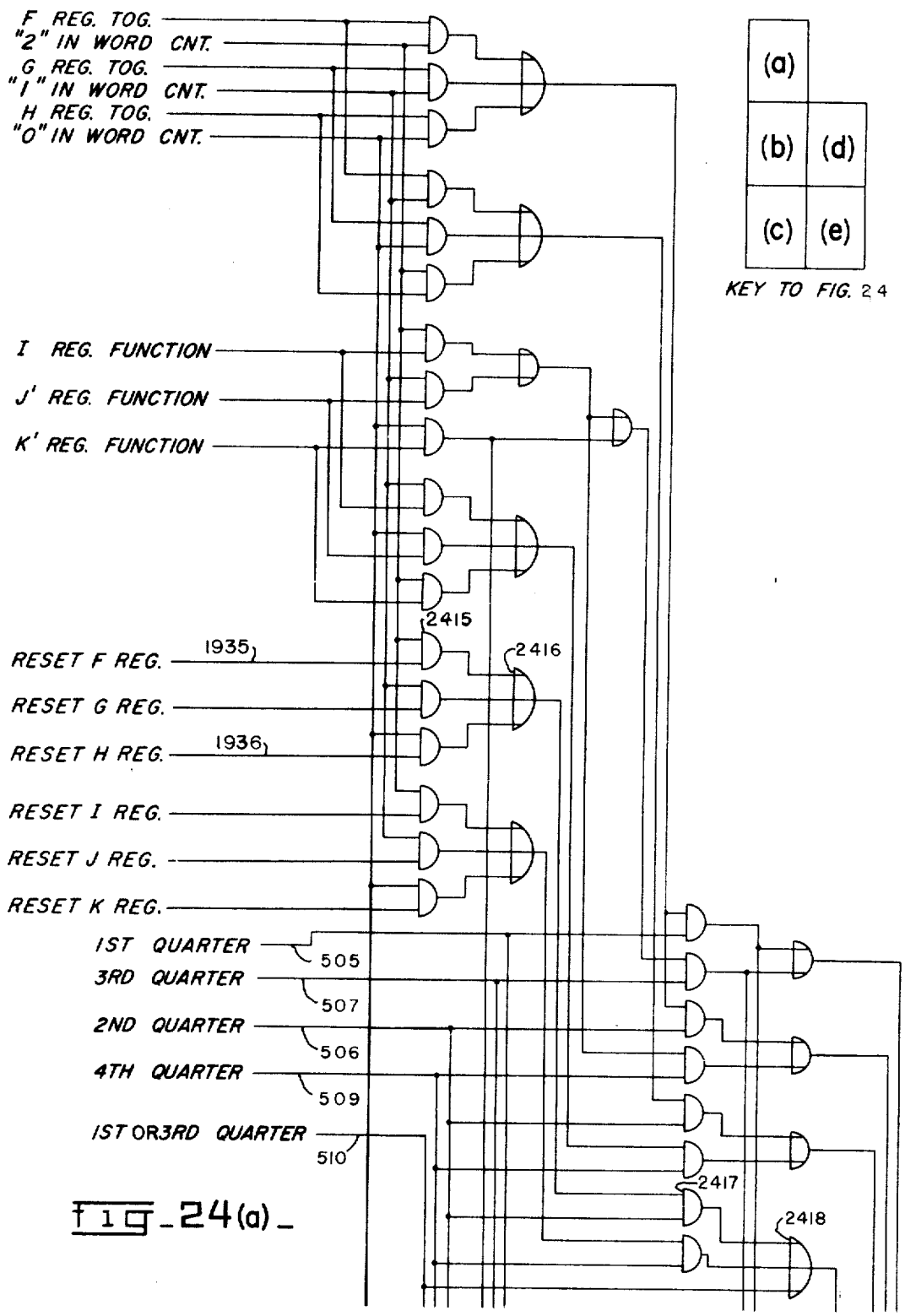

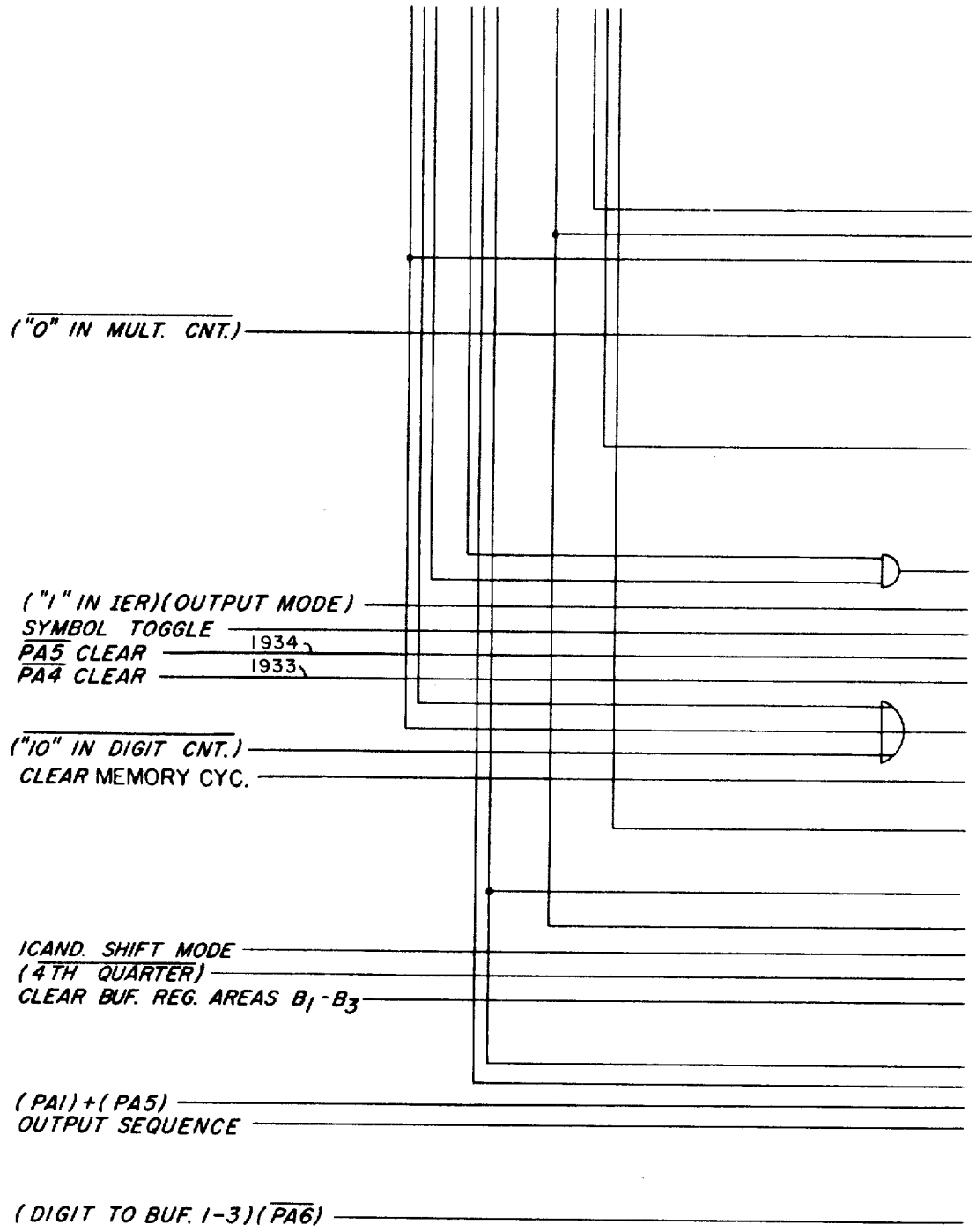
Fig_24(c)

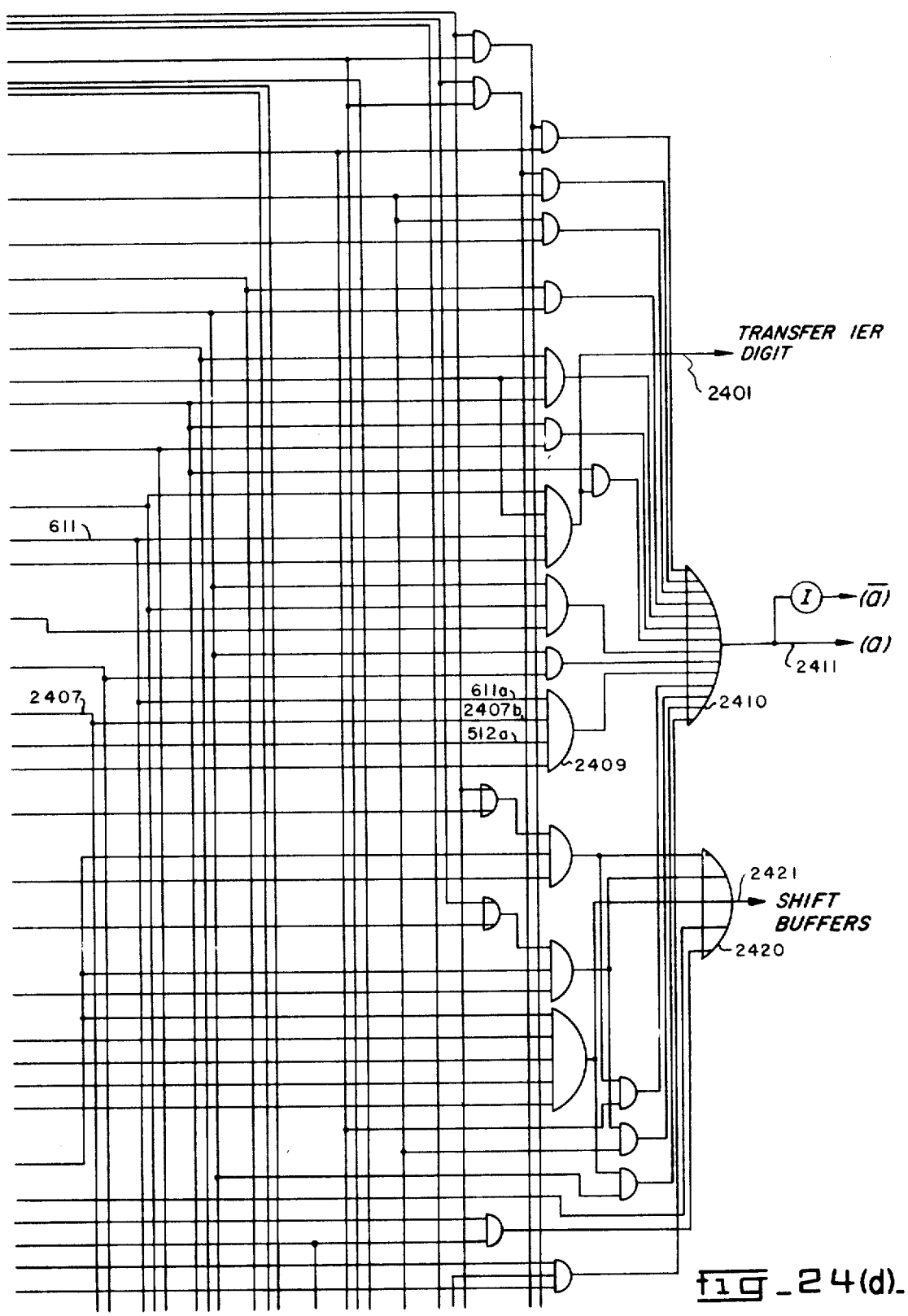
fig_24(d).

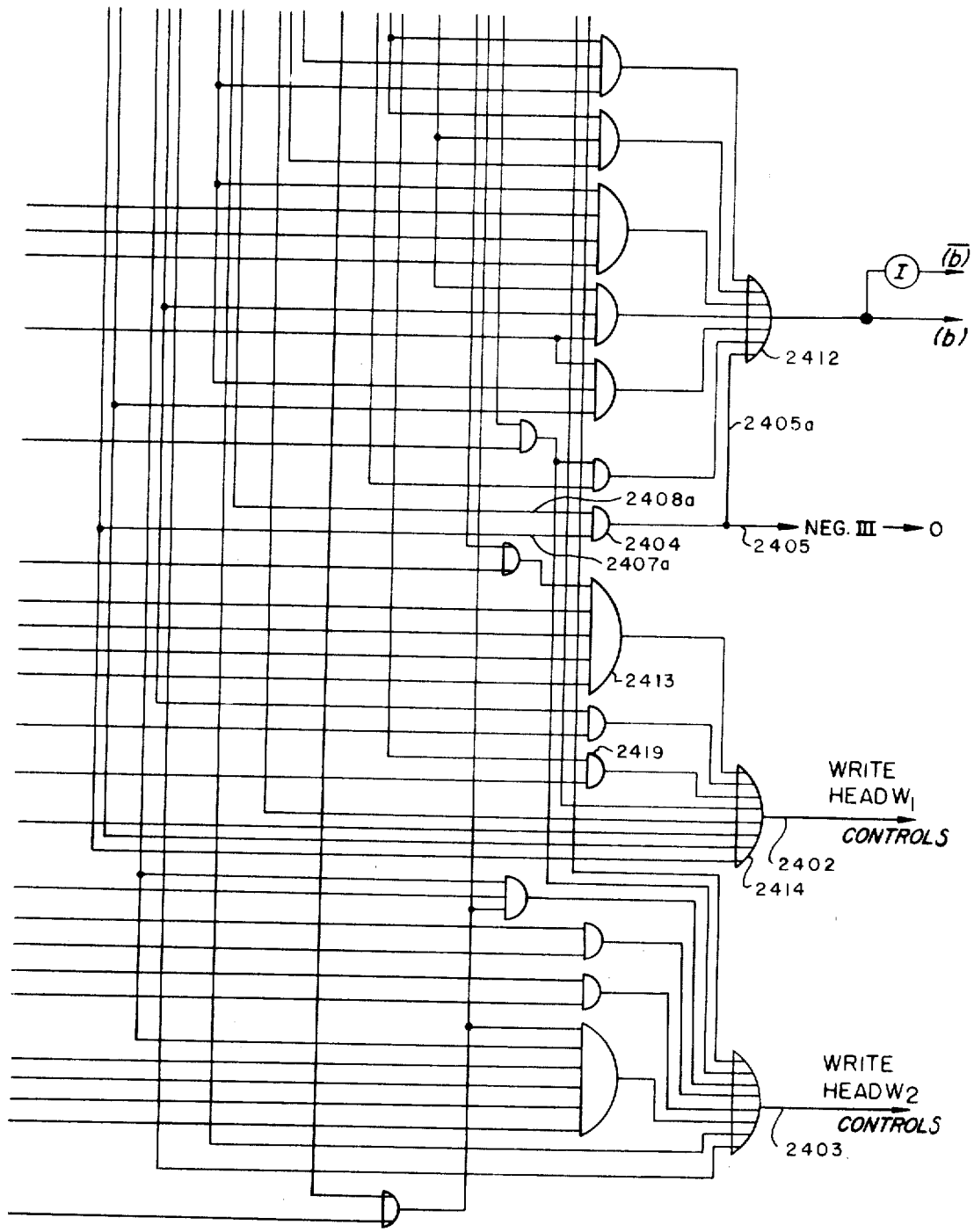
fig_24(e)

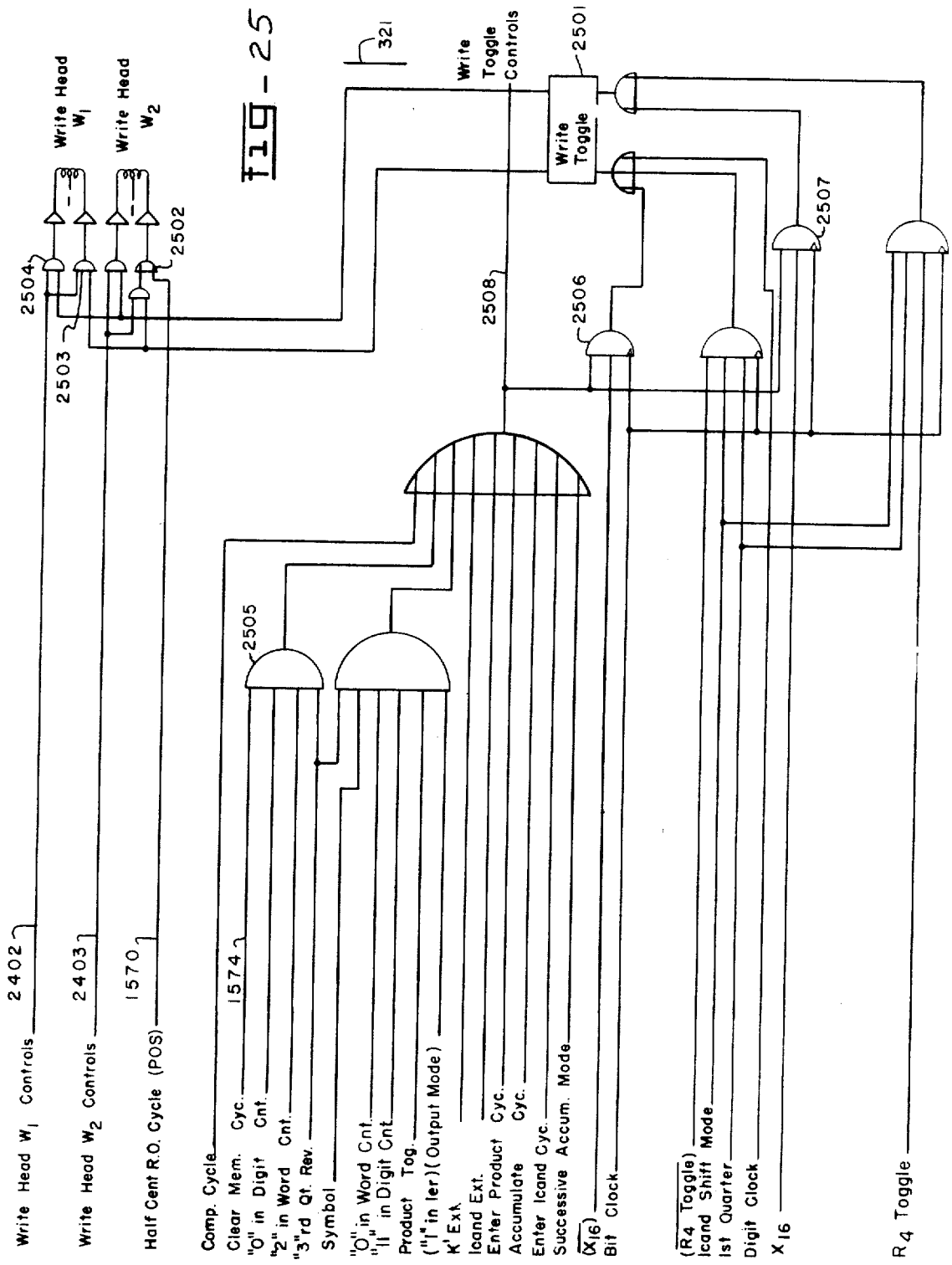

TWIN PEAKS STEEL CO.

21305 MOUNTAIN BLVD.

TWIN PEAKS, COLORADO

| ORD. OR INV. NO. 111112 | DATE 8/20/65 | CUST. ORD. OR REQ. NO. JD 39003487 2602 | TERMS NET 30 DAYS | | | | INTERNAL ACCOUNTING ONLY | |
|---|---|---|---|---|---|---|---|---|
| QUANTITY | CODE | DESCRIPTION | UNIT PRICE | DISCOUNT(S) | NET | UNIT COST | COST AMOUNT |
| 1 | 5C8903 | 20 X 32 STEEL HEAD DRUMS | 10.000 | | 9.00 | 8.903 | 8.90 |
| 1250 | 4M9915 | BRASS HINGES | 126.00/M | 10  2604 | 157.50 | 49.915/M | 62.39 |
| 14 | 7Q2126 | LOUVERED DOORS | 86.70 | 10  5 | 1031.73 | 72.126  2605 | 1009.76 |
| 2603 | | | | | 1198.23¢ | | |
| | | 4.0% TAX | | | 47.93 | | |
| | | FREIGHT | | | 25.00 | | |
| | | | | | 1271.16* | | 1081.05* |

FIG. 26

| CUSTOMER | | | | | |
|---|---|---|---|---|---|
| APPLICATION INVOICE PREPARATION DATE INVOICE | | | | | |
| DPS BRANCH PREP'D BY SHEET OF | | | | | |

| PROGRAM & OPERATION DETAIL | READER 1 | READER 2 | | | PCH |
|---|---|---|---|---|---|
| INITIAL LOADING | LOAD CARD | | | | |
| OPERATOR TURNS ON READER 1 | | | | | |
| CONDITION CODE CONTROL ON | CCN | | | | |
| AUTO PRINT OFF | APF | | | | |
| READ OUT ALL REGISTERS TO CLEAR THEM | PA3 | | | | |
| | F | | | | |
| | G | | | | |
| | H | | | | |
| | I | | | | |
| | J | | | | |
| | K | | | | |
| | P | | | | |
| | PRC | | | | |
| ENTRY INSTRUCTION | PA1 ⎯ 2701 | | | | |
| ORDER ENTRY INDICATOR | 6 | | | | |
| OPERATOR TYPES NEXT INVOICE NO. (6 DIGITS) | < STP | | | | |
| READER 1 ON- FIELD CONTROL TRACK 8 | | | | | |
| ACCUMULATE INVOICE NO. IN F REG. | F ⎯ 2702 | | | | |
| EXECUTE INSTRUCTIONS | PRC | | | | |
| AUTO PRINT ON | APN | | | | |
| TABULATE TO NEXT FIELD | TB | | | | |
| ENTRY INSTRUCTION | PA1 ⎯ 2703 | | | | |
| ORDER ENTRY INDICATOR | 0 | | | | |
| OPERATOR TYPES MONTH (2 DIGITS) | < STP | | | | |
| READER 1 ON-FC #8 | | | | | |
| CONDITION CODE CONTROL OFF | CCF | | | | |
| VIRGULE | / ⎯ 2704 | | | | |
| CONDITION CODE CONTROL ON | CCN | | | | |
| OP TYPES DAY (2 DIGITS) | < STP | | | | |
| RDR. 1 ON-FC #8 | | | | | |
| ACCUMULATE MONTH AND DAY IN H REG. | H ⎯ 2705 | | | | |
| EXECUTE INSTRUCTIONS | PRC | | | | |
| CARRIAGE RETURN | CR | | | | |
| AUTO PRINT OFF | APF | | | | |
| CONDITION CODE CONTROL OFF | CCF | | | | |
| END OF LOAD OPERATION | < MSTP | | | | |
| INVOICE HEADING | PROGRAM LOOP | HEADER CARD | | | |
| TO TURN OFF SPECIAL SKIP AND STOP READER AFTER ONE COMPLETE INVOICE | SSKF ⎯ 2700 STP | | | | |
| OP. INSERTS FORM AT "SOLD TO," TURNS ON RDR. 1 | CCN APN | | | | |
| TURN PUNCH OFF | PIF CR | | | | |
| SELECT READER 2 | SW | | | | |

*Fig. 27a*

| PROGRAM AND OPERATION DETAIL | READER 1 PROGRAM LOOP | READER 2 HEADER CARD | | | PUNCH |
|---|---|---|---|---|---|
| PRINT CUSTOMER NAME<br>SELECT READER 1 | <br>TB<br>SKN<br>SLSKF | NAME<br>SW | | | |
| OP TYPES "SHIP TO" NAME & ADDRESS, IF DIFFERENT, WHILE CUSTOMER ADDRESS PRINTED FROM HEADER CARD | PIN<br>PA5 — 2106<br>F<br>2 | | | | |
| READ-OUT INV. NO. (6 DIGITS) FROM F REG. | PRC<br>TB<br>PA 5 — 2107<br>H<br>2 | | | | INV NO.<br>TB |
| READ-OUT MONTH (2 DIGITS) FROM H REG. | PRC<br>/<br>PA5 — 2108<br>H | | | | MONTH<br>/ |
| READ-OUT DAY (2 DIGITS) FROM H REG. | PRC<br>/<br>65<br>TB<br>PIF | | | | DAY<br>/<br>65<br>TB |
| OP TYPES CUSTOMER ORDER NO., TURNS ON RDR. 1 | STP<br>TB | | | | |
| TERMS PRINTED FROM HEADER CARD | SW | TERMS<br>SW | | | |
| END OF HEADING, OP REMOVES HEADER CARD FROM RDR. 2. | CR2<br>STP | | | | |
| LINE ITEMS | PROGRAM LOOP | ITEM CARD 1 | ITEM CARD 2 | ITEM CARD 3 | |
| OP INSERTS ITEM CARD IN RDR. 2, TURNS ON RDR. 1 | SP3<br>PIN<br>PAI — 2709<br>9 | | | | |
| OP TYPES QUANTITY (3 DIGITS)<br>RDR. 1 ON- FC#B<br>ENTER QTY. IN F.<br>ENTER QTY. IN D. | STP<br>F<br>D<br>PRC<br>TB — 2710<br>PAI — 2712<br>6<br>SW | <br><br><br><br><br>2711<br><br>CCF<br>5<br>C<br>CCN<br>PIF<br>API<br>SP<br>SP | PIF<br>APF<br>SP<br>APN<br>PIN<br>9<br>CLF<br>M | PIF<br>APF<br>SP<br>APN<br>PIN<br>1<br>CCF<br>Q | QTY<br><br><br><br><br>TB<br><br><br>CODES |

*Fig. 27b*

| PROGRAM AND OPERATION DETAIL | READER 1 PROGRAM LOOP | READER 2 ITEM CRD 1 | ITEM CARD 2 | ITEM CARD 3 | PUNCH |
|---|---|---|---|---|---|
|  |  | APN PIN 8903 SW | CCN 9915 SW | CCN 2126 SW |  |
| ENTER UNIT COST IN J | J PRC TB APF PIF PAI 6 SW |  |  |  | TB |
|  |  | PRICE SW | PRICE M SW | PRICE SW —2713 |  |
| NON-RECORDED ENTRY OF PRICE IN R MULTIPLY QTY × PRICE | R PRC APN |  |  |  |  |
| PRINT DESCRIPTION | SW | DESCRIP SW | DESCRIP SW | DESCRIP SW |  |
| TABULATE TO PRICE COLUMN | TB APF PA5 |  |  |  |  |
| NON-RECORDED READ-OUT OF NET AMT. NET AMT. ENTERED IN D. | P PRC APN |  |  |  |  |
| PRINT PRICE IN PRICE COLUMN | SW | PRICE SW | PRICE M SW | PRICE SW |  |
|  | TB PAI 7 |  |  |  |  |
| OP TYPES FIRST DISCOUNT (2 DIGITS) RDR. 1 ON-FC #8. (IF NO DISCOUNT, OP. TURNS ON RDR. 1) | < STP |  |  |  |  |
| ENTER DISCOUNT IN R. | R |  |  |  |  |
| ENTER DISCOUNT IN K. | K |  |  |  |  |
| NEGATIVE MULTIPLICATION MULTIPLY NET AMT. × DISCOUNT | N PRC PA6 —2714 K PRC SP2 APF PA5 |  |  |  |  |
| NON-RECORDED READ-OUT OF NEW NET AMT. NEW NET AMT. ENTERED IN D. | P PRC APN PAI 7 |  |  |  |  |
| OP TYPES SECOND DISCOUNT (2 DIGITS) RDR. 1 ON-FC #8 (IF NO DISCOUNT, OP. TURNS ON RDR. 1) | < STP |  |  |  |  |
| ENTER DISCOUNT IN R | R |  |  |  |  |
| NEGATIVE MULTIPLICATION MULTIPLY NET AMOUNT × DISCOUNT | N PRC SKF —2715 TB PIN PA3 P —2716 |  |  |  |  |

*Fig. 27c*

| PROGRAM AND OPERATION DETAIL | RDR 1 PROGRAM LOOP | RDR 2 ITEM CARD 1 | ITEM CARD 2 | ITEM CARD 3 | PUNCH |
|---|---|---|---|---|---|
| READ-OUT OF NET AMT. | PRC<br>TB<br>PIF<br>PA2 | | | | NET AMT.<br>TB |
| TRANSFER NET AMT. IN G FOR TOTAL | G<br>PRC<br>PA3 ——— 2717 | | | | |
| TO CLEAR DISCOUNT FROM K. | K<br>PRC<br>APF<br>PA4 ——— 2718 | | | | |
| | F<br>2 | | | | |
| NON-RECORDED R/O OF F TO EXTRACT QUANTITY | PRC<br>PA2 | | | | |
| | D<br>F | | | | |
| TRANSFER QUANTITY TO D AND TO F NEGATIVELY (SUBTRACT TO CLEAR F) | N ——— 2119<br>PRC<br>APN<br>PA3 ——— 2120 | | | | |
| PRINT UNIT COST | J<br>PRC<br>PA2 ——— 2121 | | | 2722 | COST |
| | SW | SW | CCF<br>/<br>UC<br>M<br>LC<br>CCN<br>M<br>SW | SW | /<br>M |
| ENTER UNIT COST IN R<br>MULTIPLY COST X QUANTITY | R<br>PRC<br>TB<br>PIN<br>PA3 ——— 2724 | | | | |
| READ-OUT COST AMT. | P<br>PRC<br>CR<br>PIF<br>PA2 ——— 2725 | | | | |
| TRANSFER COST AMT. TO I FOR TOTAL<br>REMOVE ITEM CARD | I<br>PRC<br>STP | | | | |
| REPEAT ABOVE ITEM PROGRAM THREE TIMES ON PROGRAM LOOP | | | | | |
| REMOVE ITEM CARD | STP | | | | |
| TAX / FREIGHT | | TAX CARD | | | |
| OP. INSERTS TAX/FREIGHT CARD IN RDR. 2 AND TURNS ON RDR. 2. | | CCN<br>APN<br>CR<br>TB6 | | | |

*Fig. 27d*

| PROGRAM AND OPERATION DETAIL | RDR. 1 PROGRAM LOOP | RDR. 2 TAX CARD | | | PUNCH |
|---|---|---|---|---|---|
| READ-OUT NET AMT. SUB-TOTAL | | PA5 | | | |
| NET AMT. ENTERED IN D | | G | | | |
| | | PRC | | | |
| | | ◊ | | | |
| | | CR | | | |
| | | TB2 | | | |
| | | PA1 | | | |
| | | 8 | | | |
| | | 4.0 | | | |
| | | % | | | |
| ENTER TAX IN R | | R | | | |
| MULTIPLY TAX X NET AMT. SUB-TOTAL | | PRC | | | |
| | | SP | | | |
| PRINT "TAX" | | "TAX" | | | |
| | | TB4 | | | |
| | | PIN | | | |
| | | PA3 | | | |
| | | P | | | |
| READ-OUT TAX AMT. | | PRC | | | TAX AMT. |
| | | CR | | | CR |
| | | PIF | | | |
| | | PA2 | | | |
| | | G | | | |
| TRANSFER TAX AMT. TO G FOR TOTAL | | PRC | | | |
| | | CR | | | |
| | | TB2 | | | |
| PRINT "FREIGHT" | | "FREIGHT" | | | |
| | | TB4 | | | |
| | | PIN | | | |
| | | PA1 —2726 | | | |
| | | 4 | | | |
| OP. TYPES FREIGHT CHARGE (2 DIGITS) < | | STP | | | FRT.CHG. |
| (IF NO FREIGHT CHG., OP. DEPRESSES SKIP KEY) | | | | | |
| RDR. 1 ON-FC#8 | SW | ● | | | ● |
| OP. TYPES FRT. CHG. (2 DIGITS) < | | STP | | | |
| RDR. 1 ON -FC#8 | SW | | | | |
| FREIGHT CHARGE ENTERED IN G FOR TOTAL | | G | | | |
| | | PRC | | | |
| | | SKF | | | |
| | | CR | | | CR |
| | | PIF | | | |
| REMOVE TAX/FREIGHT CARD < | | STP | | | |
| TOTAL COMPUTATION | | | | | |
| | | TOTAL CRD. | | | |
| OP. INSERTS TOTAL CARD IN RDR. 2 AND TURNS ON RDR. 2 | | CCN | | | |
| | | APN | | | |
| | | CR | | | |
| | | TB6 | | | |
| TO RETURN PROGRAM LOOP TO INITIAL POSITION FOR NEXT INVOICE | | SSKN —2727 | | | |
| | | PIN | | | |
| | | PA3 | | | |
| | | G | | | |

*Fig. 27e*

| PROGRAM AND OPERATION DETAIL | RDR. 1 PROGRAM LOOP | RDR. 2 TOTAL CARD | | | PUNCH |
|---|---|---|---|---|---|
| READ-OUT NET TOTAL | | PRC | | | NET TOT. |
| | | PIF | | | |
| | | ✳ | | | |
| | | PIN | | | |
| | | TB | | | TB |
| | | PA3 | | | |
| READ-OUT COST TOTAL | | I | | | |
| | | PRC | | | COS. TOT. |
| | | APF | | | |
| | | TB | | | -S |
| | | APN | | | |
| | | PIF | | | |
| | | ✳ | | | |
| | | CR | | | |
| | | PA 1 | 2728 | | |
| | | I | | | |
| | | I | | | |
| | | F | | | |
| RAISE INVOICE NO. BY ONE | | PRC | | | |
| REMOVE TOTAL CARD | < | STP | | | |

*Fig. 27f*

3,522,416
Patented Aug. 4, 1970

---

3,522,416
INPUT-OUTPUT CONTROLS
Winsor Soule, Jr., Berkeley, John Efstathiou, Oakland, and Leif Andreasen, Newark, Calif., assignors to SCM Corporation, New York, N.Y., a corporation of New York
Filed Feb. 23, 1965, Ser. No. 434,265
Int. Cl. G06f *15/00;* G06k *15/00*
U.S. Cl. 235—61.6
18 Claims

ABSTRACT OF THE DISCLOSURE

There is disclosed an externally programmed computer of the type in which operating instructions and data are stored together in record media such as paper tape, the instructions being variable-length series of coded characters sensed serially. These instruction words can be interrupted and data to which other elements of the system respond can be interspersed within the instruction word and yet not affect the subsequent execution of the computer operation defined by the computer instruction characters. Specifically, some of these instruction characters can be alphanumerics which have control significance when sensed in an instruction word, yet are distinguishable from alphanumeric data codes interspersed within the instruction word.

---

Figure 1:
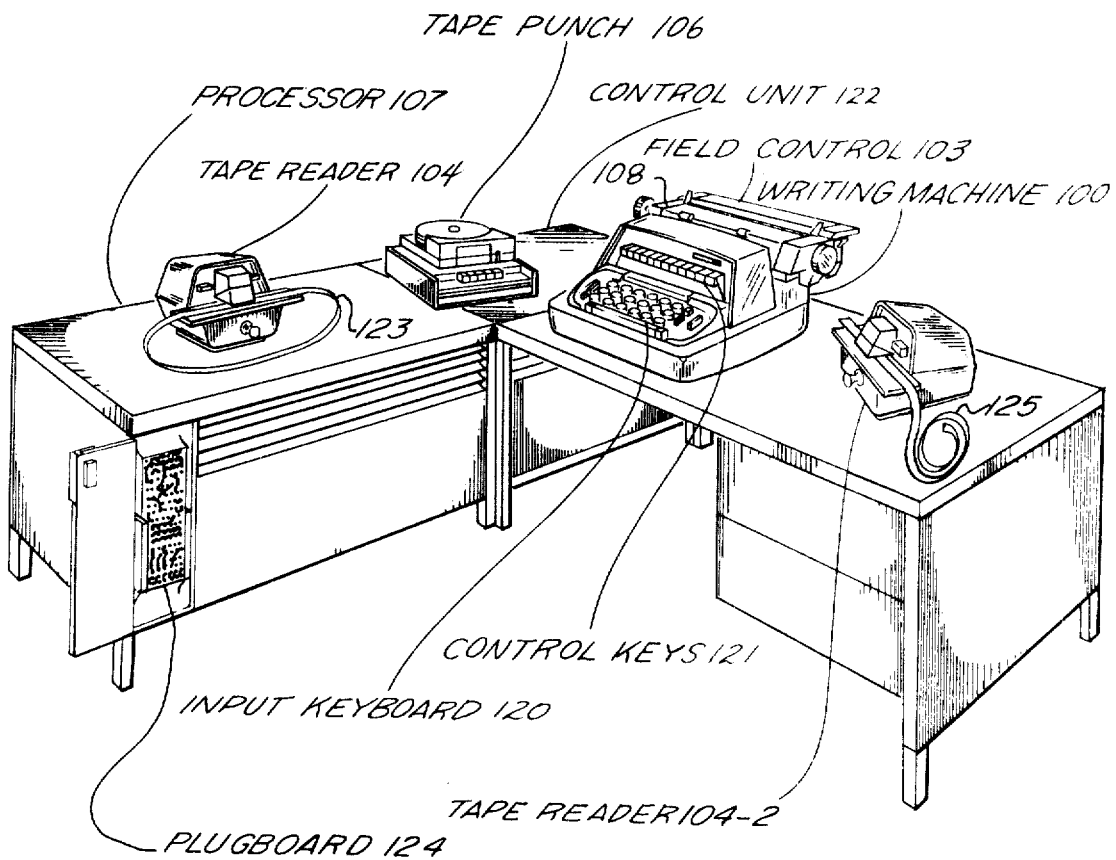

This invention relates to input and output controls for electronic digital computers used in relatively inexpensive and simple business machines, and particularly applies to the externally programmed type of computer in which operating instructions and data are stored in record media such as punched paper tape.

The essential novelty of the system according to this invention is that the externally programmed computer instructions on the punched paper tape are variable-length series of coded characters (referred to hereinafter as instruction words) presented serially in character-by-character fashion, each character representing an instruction defining an operation—including those of an algebraic nature, an address, or an output format selection and the computer being capable of receiving and responding to the characters asynchronously at a rate up to 30 characters per second or synchronously at 60 char./sec. Further, according to the invention, the computer instruction words can be interrupted and data to which other elements of the system respond can be interspersed within the instruction word and yet not affect the subsequent execution of the computer operation defined by the computer instruction characters. Additionally, these instruction characters can include those to which the computer would normally respond, but according to the invention, can be used for control of other elements of the system without affecting execution of the sequence defined by the computer instruction characters proper. According to the invention, further, the numeric data received within a computer entry instruction sequence has different significance according to the order in which the numerics are received, the first digit received within the instruction sequence is not treated as the most significant digit, but, instead defines the position at which the most significant digit of the succeeding numerics will be stored in a memory device. Still another feature of the invention is that instruction characters which would otherwise cause a recording operation to ensue will not have such effect when sensed in an instruction word.

Again, another feature of the invention resides in a novel response to a "Skip" code, a system control character causing the paper tape reader controlling the system to be put in a mode in which the media is idly advanced until detection of a special code at a desired point in the media ends this advance. According to the invention, when the "Skip" code is sensed in the paper tape or manually introduced through control keyboard 121 following the sensing of the initial characters of an instruction word, it not only causes the usual idle advance, but also results in the clearance of a partially completed computer instructions.

Yet another feature of the invention pertains to readout from registers normally provided with a round-off position adjacent the least significant digit position. Such registers when read out under the conditions where the contents of the register are zero, but should have been negative, will not produce the desired rounding in the least significant position and an indication of a change of signs. Accordingly, the invention senses when both the register and the round-off position are at zero and then provides an output showing a rounded value in the least significant position and a change of sign.

Another feature of the invention is the provision of an output sub-routine which calls for internally reading all characters in a register, but providing only a partial output as controlled by plugboard for determination of the start, decimal and stop positions of recording information, together with provision for selecting an alternate determination of the start, decimal, and stop positions according to the sensing of a selection character on the program medium. A further feature of the invention is that the above-mentioned sub-routine includes provision for producing, also under control of the plugboard, one or two symbols with proper regard to the sign of the register contents.

Another feature of the invention provides selective extraction of a portion of the contents of a register during output, "extraction" herein referring to the substitution of zeros for digits in the selected portion of the register. The novelty herein lies in the use of a plugboard for controlling this function and also in that an alternate format is made available by a technique similar to that mentioned above for output control.

A further feature is that in this externally-programmed computer, sensing of a Backspace code in the record media during an entry operation causes the succeeding digit to enter storage at an ordinal position higher than the previous by a value of one. This is necessary for audit trail purposes because otherwise a number entry in a document could be correct, but the order entry information not having been changed correspondingly the number in storage would be incorrectly located.

Yet another feature of the invention is that a "Field Control," a control sensitive to carriage position, is used to condition the response of the computer to operation of a "Restore" key, such that this key is effective only at pre-programmed positions of the carriage of the Writing Machine used for input and output of data.

It is therefore an object of this invention to provide a novel computer in which externally-programmed computer instructions on a record media are variable length series of coded characters presented serially in character-by-character fashion and responded to asynchronously at a rate up to 30 characters per second or synchronously at 60 characters per second.

It is another object of the invention to provide an externally programmed computer in which the computer instructions can be interrupted and data to which other elements of the system respond can be interspersed within the instruction word and yet not affect subsequent execution of the computer operation defined by the characters of the computer instruction.

It is yet another object of the invention to provide an externally programmed computer having novel controls such that instruction characters to which the computer would normally respond can be interspersed in an interrupted instruction word for control of other elements of the system without affecting execution of the sequence defined by the computer instruction characters proper.

It is an object of the invention to provide an externally programmed computer in which instruction characters which would otherwise cause a recording operation to ensue will not have such effect when sensed in an instruction word.

It is yet another object of the invention to provide an externally-programmed computer in which a "Skip" command, a command causing the paper tape reader controlling the system to be put in a mode in which the tape is idly advanced, additionally results in the clearance of a partially-received computer instruction when this code is sensed following receipt of less than all characters of a computer instruction word.

A further object of the invention is to provide a computer having circuits for a round off, together with circuits for sensing whether the contents of the register are zero, including the round off position, and circuits for producing output of a rounded-value and an appropriate sign if there is a zero in all positions.

Still another object of the invention is to provide a computer having means for detecting a zero condition for the contents of a register and providing a signal for indication of this condition together with means controlled by a sensing of a zero in all positions including a round-off position to inhibit the production of the signal indicating a zero content of the register.

It is yet another object of this invention to provide in a computer having a character-by-character readout, a means for internally reading all the characters in a register but providing selectable partial outputs controlled by a plugboard according to the sensing of a selection character on the external programming device.

A further object of this invention is to provide in a computer having a character-by-character readout, a means for a partial output of the characters in a register together with generation of one or two symbols under control of a plugboard.

Another object of this invention is to provide in a computer having a character-by-character readout, a means for a partial output of the characters in a register together with generation of symbols, with regard to sign of the contents of the register, under control of a plugboard.

Still another object of the invention is to provide in a computer having a character-by-character output, means for the selective extraction of predetermined portions of the contents of a register according to the program in a plugboard.

A further object of the invention is to provide two extraction programs according to the sensing of a selection character on the external programming device.

A still further object is to provide an improved externally programmed computer having a carriage, and in which causing a code in the record media for backspacing the carriage during an entry operation causes the succeeding digit to enter storage at an ordinal position higher than the original by a value of one.

Yet another object is to provide an improved externally programmed computer in which response to, the operation of a "Restore" key for correction of major errors or for change in program, is conditioned according to the position of the carriage supporting the document in preparation, such that this is effective only at pre-programmed positions of the carriage.

Other objects will become evident from the claims based on the specification in combination with the accompanying drawings which comprise:

FIG. 1, a pictorial of the actual embodiment of the system showing the Writing Machine, two paper tape readers and a punch, a control console, and a computing device, including a plugboard 124 used for output control;

FIG. 2, a block diagram of the system, showing the relation and interconnection of the main components of the system of this invention, including input devices, information channels, utilization devices, control devices, and timing devices;

FIG. 3, a block diagram of the computer showing the magnetic disc memory, the clock pulse distributor, the various counters defining the areas being scanned by the reading or writing heads at any given instant, the recording and reproducing circuits connected to the reading and writing heads, the gating circuits which determine the disposition of the information being sent to or received from the magnetic memory, the adder-subtractor or arithmetic portion of the computer which takes the information from the gating circuit and transmits it into a temporary storage buffer and from there to an encoder for output or back into the memory for storage, the controls for input-output sequencing and process control and also the register selection and sign controls, the multiplier buffer which controls output as well as the successive accumulation during multiplication, the feedback from Processor to system timing and control logic and finally the connections to the information channels via the input decoder and via the plugboard output control.

Figure 7A:
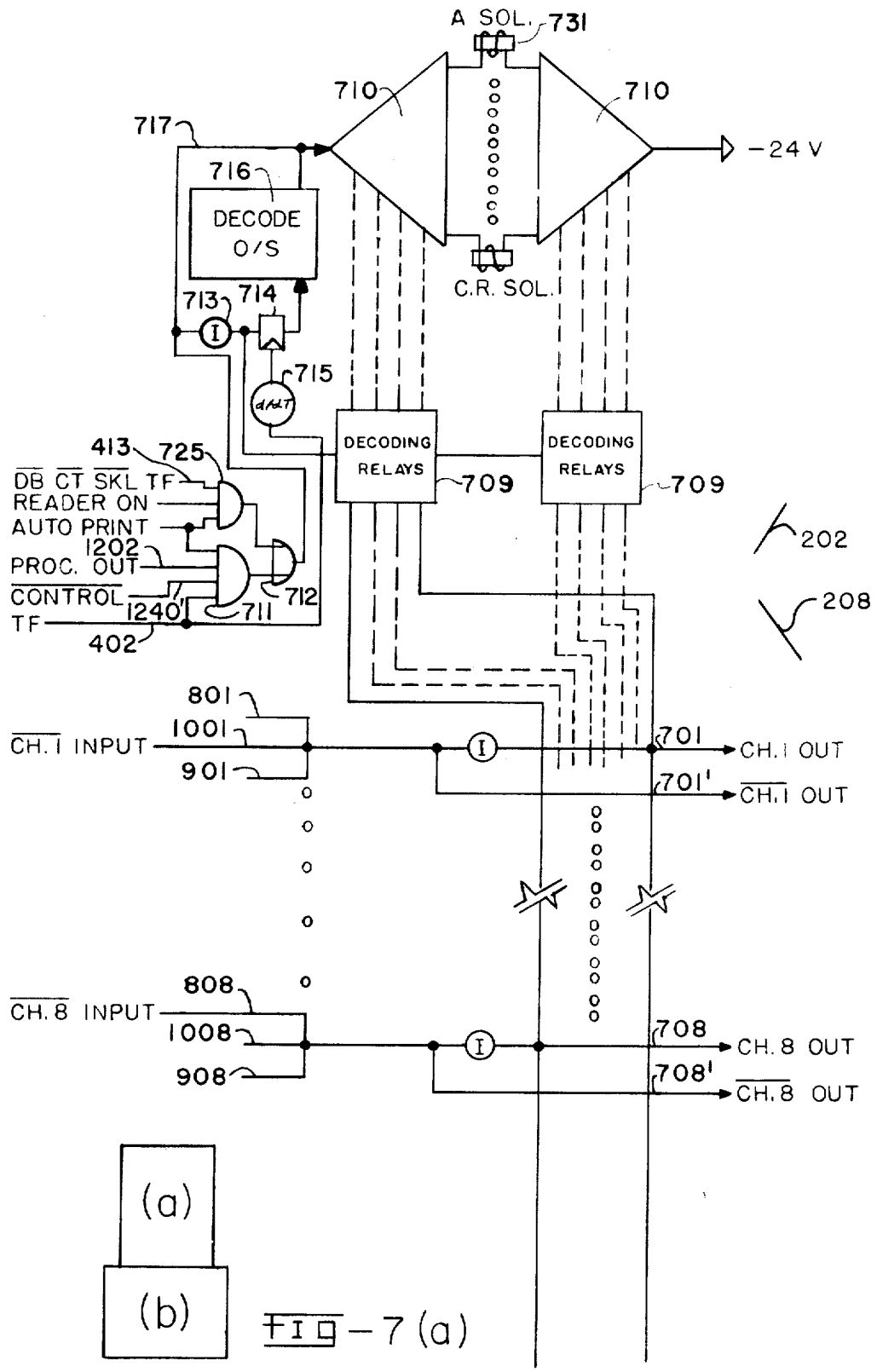
Figure 8:
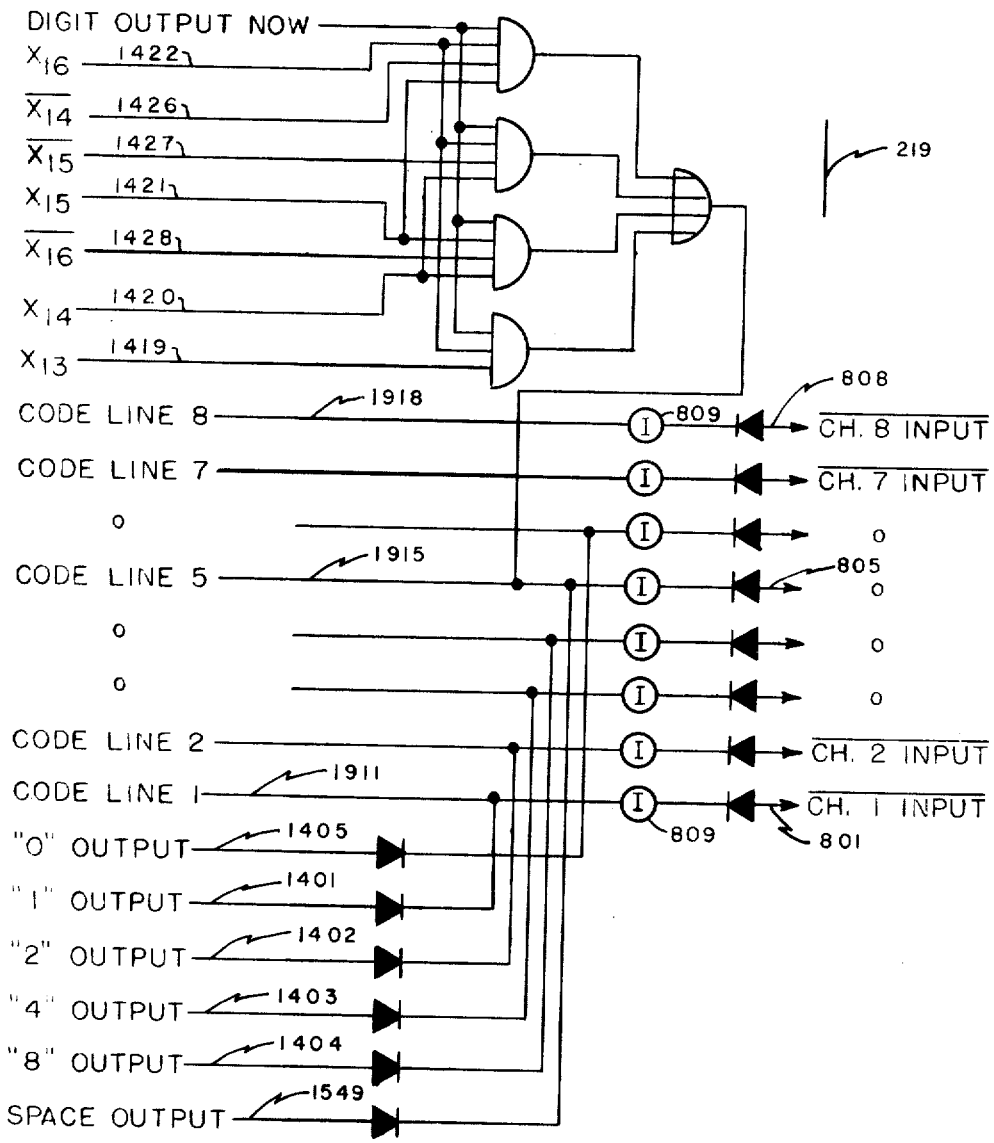
Figure 11A:
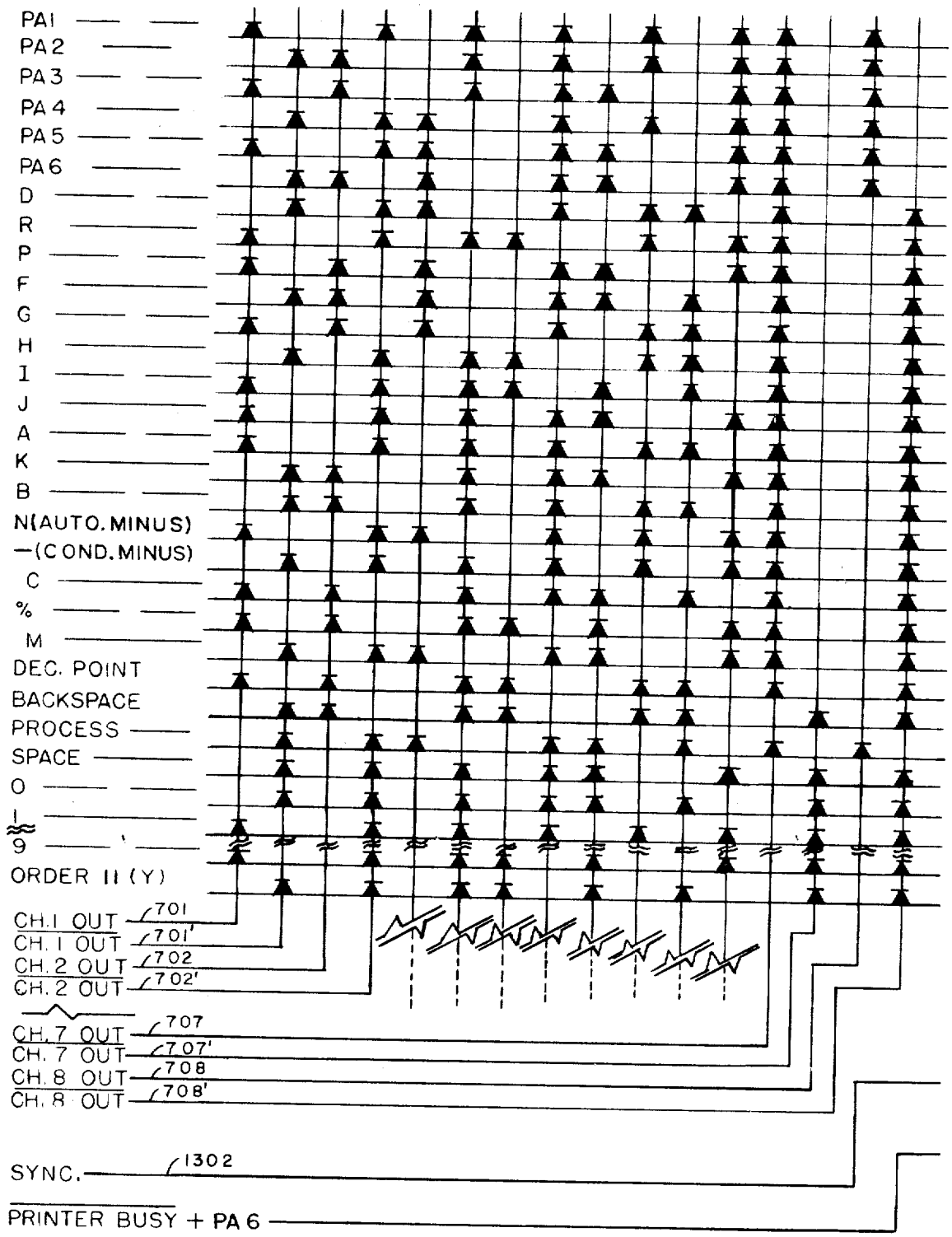
Figure 11B:
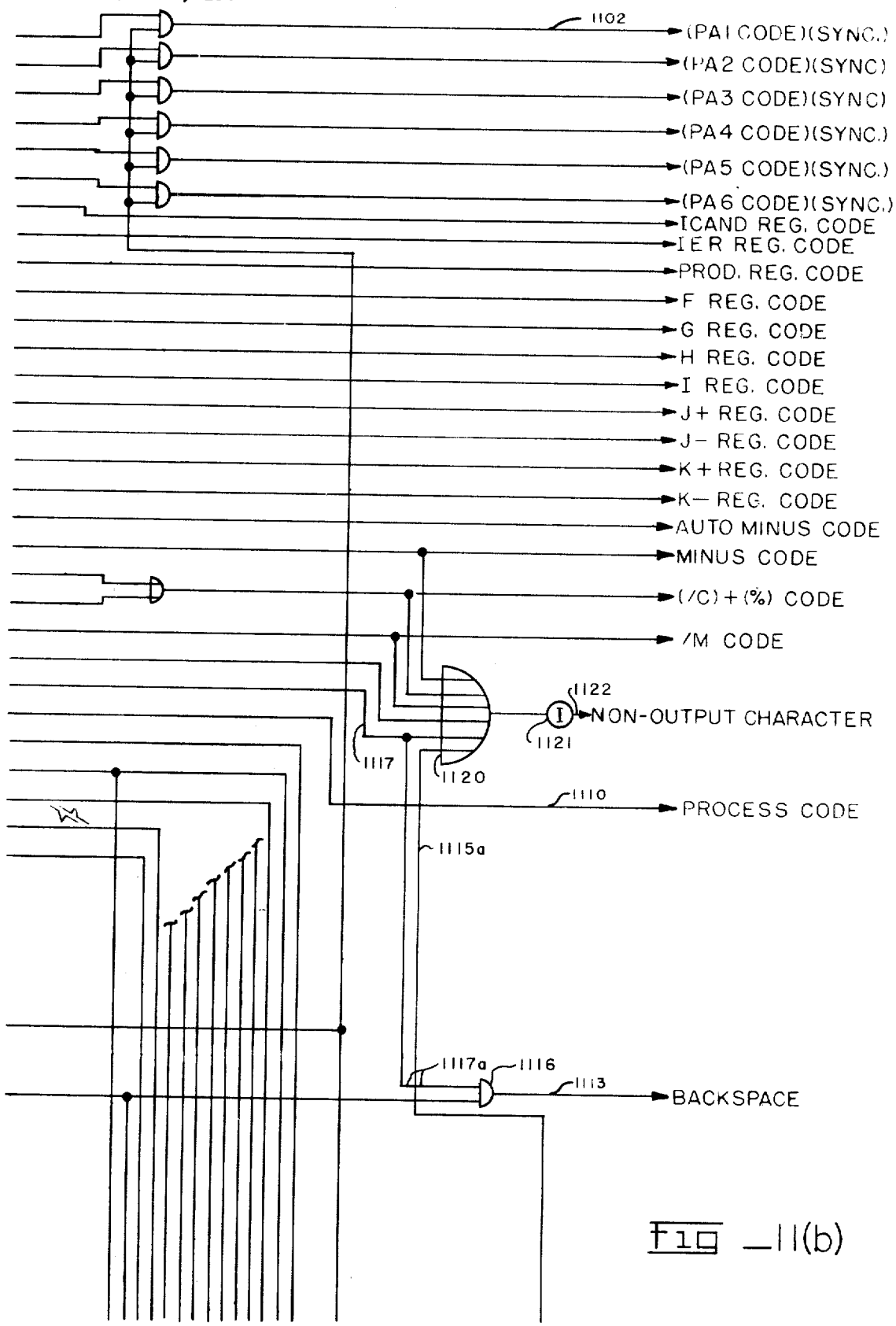
Figure 12D:
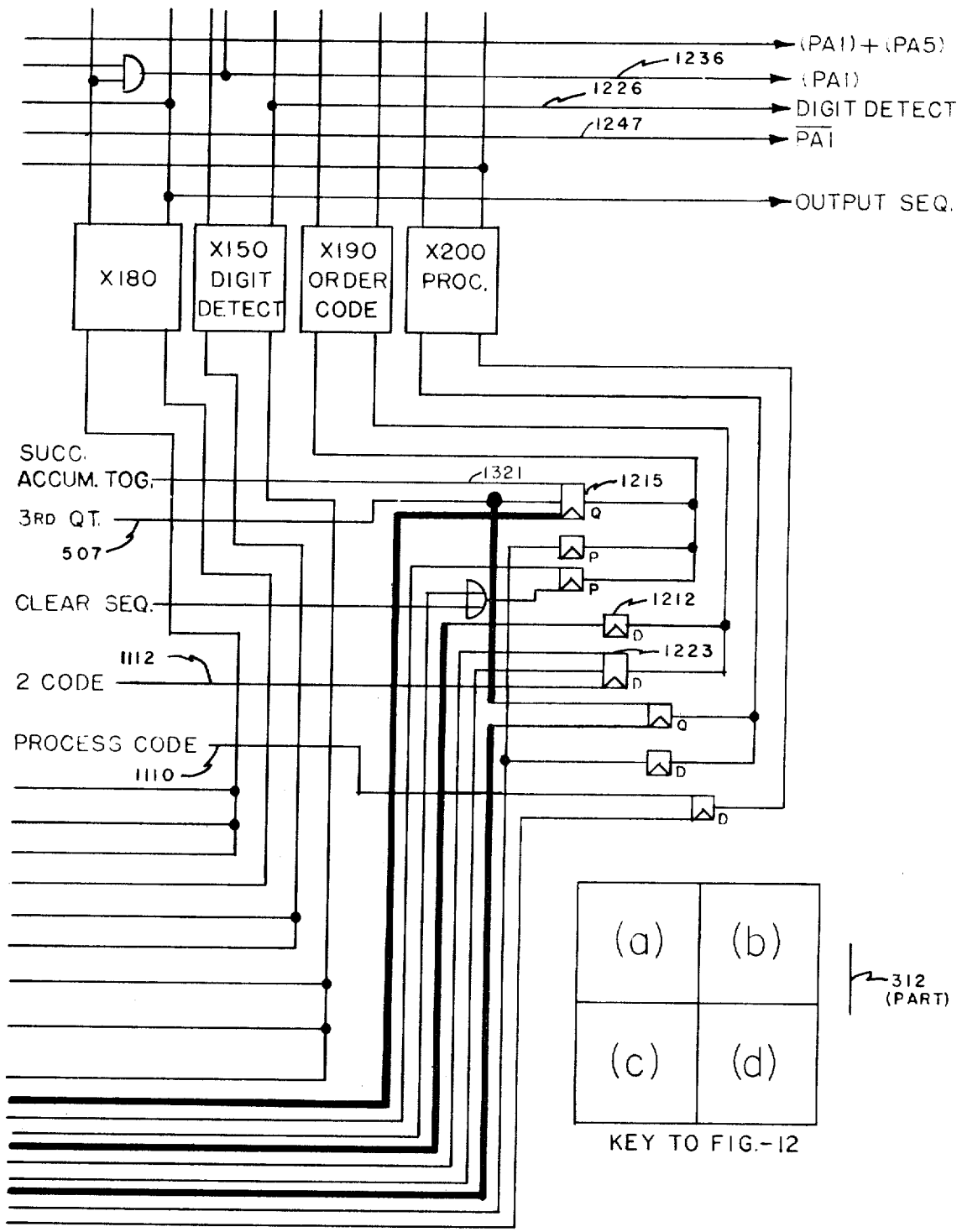
Figure 14B:
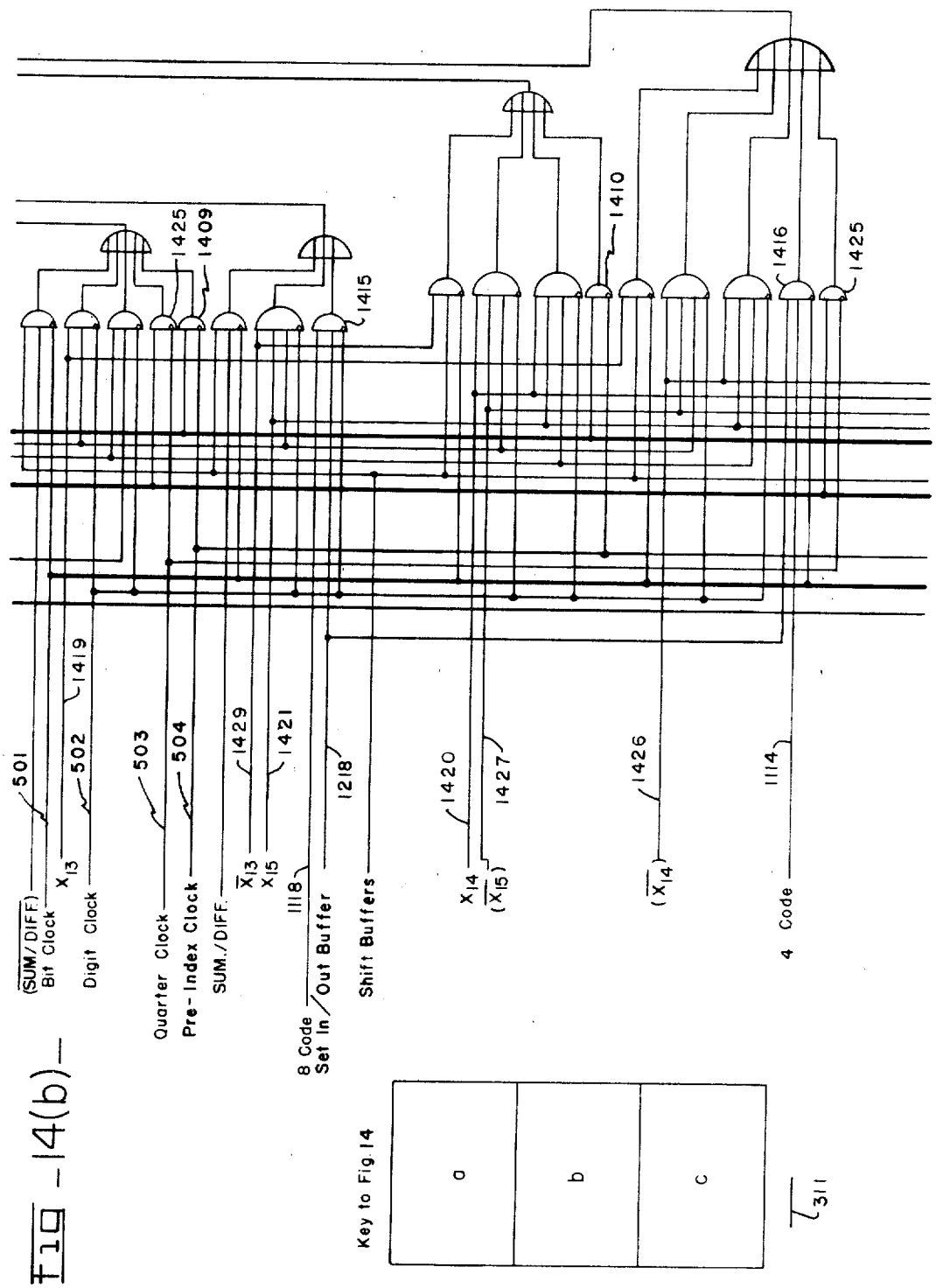
Figure 15A:
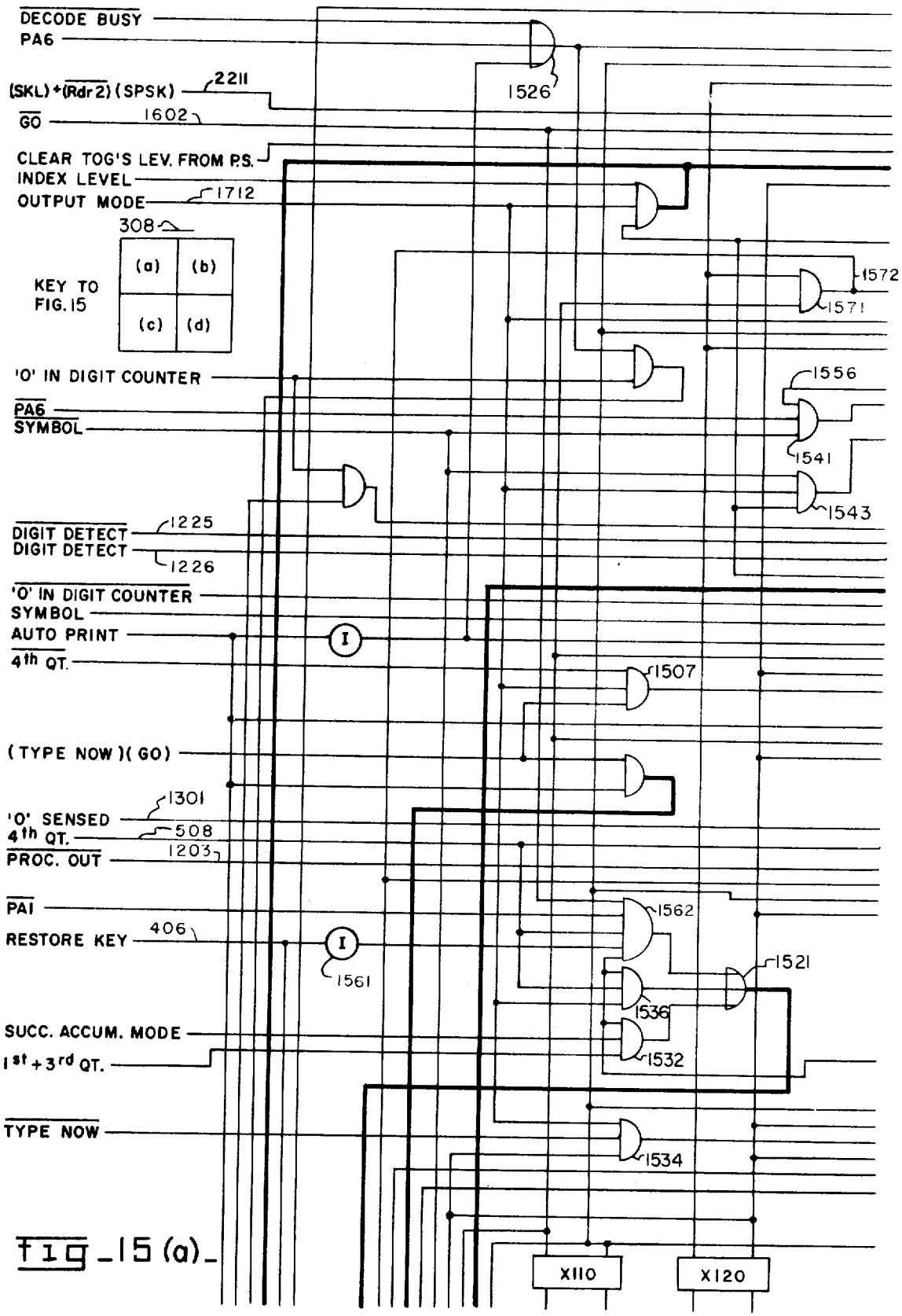
Figure 15B:
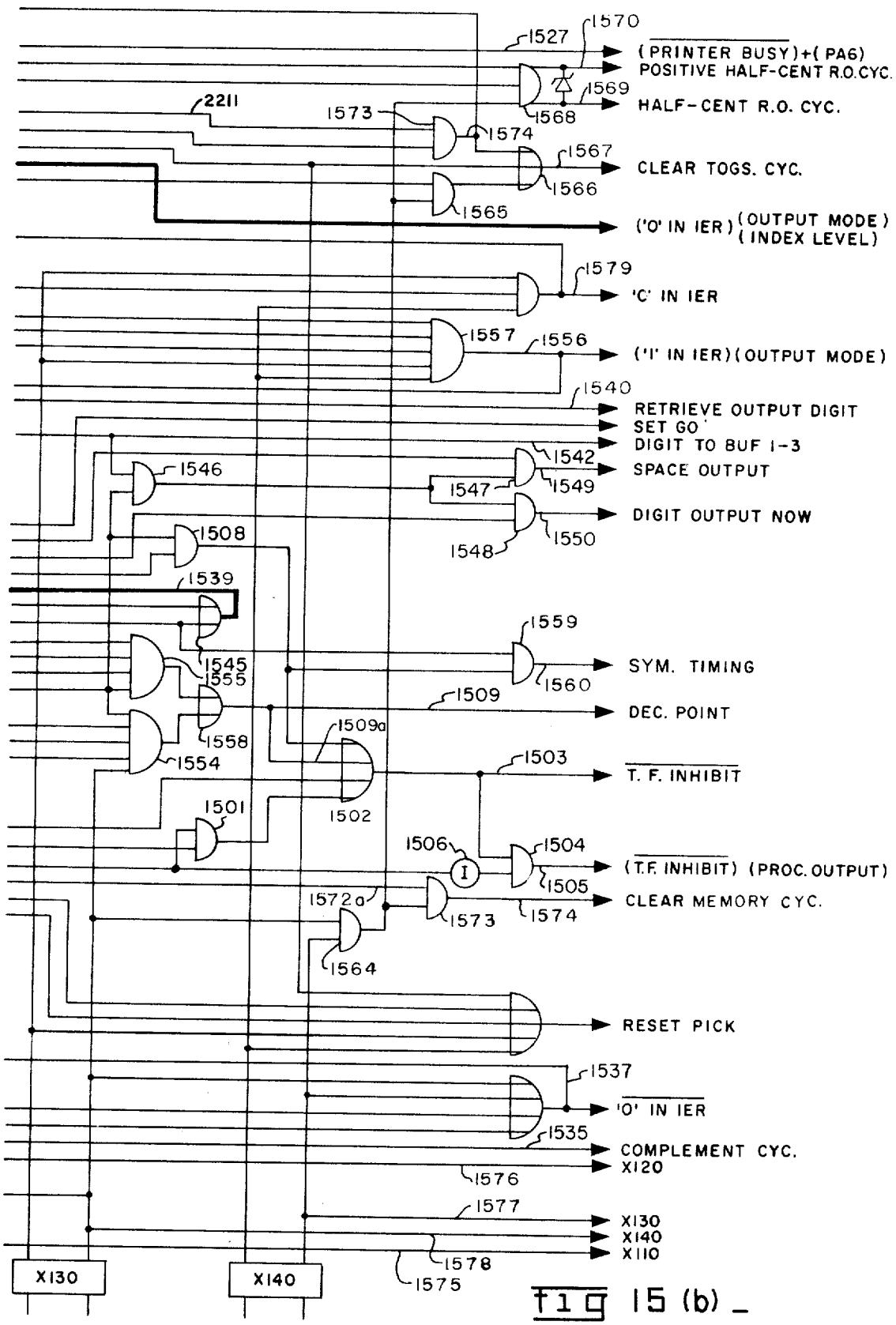
Figure 16:
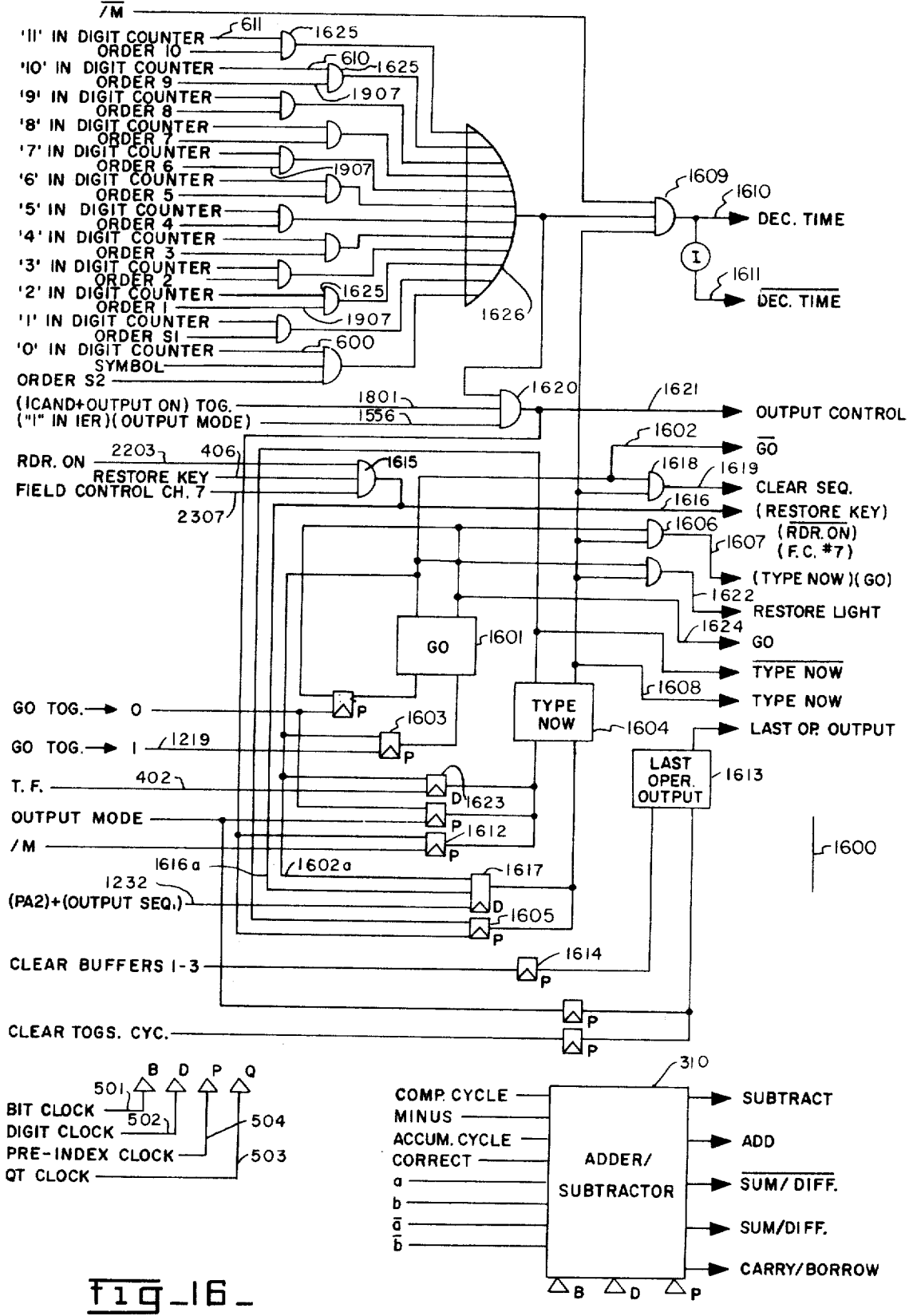
Figure 17:
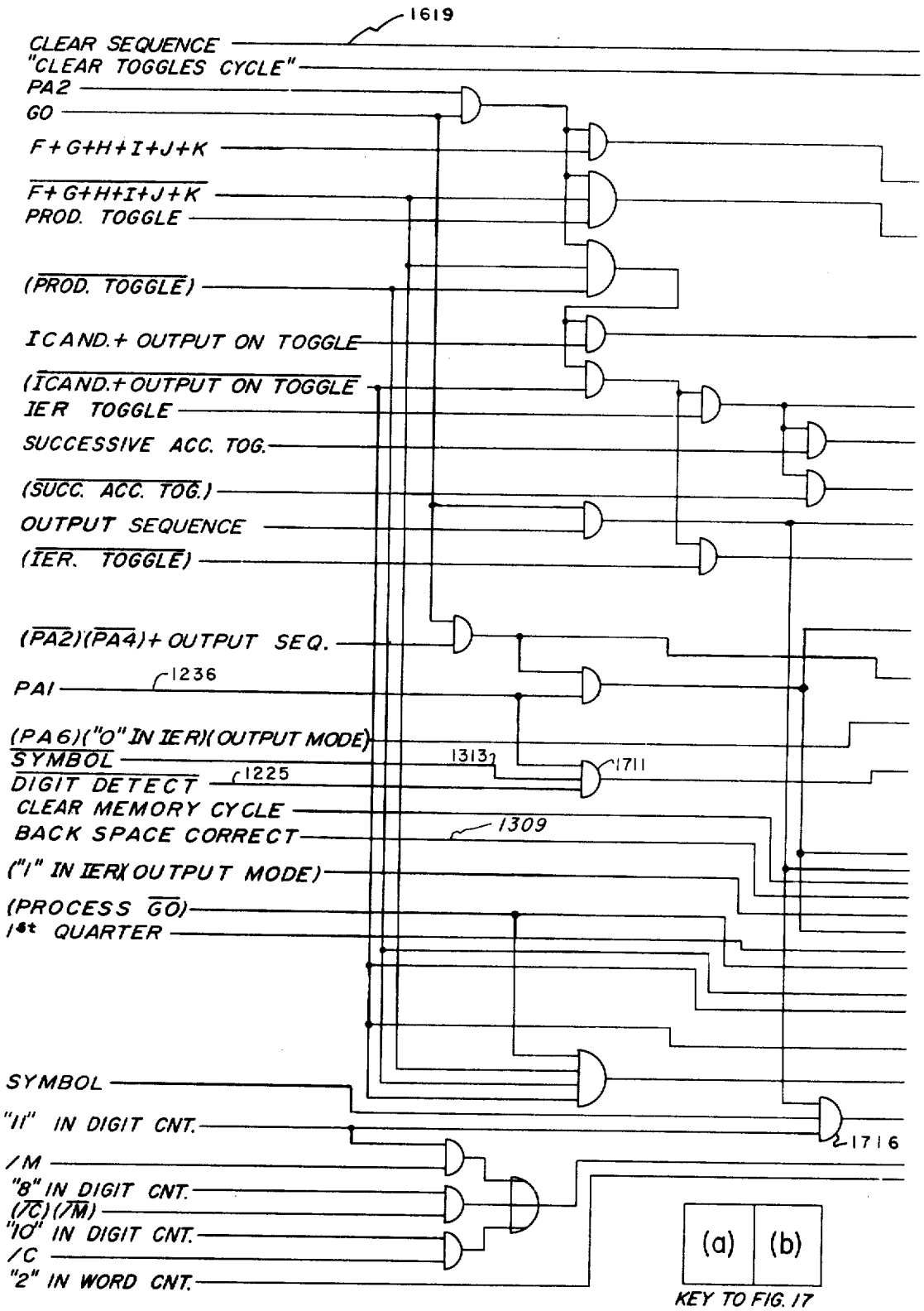
Figure 18A:
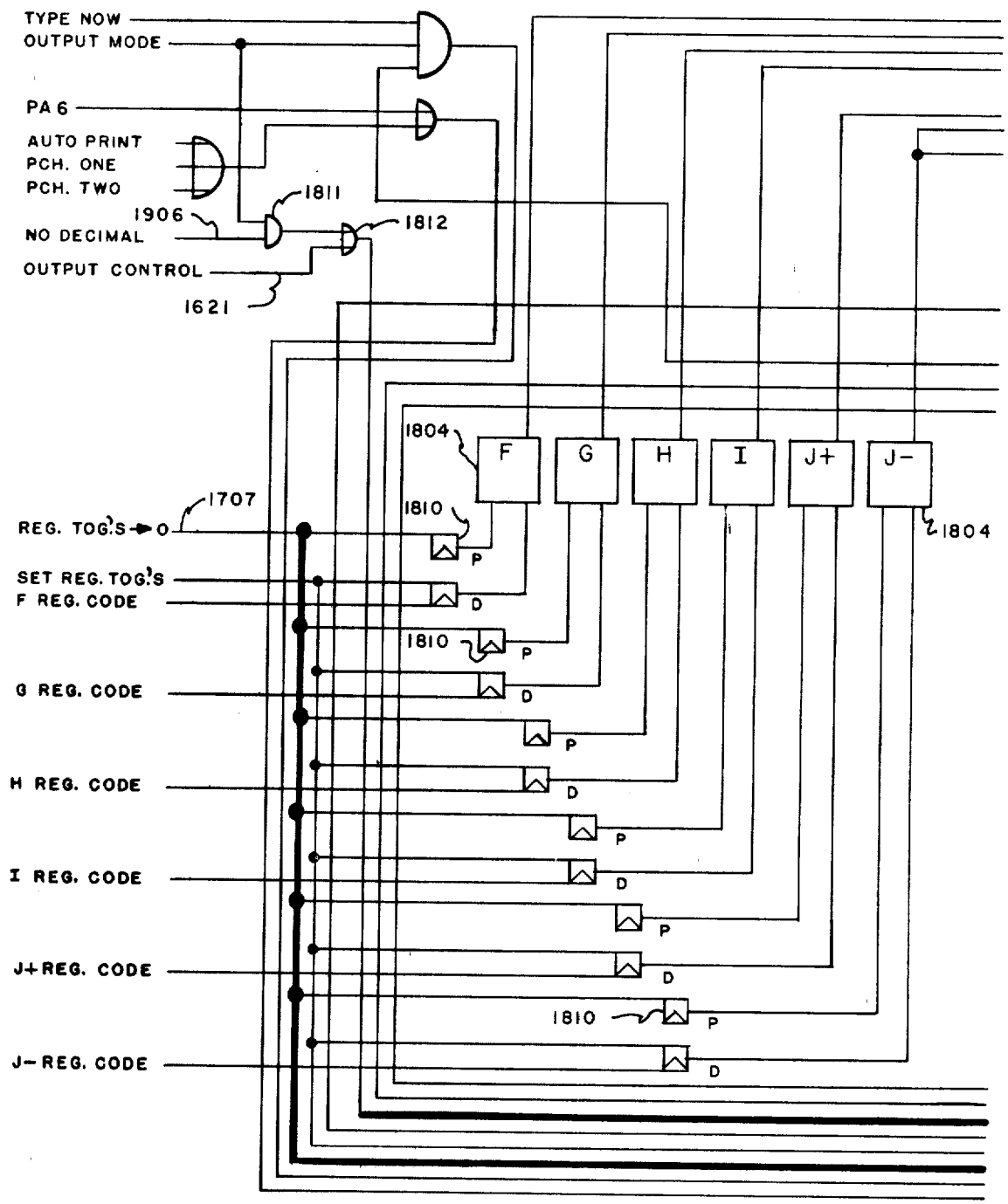
Figure 20:
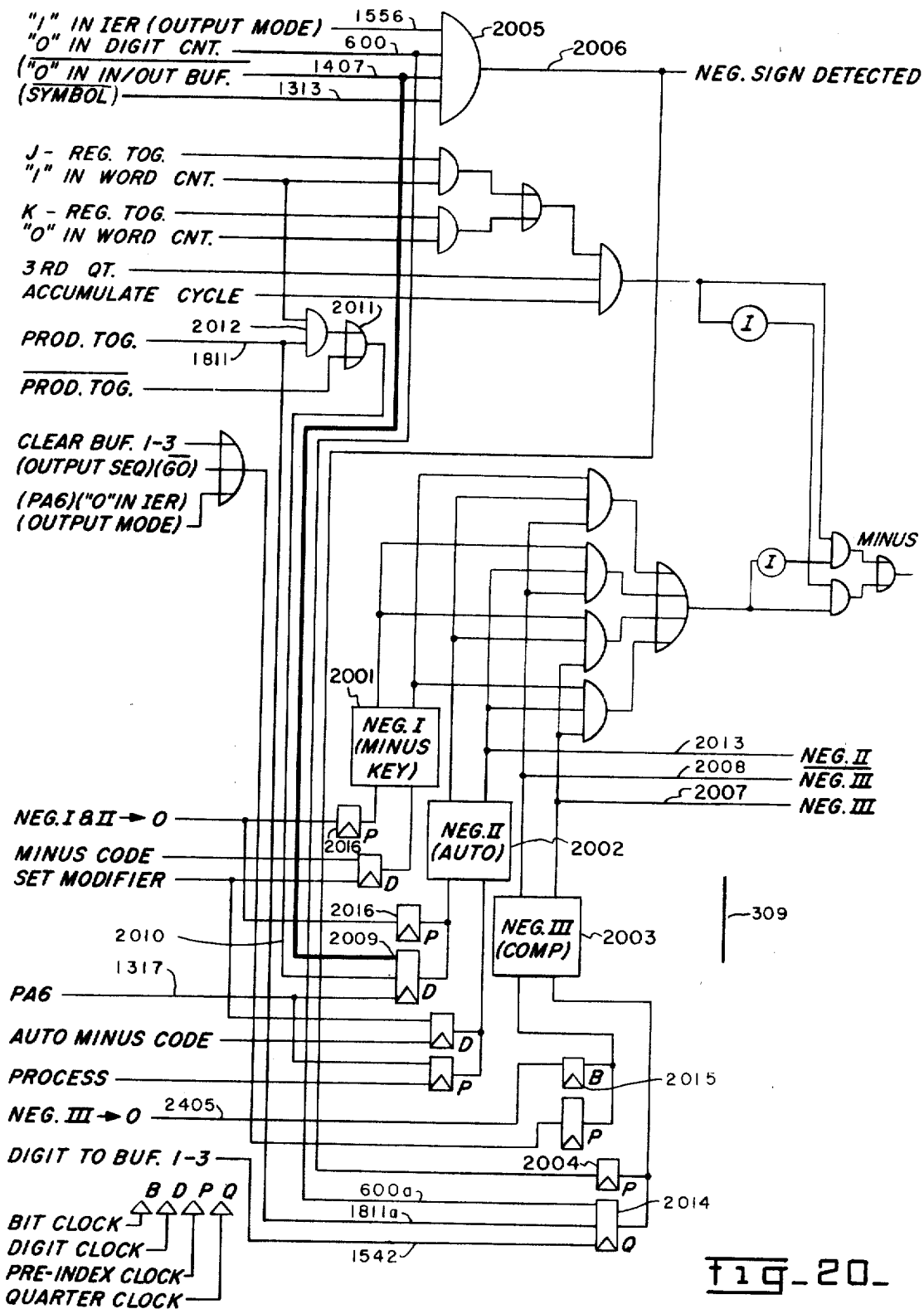
Figure 24B:
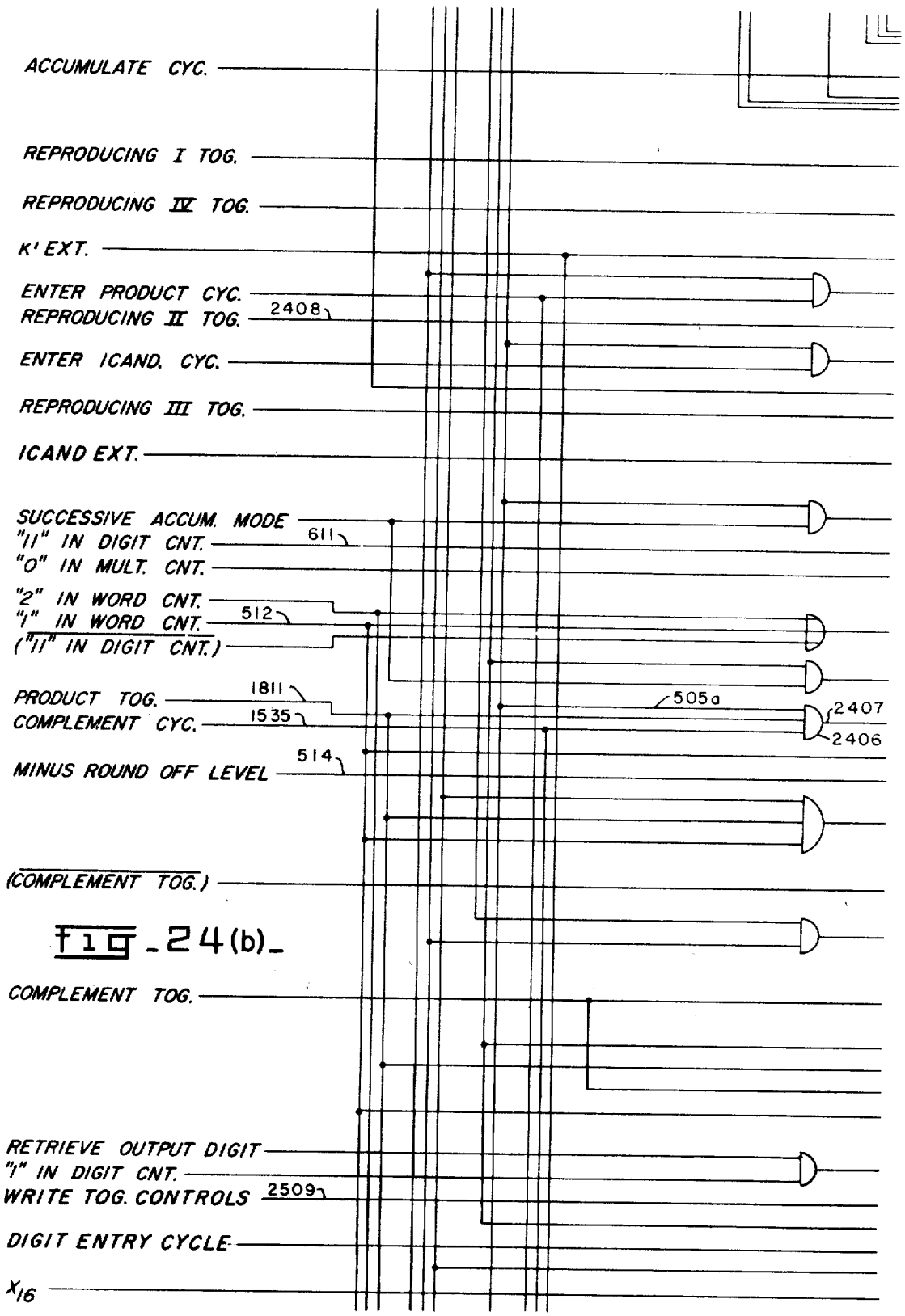

FIG. 4, a logical diagram of the timing means for the system including the interlocking controls with the Processor for synchronization of Processor timing and the general system timing;

FIG. 5a, a block diagram of the clock pulse distributor and quarter revolution counter showing the raw clock pulse input from the disc memory and the various clock pulses and levels generated by these components of the system;

FIG. 5b, a block diagram of the word counter which, in combination with the quarter revolution counter, defines register areas of the memory, showing the necessary inputs and the timing signals which it generates;

FIGS. 6a and 6b, arranged as shown in FIG. 6a a logical diagram of the digit counter defining ordinal positions in each register area of the memory, as modified for the present invention;

FIGS. 7a and 7b, arranged as shown in FIG. 7a, a detailed schematic and logic diagram of the information channels, the decoding means for operating the print bars of the writing machine and the decoding means for operating the perforating elements of the paper tape punch;

FIG. 8, a logic diagram showing the encoder with inputs from the Processor and from the plugboard;

FIG. 9, an expanded view of the principal parts of a record reader showing the photo cell sensing elements and the inputs to the information channels;

FIG. 10, a circuit diagram of the encoder matrix for the writing machine keyboard, including certain common signal generating means;

FIGS. 11a–11c, arranged as shown in FIG. 11c, a combined wiring and logic diagram of the input decoder which provides data and control signals to the Processor, including certain common signal generating means;

FIGS. 12a–12d, arranged as shown in FIG. 12d, a logic diagram showing part of the toggles which define the operation to be controlled when an execute command is subsequently received, together with the output signals generated to control these operations;

FIG. 13, a logic diagram of the remaining control toggles which determine the sequence to be followed;

FIGS. 14a–14c, arranged as shown in FIG. 14b, a logic diagram of the input/output buffer through which data enter and leave the Processor on the way to and from memory, respectively;

FIGS. 15a–15d, arranged as shown in FIG. 15a, a logic diagram of the multiplier buffer which stores the multiplier, times the output sequence, and stores the entry order value during the entry sequence;

FIG. 16, a logic diagram of the toggles that control the input/output sequencing and a block diagram of the arithmetic unit—the adder/subtractor—with the inputs it requires and the outputs it generates;

FIGS. 17a and 17b, arranged as shown in FIG. 17a, a logic diagram showing combinations of various signals to produce others of the Processor sequence control signals;

FIGS. 18a–18c, arranged as shown in FIG. 18c, a logic diagram showing the register control toggles and the decimal control toggles, together with the inputs required to set and reset these toggles and the output signals that they generate;

FIGS. 19a–19d, combined logic and circuit diagrams respectively showing some circuit elements of the output control plugboard, including sample wiring, for providing two formats of output; for generating special output codes for the decimal point, for various sign conditions and for a zero scan operation; for controlling the locking of registers against clearance; and for controlling the extraction of chosen digits in the output from a selected register;

FIG. 20, a logic diagram showing the three sign control toggles;

FIG. 21, logic diagram showing the toggles controlling the on/off state of the various input and recording devices and special modes of operation of the input devices and the system;

FIG. 22, a logic diagram showing the factors controlling the sensing and advancing of the medium in the reader either in step by step fashion or in an idler advance;

FIG. 23, a combined semi-pictorial and logic diagram showing the Field Control for controlling various functions according to the Writing Machine carriage position;

FIGS. 24a–24e, arranged as shown in FIG. 24a, a logic diagram showing the gating for the read and write heads;

FIG. 25, a logic diagram showing the controls for selecting each of the two write heads;

FIG. 26, a representation of a typical invoice which illustrates several aspects of the invention; and FIGS. 27a–27f, arranged in a vertical sequential alignment, a representation of typical instructions on a program for the processing of data to prepare the invoice of FIG. 26.

A few comments should be made about these figures. To begin with, for ease of location in the drawings the reference numerals follow the general rule that all elements and outputs in a given figure are identified by having the first one or two digits of the reference numeral agree with the figure number, the last two digits arbitrarily differentiating the elements and outputs from one another. In this manner, the source figure for any input in a given figure or for an element described in the text can be determined by noting the first digit or two, while ignoring the last two. Thus, elements 401 and 1302 are shown in FIG. 4 and FIG. 13, respectively.

Further, in these figures, the "toggles" (also referred to in the art as "flip-flops" or bi-stable multivibrators) follow the convention that input lines (at bottom) and output lines (at top) on the right of the square (or rectangle) representing the toggle are on the "set" or "one" side of the toggle. Conversely, the input lines and output lines on the left side of the toggle symbol, are considered to be on the "reset" or "zero" side of the toggle. This convention is illustrated in FIG. 14a where the right and left sides of each toggle symbol are denoted by respective 1's and 0's. Accordingly, when reference is made to a toggle being "set" or "turned on," it will be meant that a signal on a right-hand input (at bottom) will have triggered that toggle to a "set" or "one" condition such that a high level appears on the right-hand output (at top) and a low level appears on the left-hand output (at top). This order will be reversed, of course, when the toggle is "reset," or "turned off," that is, returned to the normal, or "zero" condition.

Furthermore, because of the vast number of intersecting lines in some of these diagrams, it was deemed advisable to present certain lines in heavier cross section than others as a guide means while tracing the different circuits. The weight of the lines has no other significance.

It should also be noted that the pulse gates referred to in this specification are shown in two different forms which are logically equivalent. The reason for this is that some of the drawings presented herein are modified copies from a previous application utilizing basically the same computer—namely, application Ser. No. 162,526 (fully identified subsequently). In these copies, the pulse gates are shown in the form of the well-known And gate symbol, a half-moon, together with a triangular clock input symbol near the lower corner, and are always associated with Or gates. In the system disclosed herein it was deemed advisable from point of cost to resort to a modular structure for these pulse gates and to locate the isolation diodes for these pulse gates adjacent the output of the module. Thus when several pulse gates in different locations of the system are connected to the same side of a toggle, there is no one location where an Or gate is physically identifiable. For this reason, a different symbol has been devised to represent the pulse gate module together with the isolation diode. The new symbol is a rectangle with triangular insert at the bottom indicating the clock input, and a letter near the triangle revealing the identify of the clock. This symbol has been used in all new figures, i.e. wherever extensive changes in structure made a copy of a previous drawing inappropriate (see FIG. 6b, for instance).

GENERAL DESCRIPTION OF THE SYSTEM

As shown in FIG. 1, the externally-programmed computer according to the invention combines a Processor 107 with a data-capturing station—comprising coded media (paper tape or edge-punched card) Readers 104 and 104–2, Writing Machine 100, coded media Recorder (paper tape or edge-punched card Punch) 106, and a control unit 122 for the station. The data-capturing station is described in co-pending application Ser. No. 406,321, now U.S. Pat. 3,291,277, entitled "Data Processing System Timing," filed Oct. 26, 1964, and assigned to the same assignee by the inventors, Ronald N. Borrelli and Stanley R. Olson. The Processor 107 referred to above is an electronic arithmetic unit capable of storing factors, performing addition, subtraction, and multiplication on these factors and previously stored data, and then storing the results in a memory device until they are needed. Except for modifications to control logic, Processor 107 is quite similar to the computer portion of the invoicing machine disclosed in co-pending application Ser. No. 162,526, now U.S. Pat. 3,265,874, entitled "Data Processing Devices and Systems," filed Dec. 27, 1961, and assigned to the same assignee by the inventors, Winsor Soule and Eugene P. Binnall. Both the above-mentioned co-pending applications are incorporated by reference so that only details pertinent to the present invention need be repeated here.

As seen in FIG. 2, the inputs to the information channels 208 come from the typewriter encoder 201, which encodes the output of the keys in keyboard 120; from Reader 1 and Reader 2 (104 and 104–2, respectively) which present output signals representing characters in coded form; from the Processor Output 219 which reads the numeric contents of the registers and transmits all or only selected portions (as will be seen) to the information channels 208; and from the Control Code encoder 220 which encodes the output signals of the control keys in keyboard 121. The control keys 121 and the alphanumeric and feature keys in keyboard 120 are used for manual entry of control information and data. The two Readers 104 and 104–2 and the Processor output 219 are used for automatic input of data, control information, and results of calculations to channels 208. At any one time, only one of these various devices will be in control of the system, that is, supplying information to the channels 208. As to the disposition of information in channels 208, it may be transmitted to any one of three receivers—namely, the Processor Input 217, the Punch 106 and the Printer Decoder 202. Printer Decoder 202 comprises decoding means and electromechanical transducers for selectively actuating the various type bars and feature controls of Writing Machine 100, a modified typewriter.

In this system all of the timing is controlled in the ultimate by the timing block 212 in which a source of timing, "Transfer" timing source 213, issues a series of clock signals to control the reading and feeding of the media in the Readers 1 and 2 (104 and 104–2) and to control the strobing of the record units (100 and 106) after their recording elements have been pre-selected according to the information in channels 208. This timing also controls the issuance of the signals from the keyboards 120 and 121. Because Processor 107 is a separately timed unit with different timing, however, there is need for some interlocking, as will be seen.

In the control logic 211, the response philosophy is that developed in co-pending application Ser. No. 157,425 now U.S. Pat. 3,277,448 entitled "Data Processing Mechanisms" and invented by R. N. Borrelli, H. T. Madden, and S. R. Olson. According to this philosophy, a "Code Control On" code in a program tape establishes a mode of operation in which control codes are obeyed but not recorded, and a "Code Control Off" code reverses the mode such that control codes are recorded, but not obeyed. This control philosophy has been extended to the system including Processor 107 and accordingly, when Processor instruction codes are sensed in a paper tape medium by the active one of the Readers 104 and 104–2, the processor controls will respond only if these codes have been preceded by a "Code Control On" code. Otherwise, Processor instruction codes are treated as information merely to be recorded and will not pass through the Processor Input 217, as explained in detail subsequently. Further, according to the present invention, these control codes may be responded to within a Processor Instruction word with the result that characters normally responded to by Processor 107 may be inserted in the sequence without effect upon Processor 107, providing they are preceded by a "Code Control Off" code. Structure for doing this will be described in detail later. The large Or gate labeled Control (115) in control logic block 211 is used to detect "Control" codes for purposes of permitting advance of the media in the active Reader 104 or 104–2 when the Writing Machine 100 is busy with a printing or feature operation as explained in the above-referenced Pat. 3,291,277 (the reference numeral 115 being that used in the referenced patent). It will be noted from FIG. 2 that the output of this Or gate (115) is in parallel with that of the Processor Control Logic 218, which actually forms part of Or gate 115, but is physically located in the console of Processor 107. As seen from the preceding, all information, whether of the nature of instructions (also referred to as "commands") or data, flows through the information channels 208 when being transmitted from one portion of the system to the other. All instructions (commands) pertaining to the input/output units are detected and interpreted in the system control logic 211, whereas those pertaining to Processor 107 are detected and interpreted in the Processor control logic 312, whith feedback to the system control logic 211 as shown by the input "Processor Control Logic" 218. Similarly, the System Timing 212 is modified by signals emanating from Processor 107 via the "Processor Timing" input 207. This is also seen from the Processor block diagram of FIG. 3, where the Processor Input 217 is more precisely defined as an Input Decoder (details shown in FIG. 11) and the Processor Output 219 as an Encoder (details shown in FIG. 8).

The sequence control is provided herein mainly by means of a program on a perforated medium 123 (paper tape) sensed by a Record Reader 104, with output control by means of a Plugboard 124 and with means for operator control through Keyboards 120 and 121. Field Control 103 is a control device responsive to the position of the carriage 108 of Writing Machine 100, its function being limited to control of the activity of one (or more) recording devices 106 and Record Reader(s) 104 and to prevention of a "Restore" operation except in programmed positions, as will be described. In Processor 107 none of the program instructions are stored in memory (see the block diagram of FIG. 3), which memory comprises a magnetic memory disc 301 providing seven general storage Registers 316, designated by the letters F through K and P (nominally a Product Register), a Multiplicand (1st Factor) Register 317, designated by the letter D; and three Buffer (Temporary Storage) Registers 318, designated by B1, B2 and B3, for input to and output from programmed ones of registers 316 and also for storage of the multiplier (2nd Factor) in a multiplication. The arrangement of Disc 301 is identical to that disclosed in previously mentioned Pat. 3,265,874 except for two major changes. First, the register designations have been changed to agree with the letter code used for addressing the respective registers. Second, the timing tracks 302 (dividing the disk into quarters, each quarter containing three registers of ten digital orders plus sign and a spare) and 303 (further sub-dividing each digital area into five bit areas) were relocated for greater accuracy.

For operation of Processor 107, the programs comprise variable-length series of characters on program tape 123 (often a loop) scanned by a Reader 104, as mentioned earlier. These variable-length instruction words always begin with one of six operation-defining codes, referred to hereinafter as "Processor Access" codes and designated by the letters PA together with a characteristic numeral from one to six to differentiate between the various sequences. The Processor Access codes are followed in the instruction words by Instruction codes, Modifier codes and an "Execute" code. The Instruction codes comprise alphanumeric codes which—if numeric—select the initial order position for entry or an alternate format for output, and—if alphabetic—select the storage or factor register involved. The Modifier codes determine whether decimal shifts or changes in sign are required and select the alternate one of two possible formats for control of output. Lastly, the "Execute" command, referred to hereinafter as the "Process" code, initiates the sequences called for by the characters of the Instruction word.

Each code in the program tape 123 is composed of eight elements in the preferred embodiment and these are transmitted in parallel to Processor 107, where they are decoded in the Input Decoder 217 and an appropriate signal sent to Processor control circuits 312 in synchronization with the timing pulse, TF, on line 402 (source shown in FIG. 4) from system Control Unit 122.

The six Processor Access Codes and the control sequences they define are:

(a) Information entry and processing codes; "PA1" and "PA2"

"PA1" conditions Processor 107 such that external information from the keyboard 120 of Writing Machine (100) or from a data tape (or edge-punched card) 125 in another Reader 104–2 (identical with Reader 104) is entered in Buffer registers 318 and subsequently transferred to one or more of the Storage or Factors Registers 316, 317 in memory disc 301.

"PA2" conditions Processor 107 for an internal accumulative transfer from Buffer Register 318 to one or more of the Storage or Factor Registers 316, 317 in memory disc 301. In the case of choice of the Multiplier or Second Factor Register, no permanent storage area is assigned, and the digits of this factor remain in Buffer Register 318. Further, in this case after the Process code is received, a multiplication sequence is started (not always initially, because sometimes intervening cycles have to be completed—as will be seen) in which the First Factor stored in register area 317 (Icand or D register), is accumulated successively with the contents of the Product Register 316, under the digit-by-digit control of the second factor information in the Buffer Register 318.

(b) information output codes: "PA3," "PA4" and "PA5"

"PA3" conditions Processor 107 for normal output from a designated portion of a selected Storage Register 316 to the Punch(es) 106, Writing Machine 100, and the Buffer Registers 318. The selected Storage Register 316 is cleared after this sequence;

"PA4" conditions Processor 107 for zero output from all but a designated portion of a selected Storage Register 316, the output otherwise being the same as a PA3 sequence. The portion of the register transmitted as zeros is determined by the program in the "Extractor" portion 1940 of Plugboard 124, as described below, and the selected Storage Register 316 is cleared after this sequence unless prevented by the program in the Register Lock portion 1930 of Plugboard 124.

"PA5" conditions Processor 107 for output from a designated portion of a selected Storage Register 316 in the same manner as a PA3 sequence with the additional transfer of this output to the Multiplicand Register 317, the selected Storage Register 316 again being cleared after this sequence unless prevented by the program in Plugboard 124.

(c) "Zero Scan" code, "PA6"

"PA6" conditions Processor 107 so that a selected Storage Register 316 can be examined for zero content. If this Register has a zero content, a particular code is programmed in the Symbol Coding portion 1910 of Plugboard 124 will be transmitted to Information Channels 208.

The Instruction Codes and the functions they perform are:

(a) Address codes

These comprise the letter codes F, G, H, I, J, K, P, A, B, D and R which select corresponding Storage or Factor Registers. The first seven of these (F, G, H, I, J, K & P) select their respective Registers 316 for input, transfer or output. The next two codes, A and B, select Storage registers J and K, respectively, for sign-reversed input only. The last two codes, D and R, select the Factor Registers. The former selects Multiplicand Register 317 for entry only, whereas the latter causes the Multiplier merely to be entered in Buffer Registers 318 and also conditions Processor 107 for multiplication, as mentioned previously.

(b) Modifier codes

The C and M codes modify the normal entry instructions, being interpreted by the system as /C (or percent) and /M, respectively, when encountered in an Instruction word. Sensing of these codes results in shifting the decimal two places and three places, respectively, to the left. Other "Modifier" codes are the codes N and "—", which are sign reversal codes affecting the sign of entry into the selected Register algebraically, i.e., two negatives making a positive. The N code is a nonprinting character and the "—" code is a printing minus, as will be explained.

When not preceded by another numeral code, the numeral codes—and the Y code in certain cases—are address codes which designate the storage position that the first digit of information is to enter. Codes 1 through 9 select corresponding order positions in any Register 316, 317 or 318 for entry of the first digit, 0 selects the tenth order position for entry, and Y selects the eleventh order position when entering the Multiplicand register 317 or entering the Multiplier in Buffer Registers 318. These codes may be used immediately after the PA1 code, but this is not necessarily so, as will be explained subsequently.

In the "Output" and "Zero Scan" sequences (PA3, PA4, PA5, or PA6), the numeral code 2 (3, 6, 7 also) is used in the instruction word to select an alternate format for output from the selected Register 316. Two output formats (i.e., the order at which output is to start, the position of the decimal, and the order at which output is to stop) can be determined for each Register 316 by the program in Plugboard 124. The first format is regularly chosen in the absence of the 2 code, but if the 2 code is present in the instruction word, the second format for the selected register 316 will be chosen, as will be explained.

Figure 19A:
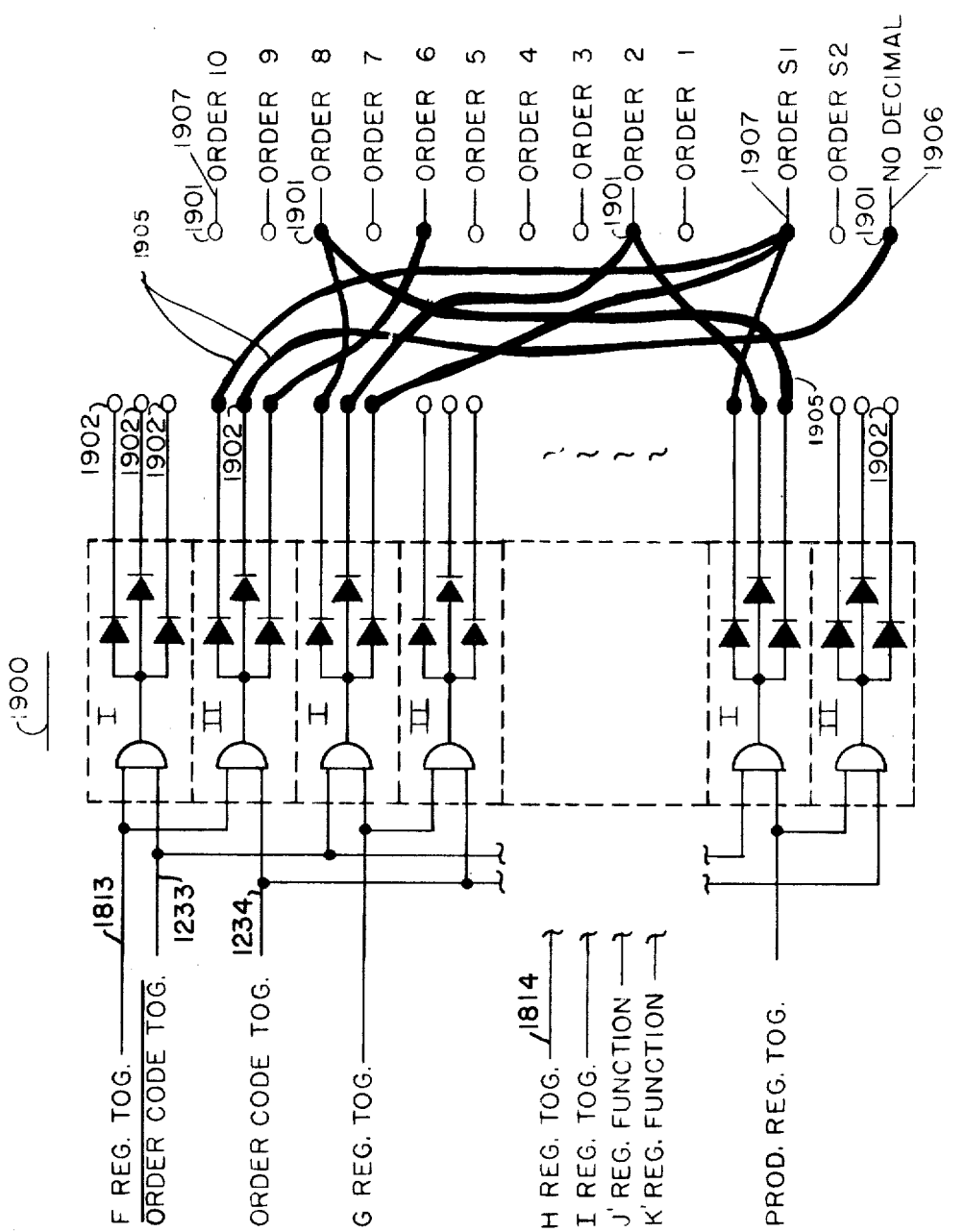

The Process Code follows the Instruction Codes, and is thus an "Execute" command, initiating the processing of the data according to the PA instructions which precede it. This code is present at the end of all sequences of instruction characters and therefore denotes the end of the instruction word. Plugboard 124 is a manually settable patch board used to provide instructions during output sequences. This board (see FIG. 19a, b, c, d) consists of four sections:

(1) Length of Type Out Coding 1900: This section, shown in FIG. 19a, is used to indicate the start order, decimal order, and stop order of output from the individual Storage Registers 316. Two formats are available for each Storage Register 316, as mentioned above, the 2 Code being used in an output instruction word as a command to choose output according to the second format. Section 1900 contains a number of program holes 1901 defining times corresponding to each order of a register, times for a decimal output and for output of two symbols. Further, three program holes 1902 are provided for each Storage Register 316 in both Format I and Format II, the circuit for each format group being enclosed in dashed lines and appropriately labeled in FIG. 19a. The top hole 1902 of each group ordinarily is used for determination of the order for start output, the middle hole 1902 for the order for decimal output, and the bottom hole 1902 for the stop order, but again this arrangement is not a strict requirement as will be seen. For example, connecting one terminal 1902 of the Format I group of three terminals for registers G and P to the "Order 8" terminal 1901 by means of two patchcords 1905 as indicated in FIG. 19a, will cause output to start with the 8th order when these registers are selected for output. Similarly, connecting another terminal 1902 of each of these two Format I groups to the "Order 2" terminal 1901 will cause the decimal code (programmed in the Symbol Coding Section described subsequently) to be transmitted between the output of the 3rd and 2nd orders of that Register. If the decimal is not desired, hole 1902 must be connected to the ND (no decimal) hole 1901. Connecting a third terminal 1902 to the "Order S1" terminal 1901 will cause the output to stop after the least significant digit. If one symbol is desired, one terminal 1902 is connected to "Order S2" terminal 1901, and if two symbols are desired, the third terminal 1902 is not connected to any order hole 1901.

(2) Symbol Coding: This section is used to assign the output codes for the decimal, for two symbols of a negative output (Neg. 1 and Neg. 2), for two symbols of a positive output (Pos. 1 and Pos. 2), and for the zero condition when sensed in a "Zero Scan" or "PA6" sequence. For this purpose, five program terminals 1902 can be connected to selected ones of terminals 1901 which are, in turn, connected via leads 1911 through 1918 to Encoder 219 of Processor 107, as seen from FIG. 8, and thus any code having no more than five out of eight bits in the unit condition can be selectively generated at Decimal Time, Symbol Time, and "0" Sensed Time.

Figures 19C, 19D:
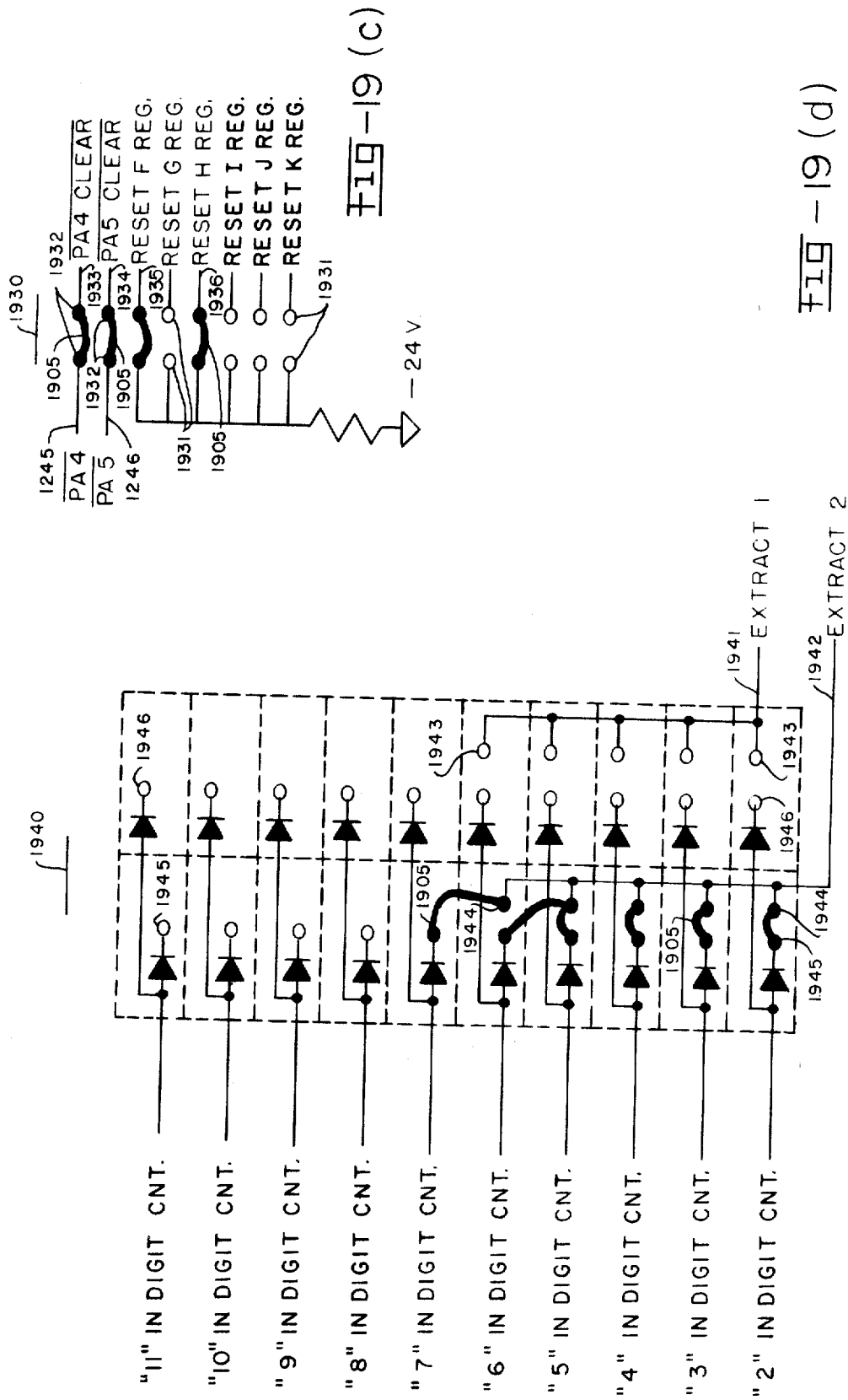

(3) Register Locks: Section 1930 shown in FIG. 19c is used to prevent clearance of registers F, G, H, I, J and K during a "Clear Storage" sequence. When the program terminal pair 1931 available for each of these Registers are inter-connected by means of a patch cord 1905, that register is locked against any clearance, in fashion similar to that disclosed in application S.N. 162,526. Also contained in this section are "PA4 and PA5 Locks." When the pair of program terminals 1932 available for each of these latter functions are connected, as by a patch cord 1905, the contents of the selected Register will not be cleared at the end of the particular sequence, by means described later.

(4) Extractor: Section 1940 of Plugboard 124 is used to output zeros in the programmed order positions during a PA4 sequence. As shown in FIG. 19d, two formats are available, X1 and X2, and the 2 code is again used as a command to choose the latter format, the means for accomplishing this being shown in FIG. 24, discussed later.

SYNCHRONIZATION OF PROCESSOR AND CONTROL UNIT

Because the magnetic memory 301, which provides the timing for Processor 107, is rotated through one revolution every 17 ms., approximately, whereas multivibrator 401 (FIG. 4), the basic source of timing for the components of the data-capture station, operates at about 33 ms./cycle, it is necessary to synchronize any interaction between them. In order to synchronize the flow of information from Processor 107 to Output Units 100 and 106, the levels "$\overline{\text{TF Inhibit}}$," "Proc Out," "$\overline{\text{Proc Busy}}$," and their inverts are transmitted—singly and in various combinations—to Control Unit 122. In order to synchronize the flow of information from Reader 104 or the keyboards 120 and 121 to Processor 107, the level "Sync"—essentially timed by the TF pulse, as shown in FIG. 13—is transmitted to Processor 107.

The level "Proc Out," produced on line 1202 by AND gate 1201, indicates that the Processor is in an Output Sequence, that is, toggle X180 (FIG. 12d) is set and an Output Unit is on ("Icand+Output On Tog" level is present on line 1801), and actual performance of this output has started (the Process Toggle X200 now being in reset condition, a high level is present on input 1204 to And gate 1201). The "Proc Out" level on line 1202 is used to produce the following:

(1) A signal, T/W Decode Strobe, to cause the decode relays 709 of Writing Machine 100 to set up the relay tree contacts 710 provided the code being transmitted by Information Channels 208 is not a Control Code ($\overline{\text{Control}}$) "Auto Print" is high, and a TF pulse is present, as shown in FIG. 7, where an output from And gate 711 through Or gate 712 and Inverter 713 will cause relays 709 to be actuated selectively according to the levels on the Channel Output lines 701–708 of Information Channels 208. Further, the same signal will arm pulse gate 714 such that it is triggered at the trailing edge of the TF pulse on line 402 (because differentiating circuit 715 is present) and, in turn, initiates a cycle of Decode O/S 716 to strobe the relay tree 710. Note that feedback on line 717 is used to hold Decoding Relays 709 operated so long as the contacts are being strobed.

(2) A signal, Punch Strobe, which enables the Punch 106, if selected, to record the code on channels 208. When the level "Proc Out" is present, i.e., the Processor is outputting, and the code being transmitted is not a Control Code, i.e., the level "$\overline{\text{Control}}$" is present, an output from And gate 720 will result in an output from Or gate 721. Assuming Punch 106 is selected and that a TF is present, then through And gate 722 and an Inverter 723 (actually an inverting buffer required because of the power requirements of the punch solenoids 718 and the feed solenoid 719) a negative level will appear on the common lead 724 to one terminal of each of these solenoids. Whichever of the solenoids 718 has a high level on the Channel Output line 701–708 to which its other terminal is connected will then operate, together with the feed solenoid 719, the other terminal of which is connected to a source of positive voltage (ground in this embodiment), thus recording the code and advancing the tape.

The inverted output 1203 of And gate 1201, a level labeled "$\overline{\text{Proc Out}}$," indicates that Processor 107 is not transmitting information to Information Channels 208. This level in turn produces the following levels:

(1) Reader One/Two Enable, which enables the selected Reader 104 or 104-2 to read codes during TF time (refer to FIG. 22) through And gate 2213 and Or gate 2214, the level on line 2215 then being high.

(2) Reader One Step, which enables Reader One (104) to step at TF time during a Special Skip operation (refer to FIG. 22) through And gate 2216 and Or gate 2217, the level on line 2218 then being high.

(3) $\overline{\text{TF Inhibit}}$, which enables multivibrator 401, is a level produced by Or gate 1502. When this level is present, ($\overline{\text{TF Inhibit}}$ high), it will enable the TF Multivibrator 401 if other conditions are proper, as follows:

When information is to be received by Processor 107 from a Reader 104 via information channels 208, the TF Multivibrator 401 will be enabled during the 4th Quarter of a revolution of Memory Disc 301 provided Processor 107 is not outputting information. For this mode of operation, as shown in FIG. 15, the level "(4th Qt.) ($\overline{\text{Proc Out}}$)" produced by And gate 1501 will pass through Or gate 1502, giving rise to the level "$\overline{\text{TF Inhibit}}$" on line 1503, thus enabling multivibrator 401 through And gate 410 and Or gate 405.

The level "$\overline{\text{TF Inhibit}}$" is also And gated with the level "Proc Out" (obtained from line 1203 through another inverter 1506). When both of these levels are present at the inputs to And gate 1504, the output "($\overline{\text{TF Inhibit}}$) (Proc Out)" on line 1505 will be passed by Or gate 405 and will enable multivibrator 401 so that information can be received from Processor 107 during an Output Sequence. When digits and Symbols are to be transmitted to the information channels 208, the level "Proc Out" will be present and the levels "(0 in Ier), ($\overline{\text{4th Qt.}}$), (Output Mode), and (Type Now) (Go)" through And gates 1507, 1508 and Or gate 1502 will produce the level "$\overline{\text{TF Inhibit}}$" on line 1503. The terms "0 in Ier" is used to determine the rate at which this information is to be transmitted (explained in detail in application Ser. No. 162,526) the term "$\overline{\text{4th Qt.}}$" is used to terminate output of this signal before the next revolution of Disc 301 is started, and the term "Type Now" is used to identify the portion of the selected Register programmed for output to the recording devices (100 and 106) under control of Plugboard 124. When it is time to transmit to information channels 208 the code programmed in Plugboard 124 for the Decimal position (see (FIG. 19b), the level "Dec Point" on line 1509a will also enable Multivibrator 401 through Or gate 1502, And gate 1504 and Or gate 405. Again, during a sequence (PA6, defined subsequently) when the content of the selected Register 316 is scanned, to determine whether it is zero, the level "0 Sensed" on line 1301 will also produce the level "$\overline{\text{TF Inhibit}}$" through Or gate 1502 so that a code programmed in Plugboard 124 for output in such case (see FIG. 19b) can be transmitted.

The level "$\overline{\text{Proc Busy}}$" on line 1207 (see FIG. 12)— produced by inverting (through inverter 1206) the output of And gate 1205—indicates that Processor 107 is not performing an operation that will affect the Information Channels 208. This level, together with the level "Reader Step Enable," which is the output of Or gate 2201 on line 2202, and the unit state of the toggle 2101 or 2103 for the selected one of (Readers 104 or 104–2), respectively, enables the stepping of that Reader when a TF signal occurs on line 402. When the $\overline{\text{Proc}}$ $\overline{\text{Busy}}$ level is absent from line 1207, Processor 107 is considered busy and stepping of the selected Reader will stop. This is necessary when the Processor is outputting—identified by the combination of levels "[(Proc Out)+(X180)](Go)"— or when a PA code is sensed in the active Reader 104 or 104–2 while the Processor is multiplying—identified by the combination "(PA Code) (Sync) ($\overline{\text{X170}}$) (Go)." The combinations are obtained by means of Or gates 1208 and 1209, which supply two of the three inputs to And gate 1205, and by the "Go" level on line 1624 which is the third input.

The pulse "Sync," used to synchronize the Processor to the Control Unit 122, is produced on line 1302 during TF time only when the system is in a "Code Control" mode and neither reader is in Skip mode of operation. The pulse "Sync," which is actually the filtered (filter capacitor not shown) output of And gate 1322 as shown in FIG. 13, is used to enable the following operations (discussed individually in detail later):

(1) Set appropriate ones of the Toggles X170, X160, X180 (FIG. 12d) or 1316, when a PA code is received from information channels 208.

(2) Set the Order Code Toggle X190 (FIG. 12d) when the 2 code is received during an Output sequence.

(3) Produce the "Set Modifier" level on line 1210 so that the /C, /M, Neg 1 or Neg 11 Toggles (1802, 1803, 2001, 2002 and 2003, respectively) can be set if a corresponding decimal modifier code and/or a negative code is received from the information channels 208.

(4) Produce the "Set Reg. Togs" level on line 1211 so that the F, G, H, I, J+, J—, K+, K—, Prod. Icand+Output on, Ier or Process Toggles (1804, 1809, 1808, 1813 or X200) can be set when their respective codes are received from channels 208.

(5) Produce the "Digit Detect Level" on line 1101 when a digit code is received so that the Digit Detect Toggle X150 (FIG. 12d) will be set during a Digit Entry Cycle.

(6) Set the Symbol Toggle 1306 when a Backspace Code is received during a PA1 sequence.

Another level having the nature of an interlock is "Processor Ready" on line 1241, the output of And gate 1242. The level "Processor Ready" indicates that the Processor is not in course of executing the instructions presented in an instruction word, and can therefore accept a Processor Access code, if sensed at the Reader 104. This level will not be present on line 1241 if any one of the toggles X160, X170, or X180 (FIG. 12) or the "Go" toggle 1601 is set.

INPUT

The input, or PA1, sequence is used to enter digits manually from the keyboard 120 or automatically from the tape 125 of Reader 104–2 into selected register areas 316, 317 and 318 on the Disc Memory 301. A PA1 command sequence must contain at least the following codes:

PA1, Order, (Digits), Register, and Process

The parentheses have been placed around the Digits here to indicate that in addition to automatic entry, they may be entered manually if the program in Reader 104 transfers control to the operator (shown in the discussion of the sample program presented in FIG. 27).

The PA1 sequence may include additional instruction codes, such as a decimal modifier or a sign reversal. These codes are transmitted from the active reader 104 or 104–2 to the Input Matrix 217 in Processor 107, where they are decoded and appropriate signals sent to other portions of Processor 107 in synchronization with the TF pulse from the Control Unit timing source 401, as will be described in greater detail below.

The PA1 code (Ch. 1, 7, and 8 in this embodiment, see FIG. 11a, although limitation to this particular code is not to be implied) when transmitted to the Processor Control 312 sets Toggle X170 (FIG. 12) to indicate that a PA1 sequence is to take place. A PA1 sequence is indicated only if Toggle X180 (FIG. 12) is reset, since a PA5 sequence is indicated when both X170 and X180 are set. Also, the PA1 code causes the Order Code Toggle X190 (FIG. 12) to be set, to indicate that the next digit supplied automatically by the active reader 104 or 104–2, or manually by the operator via keyboard 120, will specify the order at which entry is to begin in the selected register. Hence, the first numeric code sensed thereafter will be interpreted as an order code, that is, will determine the entry position of the most significant digit in the selected register, rather than be interpreted as the most significant digit itself. The presence of this first number code is indicated by setting Digit Detect Toggle X150, through a signal on line 1101, mentioned previously, which indicates that a digit is being received from the information channels 208. The first digit code is transmitted to the Multiplier Buffer 308 and the Digit Counter 306 to set them at a count that is equal to the value of the order code. This setting occurs in the following manner: An output from pulse gate 1212 at Digit Clock time (output on line 502 of Clock Pulse Distributor 304) will set the Order Code Toggle X190 (FIG. 12d) when a PA1 code is received from the information channels 208, since then the high output (PA1 Code) (Sync) on line 1102 of Input Decoder 217 will arm pulse gate 1212 and Toggle X190 will be set when the pulse gate is triggered by the next digit clock pulse on line 502. When the first numeric code, i.e. the order code, is received, the unit state of Toggle X190 through Or gate 1103 in the Input Decoder 217 produces the "Digit Detect Level" on line 1101 through And gate 1104, since the other two inputs "Sync" and "Digit" will then be present on lines 1302 and 1115, respectively. The unit state of Toggle X190 is also used in the Input Decoder 217 to interpret the 0 code as the 10th Order (the 2 and 8 code lines 1112 and 1118, respectively, being high because of outputs through Or gates 1105 and 1106 resulting from output through And gate 1107) and the Y code as the 11th Order (outputs on the 1, 2 and 8 lines 1111, 1112 and 1118 through their respective Or gates because of an output through And gate 1109) if they are received at this time. The "Digit Detect Level" (on line 1101) will set the Digit Detect Toggle X150 at digit clock time through pulse gate 1217 because the Successive Accumulation Toggle 1303 will be in the "off" state when the Order Code is received and And gate 1243 will have a high output on line 1244 during a PA1 sequence before a digit is detected. With both Toggle X150 and Toggle X190 (FIG. 12) in the unit state during this sequence, the level "Set Input Order" will be produced on line 1213 from And gate 1214 and used to set both the Digit Counter 306 and the Multiplier Buffer 308 at a count equal to the value of the order code, i.e. according to the information borne by lines 1111, 1112, 1114 and 1118 of Input Decoder 217. The level "Set Input Order" also sets the Successive Accumulate Toggle 1303 at Pre-Index Clock time (through pulse gate 1304). The unit state of the Successive Accumulate Toggle 1303 (output on line 1321) is used to cause the Order Code Toggle X190 (FIG. 12) to be reset at Quarter clock time at the end of the 3rd Quarter (through pulse gate 1215). At the same time, the Successive Accumulate Toggle 1303 is reset (through pulse gate 1305). The Order Code Toggle X190 (FIG. 12) must be reset during this operation so that the next digit encountered in the codes transmitted from information channels 208 will not be treated as an order code, but entered as the most significant digit. The Digit Detect Toggle X150 (FIG. 12) is reset by the Quarter Clock that comes after Pre-Index Clock (through pulse gate B2).

Pulse gates 1510, 1511, 1512 and 1513 are used to set the Multipler Buffer 308 to the count that represents the input order. The original order is stored in Multiplier Buffer 308 so that Digit Counter 306 (shown in detail in FIG. 6) can be set again to its original count in case an error is made and a Restore sequence is initiated to permit rectification of the error, as will be described later. Accordingly, during the digit entry sequence (PA1) Multiplier Buffer 308 will not count down and the Entry Order value will remain intact until Buffer 308 is cleared at start of the process sequence after all data and instructions have been received and the operation is to be performed, or upon initiation of a skip sequence. Buffer 308 is normally counted down through pulse gates 1514 through 1520 at Quarter Clock time when an output is present from Or gate 1521. This output from Or gate 1521 is not produced during a PA1 sequence, because a $\overline{PA1}$ level on line 1247 is required in And gate 1562 connected to Or gate 1521, when circumstances would otherwise be favorable.

Pulse gates 1522 through 1525, are arranged to reset Buffer 308 to zero at Bit Clock time so that the Entry Order will be cleared when the Process code is received on information channels 208 and the processing of information begins in response to the presence of the level (Process) ($\overline{Go}$) on line 1216. When a skip operation is initiated, the PA sequence control settings will also be cleared, the clearance being produced by the occurrence of the level [(SKL)+($\overline{Rdr2}$)(SpSk)] on line 2211, before the Process Code is received (Go Toggle 1601 not being set, therefore). The level SKL defines the normal skipping conditions and the level ($\overline{Rdr2}$) (SpSk) is used to indicate that though Reader Two (104-2) has been turned off, Reader One (104) is still in Special Skipping mode, i.e. skipping, but not turned on, as will be described in greater detail subsequently.

As mentioned previously, when the Order code, the first numeric code, is received in Information Channels 208, it will set the Counter 306 and Buffer 308 as described above, but it will not be printed (if the entry was automatic) or punched. The reason for this is that with Order Code toggle set and a PA1 signal on line 1236a, there will be an output from And gate 1248. This output will pass through Or gate 1249 and be sent to And gate 1250, which will in turn pass the output upon occurrence of the signal "Sync" on line 1302. The output of And gate 1250 through Or gate 1251 supplies an output on line 1240, labelled "Control." The occurrence of the signal "Sync" requires that the Code Control Toggle 2105 be in the unit state, the level on the Code Control line 2108 thus being high. The unit state of Toggle 2105 defines the Code Control mode, in which control codes are responded to, but are not recorded by either Writing Machine 100 or Punch 106 (more fully described in previously mentioned Pat. 3,277,448. This can be seen from FIG. 7, where the level $\overline{Control}$ on line 1240' is needed as an input to And gates 725 (through And gate 412 and line 413) and 726, to enable the strobing of Writing Machine 100 and Punch 106, respectively, during an entry sequence. The level on $\overline{Control}$ line 1240' is the inverse of the level on the "Control" line 1240, and hence will be low in this instance because of the output on line 1240.

The Space Code (Ch. 6, in this embodiment, see FIG. 11a) can be used to change the order position of the most significant digit. If the Space Code is transmitted after the Order Code, a Digit Entry Cycle will be present for one revolution of Disc Memory 301. During this time, the Digit Counter will be counted down once for each digit area, i.e., 12 counts in each of the 12 register areas 316. At the end of this revolution, Digit Counter 306 will have been counted down one extra count by the Pre-Index clock through pulse gates 623 because of the high level on the Counter Shift Mode line 1713 through Or gate 1714, so that Digit Counter 306 is set for causing entry in the next lower order.

Depression of a backspace key during this PA1 sequence also causes a change in the order position entered by the most significant digit. If the Backspace Code (Ch. 2, 4 and 6, see FIG. 11a) is transmitted to Information Channels 208 after the Order Code in a PA1 sequence has been received, the result will be the setting of Digit Counter 306 to a count that is one higher than the original Entry Order value. When the Backspace Code is transmitted to Input Decoder 217 during this PA1 sequence, there will be a high output on Backspace line 1113, and so Symbol Toggle 1306 will be set at Quarter Clock time through pulse gate 1307, the levels on inputs 1527 ($\overline{Printer\ Busy}$ and PA6) and 1236 (PA1) then also being high. The next Quarter Clock will set Successive Accumulate Toggle 1303 through pulse gate 1308. Because both Toggles 1303 and 1306 are set and the Process Code has not been sensed (the level $\overline{Go}$ therefore being present on line 1602), the "Backspace Correct" level will be generated on line 1309 through And gate 1310. In turn, through Or gate 1701 this level will produce the level "Count Down mode" on line 1702, as a result of which Digit Counter 306 will be counted down once for each digit area traversed during the remainder of the revolution of disc 301 in the manner described previously. Because Digit Counter 306 started to count down after the Quarter Clock, one count will be lost. Therefore, at Index time (end of the revolution), Digit Counter 306 will be at a count that is one higher than the original Order Code and will remain there because the Symbol and Successive Accumulate Toggles, 1306 and 1303, respectively, were reset through pulse gates 1311 and 1312 at Pre-Index Clock, thus terminating the "Count Down Mode" because of disappearance of "Backspace Correct" on line 1309 when toggles 1303 and 1306 were reset.

When the next digit, the most significant digit of information, is received in Information Channels 208, a Digit Entry Cycle will be present for one revolution of Disc Memory 301. During this time the digit will be written in its proper order position in each of three temporary storage areas 318 of Disc Memory 301, these areas being designated Buffer 1, Buffer 2, and Buffer 3. Entry of this digit into these Buffer Registers 318 is accomplished by setting the Input-Output Buffer 311 to the value of the digit being entered through information channels 208 and transferring this value into the proper position in each of storage areas 318, the entry occurring at a count of "11" in Digit Counter 306 and the position being determined by the initial count in Digit Counter 306. In detail, when the next digit is entered during this PA1 sequence, the "Digit Detect Level" will be produced on line 1101 through And gate 1104 because the Printer is not busy, i.e. either the $\overline{Decode\ Busy}$ signal or the level ($\overline{Auto\ Print}$) is present at the inputs to Or gate 1526, with resultant high output on line 1527, which is the second input to Or gate 1103. The Digit Detect level on line 1101 will set the Digit Detect Toggle X150 (FIG. 12) through pulse gate 1217. Because the Order Code Toggle X190 is not set at this time (having been reset after setting of the Digit Counter 306 to the Entry Order value), the levels "Set In/Out Buffer" and "Go Tog→1" will be produced on lines 1218 and 1219 through And gate 1220 and Or gate 1221, respectively. The level "Set In/Out Buffer" on line 1218 is used to set the Input/Output Buffer 311 (see FIG. 14) at a count that is equal to the digit being entered (through pulse gates 1415 through 1418). The level "Go Tog→1" on line 1219 will set the Go Toggle 1601 at Pre-Index clock thru pulse gate 1603 so that a Digit Entry Cycle can be performed. The Digit Detect Toggle X150 (FIG. 12) will be reset (pulse gate 1222) by the Quarter Clock that comes after the Pre-Index Clock that set Go Toggle 1601. Because the Digit Detect Toggle X150 (FIG. 12) is reset, the level "Go Tog→0" on line 1705 will be produced at the end of this next revolution through And gate 1711 to terminate the Digit Entry Cycle after one revolution.

When the Disc Memory 301 reaches the position where Buffer 1 of temporary storage register 318 is located, identified by appearance of the level "1st Quarter" on output line 505 of Quarter Revolution Counter 305, the digit is shifted from the Input-Output Buffer 311 to Write Head W2, which writes the digit in its proper order position in the temporary storage area 318 designated Buffer 1. The digit is circulated through the Read-Write Head Gating 313, the Adder-Subtractor 310, and back into the Input-Output Buffer 311 so that it will be available for recording into Buffer 2 and 3 register areas. As the Disc Memory 301 reaches the area occupied by a given Buffer, this sequence of shifting and recording the digit in its proper order position while recirculating it back into the Input-Output Buffer 311 is again repeated. This sequence is again followed when the Disc Memory 301 reaches the position where Buffer 3 is located. After the digit has been recorded in all three buffer register areas 318, the Input-Output Buffer 311 is cleared by shifting the digit without turning on Write Head W2. At the end of this revolution of Disc Memory 301, Digit Counter 306 will have been shifted down one extra count as before, so that the next digit will be entered into the next lower order position of the Buffer Registers 318. This sequence of recording a digit in Buffers 1, 2, and 3 and shifting Digit Counter 311 down one extra count will continue until all the digits are entered (ie. until the Process Code is received).

After the digits are entered, a Decimal Modifier (%, /C or /M) can be used to shift the decimal two or three places to the left when the digits are to be used as the multiplier. If the Decimal Modifier Codes % or C are used, the /C Toggle 1802 will be set and will cause a decimal-shift of two spaces to the left during multiplication (by shifting the contents of Icand register 317). If the Decimal Modifier Code M is used, the /M Toggle 1803 will be set, causing a decimal-shift of three spaces to the left in the same manner. Details of the shifting operations are the same as those given in previously-mentioned patent 3,265,874 and need not be gone into further herein.

The sign of the number entered can be reversed by using the Minus Code (—) or the Negative Code (N). These codes set the Neg I and Neg II Toggles, 2001 and 2002 respectively. The state of these Toggles, together with that of Neg III Toggle 2003, in the Minus and Complement Circuit (part of 309) will determine if the number in Buffer Registers 318 is to be added or subtracted from information in the selected Register(s) 316, 317. The Minus Code will print, but the Negative Code will not print because Input Decoder 217 interprets this latter code (N) as a Control Code in a PA1 sequence, as will be explained. Prnter Decoder 202 of Writing Machine 100 will therefore not be strobed.

The Register and Factor Codes—letter codes F, G, H, I, J, K, P, A, (J—), B, (K—), D and R, see FIG. 11— are used to select respective Toggles 1804 that represent the Register or Factor Storage areas to be entered. The state of these Toggles 1804 is used to control the areas where information is read or written on Disc Memory 301, except in the case of the R code, which is used to indicate the type of cycle to be performed.

A mentioned earlier, the numeric character (also referred to as a "digit") defining the Entry Order was not recorded because the circuitry treated it as a "Control Code." The same is true for the register selection codes listed immediately above and the N signal reversal code. The circuitry used for these last differs somewhat from that for the Order Code. An Or gate 1120 at the output of the Input Decoder 217 translates signals representative of digits, space, decimal modifiers (/C and /M), and the minus sign into a common signal which passes through an inverter 1121 to a line 1122 labeled "Non-output character." By virtue of inverter 1121, the level on line 1122 will therefore be low whenever one of the last mentioned codes is sensed, but will be high whenever any other code is transmitted from Information Channels 208. "Non-output character" line 1122 is one of two inputs to an Or gate 1247 supplying And gate 1248, the other input to the Or gate being the unit output of Order Code Toggle X190, (FIG. 12). And gate 1248 has two inputs, the other being an input 1236a identifying the sequence as a PA1. The rest of the circuit being the same as described for the Order Code, the level on "Control" line 1240 will be high whenever the output of "Non-Output Character" line 1122 is high, a PA1 sequence of characters is being received, and a "Sync" signal on line 1302 is available to cause an output through And gate 1250, armed by output from And gate 1248 through Or gate 1249. As explained previously, the high level on line 1240 will cause the inverted output 1240' to be low. Hence there will be no output through And gate 412 on line 413, identified as DB CT SkL TF, and, in turn, no output from And gate 725. Thus, Writing Machine 100 will not print the code sensed in Reader 104 (or 104-2). Similarly, the low level on line 1240' will prevent an output through And gate 726, and thus prevent recording of the code by Punch 106. Hence, any alphabetic codes such as the register selection codes will be treated as control codes and therefore cannot print or punch when encountered in an entry sequence. Conversely, all numerics (except for the first, as previously discussed) can print or punch when encountered in an entry sequence, because the output of Or gate 1119, which indicates sensing of a numeric code, is also sent to Or gate 1120 via line 1115a. This output, passing through to inverter 1121, results in a low level on Non-Output Character line 1122, and, through the circuits discussed above, enables printing or punching.

When the "Execute" command—referred to hereinafter as the "Process" Code (Ch. 3, 5, 6, 7 and 8, see FIG. 11a)— is received during a PA1 sequence, information in Buffer Registers 1, 2 and 3 (318) will be processed together with information in one or more selected Registers 316, 317 i.e., a "PA2" sequence will automatically start.

A PA2 sequence transfers information accumulatively from Buffer Registers 318 to any selected Register 316, or in the case of a Multiplier (Register Code R), information in Buffer Register 1 will not be transferred to storage, but will be used digit-by-digit to control the number of times information contained in Multiplicand Register 317 will be successively accumulated into Product Register 316 following the routine described in the about-mentioned Patent 3,265,874.

A PA2 sequence will automatically start after the Process code is received during a PA1 sequence or upon receipt of a PA2 command sequence (a PA2 code, followed by one or more Register Codes, Modifier Codes, and the Process Code).

While the PA2 sequence of characters is being transmitted, none of these characters will print or punch, because an output on line 1232a, identified as "PA2 or Output Seq" and supplied by Or gate 1231, causes an output from And gate 1252, the other input to which, $\overline{Go}$ on line 1602, will also be high prior to receiving a Process code. Output from And gate 1252 through Or gate 1249, And gate 1250, and Or gate 1251 will give a high level on Control line 1240 to inhibit printing or punching through And gates 725 and 726, as explained before.

When the Process code is received during a PA1 sequence, it will set Toggle X160 and reset Toggle X170 in Processor Control Circuit 312 (FIG. 12) to indicate to the system that a PA2 sequence is to be initiated. If the PA2 code (Ch. 2, 7 and 8, see FIG. 11a) is received from Information Channels 208, Toggle X160 will be set and, because the other Toggles in Processor Control Circuit 312 remain reset, a PA2 sequence will be initiated by the Process Code at the end of the instruction word. During either a PA1 or a PA2 sequence, sensing of a Process Code will reset to zero Multiplier Buffer 308, Digit Counter 306, and Word Counter 307 and also will set Go Toggle 1601 so that appropriate ones of the following sequence of cycles can start.

If any of Registers 316 [F, G, H, I, J (+ or −), and K (+ or −)] have been selected (Letter Codes F, G, H, I, J or A, and K or B, respectively), an Accumulate Cycle will start. After completion of this cycle (if selected by sensing of any of the preceding letter codes), an Enter Product Cycle will start if Product Register 316 has been selected (Letter Code P). If Multiplicand Register 317 has been selected (Letter Code D), an Enter Icand Cycle will start after completion of the above mentioned cycles, or immediately if neither of them was selected. Lastly, after completion of any or all of the above-mentioned cycles, or immediately if no other registers were selected, the Multiplication sequence (Enter Ier Cycle) will start if the Multiplier has been selected (Letter Code R).

Pulse gates 1528 through 1531 are used to set Buffer 308 to a count equal to the value of the Multiplier (Ier) digit that will control successive accumulation of the multiplicand during the multiplication sequence. As described in detail in Application 162,526, the bits of the Ier digit are transferred to Buffer 308 from Input-Output Buffer 311 by input levels X13, X14, X15 and X16 (FIG. 15c) on lines 1419 through 1422 when the level "Transfer Ier Digit" is present on line 2401 from Head Gating Circuit 313 and in time with the next Digit Clock. During the Successive Accumulate Mode of the multiplication sequence, Buffer 308 will be counted down twice per revolution of Disc 301, i.e. once at the end of the 1st Quarter and once at the end of the 3rd Quarter (through And gate 1532 and Or gate 1521), while the contents of Multiplicand (D) Register 317 are accumulated with the contents of Product Register 316 (primary or secondary, as the case may be at that position of Disc 301). This count down will continue until Buffer 308 has counted down to zero. At that time, the next digit of the Multiplier will be transferred to Buffer 308 and the contents of Multiplicand (d) Register 317 shifted one position. As this mode of operation is the same as described in the above-mentioned Pat. 3,265,874 and is not essential to the invention disclosed herein, no further details need be given.

OUTPUT

The normal output, or PA3 sequence, is used to read out of a selected Register 316 for transfer to Buffer Registers 318 (Buf 1, 2 and 3) and the selected output Units (punch 106 and/or Writing Machine 100). A PA3 instruction word consists of the following codes:

PA3, Register, and Process

If the second format for output from the selected Register 316 is required, a 2 code is introduced after the PA3 and Process codes:

PA3, Register, 2, and Process

The PA3 code (Ch. 1, 2, 5, 7 and 8, see FIG. 11a) when transmitted to Processor Control Circuits 312 sets Toggle X180 (FIG. 12) to indicate that a PA3 sequence is to take place. The "one" state of Toggle X180 defines an output sequence, thus the righthand output of this toggle is connected to Or gate 1231, such that a high level on line 1232a will, as described for PA2, pass through And gate 1252 to give a high level ultimately on Control line 1240. This high level results in inhibiting the printing or punching not only of the Register code but also the format code, which may follow the PA3 code.

The code for the selected Register 316 (one of the letter codes F, G, H, I, J, K or P) is transmitted to Register Toggles 1804 to set the desired one of these toggles. The "one" state of the selected Register Toggle 1804 is used in Head Gating circuit 313 to render the read and write heads effective when Disc 301 is in a position such that this Register 316 is available for reading or writing. Also, the "one" state of each Register Toggle 1804 is used in the "Length of Type Out" circuit 1900 of Plugboard 124 to select the order positions for start, decimal control and stop of output from that Register.

As mentioned previously, the "Length of Type Out" circuit 1900 contains two formats for the start, decimal and stop positions of each Register 316, the first format being selected unless the 2 code—actually any digit such as 2, 3, 6 or 7, which has a 2 bit in binary-coded decimal codes—was used in the command sequence. When one of these digits is sensed, and the level on "2 code" line 1112 goes high before the "Process" code is received during an output sequence (i.e. level on line 1224, "(Output Seq) ($\overline{Go}$)" is high), pulse gate 1223 will be armed, and the next Digit clock will set Order Code Toggle X190 (shown in FIG. 12 and previously described in connection with distinguishing between order information and data digits during entry) to condition the Length of Type Out circuit 1900 for an output according to the second format program.

When the Process Code (Ch. 3, 5, 6, 7 and 8, see FIG. 11a) is received, Digit Counter 306, Word Counter 307 and Multiplier Buffer 308 will be reset to zero. Also, Go Toggle 1601 will be set to indicate that the output sequence is to start. During this Output Mode, Digit Counter 308 and Word Counter 307 will count down (a high level on Output Mode line 1712 will result in a high level on Count Down Mode line 1702 through Or gate 1701) in synchronization with rotation of Disc 301 to locate Digit and Register areas. Multiplier Buffer 308 is used as a counter during this Output Mode to sequence the output of information. Multiplier Buffer 308 then counts down once per revolution of Disc 301 and is set at various counts (11, 5, 3, 2, or 1) depending on whether or not a decimal output is programmed, and whether or not an output unit is activated and, if so, the type of unit activated. The scheme for output is basically that described in detail in Pat. 3,265,874 and will be reviewed only briefly except for the novel means for control of the length of the output. This last will, of course, be described in detail.

The first operation that takes place during Output Mode is to set Buffer 308 to a count of 2 for one revolution. At start of Output Mode, Digit Counter 306 is at zero and Symbol Toggle 1306 is reset (the levels "0" in Digit Counter and $\overline{Sym}$ therefore being present on lines 600 and 1313, respectively). In consequence, pulse gate 1533 will set Toggle X120 (which has a weight of 2 in Buffer 308, see FIG. 15) at the beginning of the first Quarter (Index Level and Qt. Cl.). The output of Toggle X120 is And gated with $\overline{Type\ Now}$ and Output Mode (And gate 1534) to produce the level "Complement Cycle" on line 1535. During this cycle the value in the selected register 316 will be read, subtracted from zero in Adder-Subtractor 310, and written in the appropriate temporary register 319 (or 323 if Product Register 316 was selected). Therefore, both the original value and the complemented value are available for output. Multiplier Buffer 308 will remain at the count of "2" until counted down to "1" at the end of the first revolution. Counting is controlled through presence of an output from And gate 1536, which has (Output Mode), (4th Qt.) and ($\overline{0\ in\ Ier}$) as inputs on lines 508, 1712 and 1537, respectively, each of them being present at least once during the revolution.

During the second revolution of Disc 301 (Multiplier Buffer 308 now being at the count of one), the digit in the 11th position of the selected Register 316 is read and shifted into Input-Output Buffer 311. For this purpose, output level "Retrieve Output Digit" will be produced on line 1540 by And gate 1541 and applied to Head Gating 313 to cause this digit (uncomplemented value) to be read and supplied to Input-Output Buffer 311. If the 11th position contains a digit other than zero, the register contents are presumed to be negative in sign and the complemented value in the corresponding temporary register is therefore used for output. If the 11th position contains a zero, the original (non-complemented) value in the selected register 316 will be used for output. At the end of this revolution of Disc 301, Input-Output Buffer 311 will be reset to zero if it contains a digit other than zero and Ier Buffer 308 will be counted down to 0. If the digit in the 11th position is a zero, the non-complemented value in the selected Register 316 is ordinarily used for output during the subsequent revolutions, except when Product Register 316 has been selected. If this last register was selected for output, finding a zero in the 11th position is not a result unique to presence of a positive quantity in this register. The reason for this is that Product Register 316 is supplemented by two adjoining registers (PP1 and PP3) one of which, PP1 (322), is provided with a round-off value in its most significant storage position adjacent the least significant position of Product Register 316. Accordingly, if a half-cent credit is the net result of a series of accumulations, it should properly be rounded to a one-cent credit. Because of the initial entry of a positive value of 5 for round-off, the net result in this case will be disappearance of the round-off value leaving a zero for the content of all three areas of the Product Register and its supplementary registers including the 11th position of Product Register 316. To obviate the difficulty, whenever Product Toggle 1809 is set, resulting in a high level on line 1811*a*, Neg III Toggle 2003 is set at Quarter time through pulse gate 2014. The other inputs to pulse gate 2014 are "0" in Digit Counter on line 600*a* and Digit to Buffer 1–3 on line 1542. Both of these levels are high at start of an Output Mode, so pulse gate 2014 is triggered to set Neg III Toggle 2003 prior to start of the Complement Cycle which is the first step in Output mode, previously described. Then, with a high level on lines 1535 (Complement Cycle), 1811 (Prod. Tog.) and 505*a* (1st Quarter), there will be an output from And gate 2406 to line 2407, one of two inputs to And gate 2404. And gate 2404 will thus be "primed" for the entire first quarter, and any pulses sensed by Read Head RII will set the Reproducing II Toggle (not shown, but identical to that in application Ser. No. 162,526) and thus will appear on line 2408*a*, giving rise to an output on line 2405. In that case, through pulse gate 2015, Neg III Toggle 2003 will be reset at bit time, showing that Product Register 316 contains some positive value, even if only the round-off value. If the content of the Product Register and its supplementary registers is zero, then the set state of Neg III Toggle 2003 will cause output to be taken from the Product Secondary 2 Register 323 containing a value of one in the least significant position, this value having been entered during the complement cycle through And gate 2409. This And gate has as inputs lines 611*a* ("11" in Digit Counter), 2407*b* (output of And gate 2406, described above), 512*a* ("1" in the Word Counter) and 514 (Minus Round-Off Level). This last "level" is a one bit pulse produced by the Clock Pulse Distributor 304, hence through Or gate 2410 to the "*a*" input to Adder-Subtractor 310 on line 2411 a "1" will be added at the least significant digit position of Product Secondary 2 Register 323. The contents of this register will be .01 in this case, presuming the usual decimal point location, and Neg III Toggle 2003, remaining set, will assure that read-out occurs from Product Secondary Register 323 rather than Product Register 316 and that the symbols "C" and "R" are printed if programmed in Symbol Coding section 1910 of Plugboard 124.

If the digit in the 11th position is not a zero, the contents of the selected Register 316 are presumed to be negative in sign. Neg III Toggle 2003 in the Minus and Complement Circuit (part of 309) therefore will be set thru pulse gate 2004, since gate 2004 will have been armed by an output from And gate 2005 on line 2006. Input-Output Buffer 211 will be cleared of the sign digit in preparation for output of the numeric information. With Neg III Toggle 2003 set, output on line 2007 will condition Head Gating Circuit 313 to cause the remaining digits to be read from the corresponding Temporary Register 319 (or 323) which contains the complemented or true negative value of the contents of selected Register 316. At the end of this revolution, Digit Counter 306 is counted down one extra count and Multiplier Buffer 308 is counted down to zero.

During the third revolution of Disc 301, the count in Multiplier Buffer 308 then being zero, the contents of Input-Output Buffer 311 (zero as a result of clearance of the sign information) will be written in the 11th position of each of the three Buffer Registers 318, because the level "Digit to Buf 1–3" has been produced on output line 1542 from And gate 1543. At the end of this third revolution, Multiplier Buffer 308 is set to a count of one by setting of its Toggle X110 through pulse gate 1544, since Buffer 308 is at a count of zero and Digit Counter 306 is at a count of "11" ("0" in Digit Counter therefore giving an output on line 1539 through Or gate 1545).

During the fourth revolution of Disc 301, the digit in the 10th position of the selected Register 316 (or the corresponding temporary Register 319 or 323 if the stored value was detected to be a negative number, as stated above) is read and shifted into Input-Output Buffer 311 because of the presence of output level "Retrieve Output Digit" on line 1540. At the end of this revolution, Digit Counter 306 is counted down one extra count because of presence of the level Counter Shift Mode on line 1713 from Or gate 1714, and Multiplier Buffer 308 is counted down to zero. During the next revolution, the level "Digit to Buf 1–3" is again produced through gate 1543 and, accordingly, the contents of Input-Output Buffer 311 are written in the 10th position of the three Buffer Registers 318. This sequence (setting Multiplier Buffer 308 to a count of one, reading the next lower digit position of the selected Register 316 bit-by-bit while shifting the bits into Input-Output Buffer 311, counting down Digit Counter 306 one extra count, counting down Multiplier Buffer 308 to zero, and shifting the contents of Input-Output Buffer 311 again to write them bit-by-bit into the appropriate position of Buffer Registers 318) will continue until the position for start of output from the selected Register 316 is detected. If no positions are programmed for output, the above sequence will continue until all ten digits have been transferred to Buffer Registers 318.

The "Output Control" circuit 1600, controlled by the count in Digit Counter 306 and a signal on the highest order one of the lines 1907 from Plugboard 124 through And gates 1625, Or gate 1626 and And gate 1620, will supply a pulse on "Output Control" line 1621 to arm pulse gate 1605 through which Type Now Toggle 1604 will be set. Setting of Toggle 1604 happens at the Pre-Index Clock time coming at the end of the revolution of Disc 301 during which the digit in the start position has been read and shifted into Input-Output Buffer 311, Multiplier Buffer 308 then being at the count of one. During the first three-quarters of the next revolution, Multiplier Buffer 308 then being at the count of zero, the contents of Input-Output Buffer 311, presented on output lines 1401 to 1405, are transmitted in parallel to Channel Inputs 801–808, together with signals from the individual toggles X13 through X16 for purposes of generating an extra bit on code line 5 in view of a requirement for maintaining odd parity. Channel Inputs 801–808 transmit the appropriate code to Information Channels 208 so that the actuators 718, 731 for recording elements of selected Output Units (Punch 106 or Writing Machine 100, respectively) can be operated. With Type Now Toggle 1604 set and Go Toggle 1601 set, the output of And gate 1606 on line 1607 will be high. Accordingly, And gate 1507 will produce an output for the first three-quarters of a revolution of Disc 301. The output of And gate 1507 is gated with the level "Digit to Buf 1–3" in And gate 1546. The output of And gate 1546 is supplied, in turn, to And gates 1547 and 1548. If the digit transferred to Input-Output Buffer 311 was a zero (Digit Detect on line 1225 is high), And gate 1547 will then transmit a "Space Output" signal on line 1549 to the inverted Channel Input 805 so that a space code (Ch. 5, see FIG. 11) will be sent to the recording units 100 and 106 via the "Ch. 5 Out" line 705 (not specifically shown in FIG. 7a). If the digit transferred to Input-Output Buffer 311 was not a zero, i.e. the level "Digit Detect" is present on line 1226, then And gate 1548 will transmit the level "Digit Output Now" on line 1550 to And gates 1423 of Input-Output Buffer 311 so that the code elements of this digit on lines 1401 through 1404 can be transmitted to information channels 208 via encoder 219 by supplying the other one of the two inputs required by each of the And gates 1423. Note that if Input-Output Buffer 311 contained a zero and the space code was transmitted to information channels 208, a zero is still written in its proper position in Buffer Registers 1, 2 and 3. At the end of this revolution, Multiplier Buffer 308 will be set to a count of five if Writing Machine 100 has been selected for output or to a count of one if it has not ("Auto Print" toggle 2106 being respectively "on" or "off"). When Writing Machine 100 has been selected for output, Multiplier Buffer 308 is set to the count of five in order to allow enough time for the preceding digit to be printed before the next digit is retrieved.

The digit in the next lower order is retrieved and shifted into Input-Output Buffer 311 when Multiplier Buffer 308 next arrives at the count of one, in the fashion described above. If this digit is a non-zero digit, Digit Detect Toggle X150 (FIG. 12) will be set and the high output on line 1226 will indicate that all subsequent zeros are to be transmitted as such and not in the form of space codes. As long as Toggle X150 remains in its zero state and start of output has been detected (Type Now Toggle 1604 is set), a space code will be transmitted to Information Channels 208 for each zero sensed. When a digit other than zero is detected in Input-Output Buffer 311, Digit Detect Toggle X150 will be set through pulse gate 1227, and the level "Digit Detect" supplied on line 1226 to And gate 1548, to provide a "Digit Output Now" signal for all digits, including zero thereafter.

When Multiplier Buffer 308 is at the count of zero, the retrieved digit (or the zero) will be written in its proper position in Buffer Registers 1, 2 and 3 and also encoded as the digit code (or a space code or a zero code depending on the circumstances, as explained above) in Encoder 219 and transmitted to Information Channels 208 for operation of the selected output units. This sequence of operations will continue until the decimal point is to be transmitted.

If Plugboard 124 is programmed for no decimal by connecting a cable 1905 between a hole 1902 assigned to the selected Register 316 and the "ND" hole 1901, as mentioned earlier, /M Toggle 1803 will be set through an output from pulse gate 1805 one revolution after Type Now Toggle 1604 is set. The state of /M Toggle 1803 is used to differentiate between the order where a decimal code is to be transmitted and the order where output is to stop. With Toggle 1803 in the "on" state, the next order programmed in Plugboard 124 will be interpreted as the stop position. The above-described sequence will continue until the stop position or Symbol Time is detected, as will be described.

If a decimal order has been programmed in the length of Type-Out section of Plugboard 124 (FIG. 19a) and Writing Machine 100 is "on," the Output Control circuit 1600 will supply the pulse "Decimal Time" to provide the timing for output of the code programmed for the "Decimal Point" in Symbol Coding section 1910 of Plugboard 124 (FIG. 19b). After Type Now Toggle 1604 is set and before /M Toggle 1803 is set, the "Dec. Time" level (output of And gate 1609) will be present on line 1610 twelve times per revolution (once for each register 316) for each order programmed. Because the highest order programmed set Type Now Toggle 1604, and Digit Counter 306 shifted down subsequently, the second highest order programmed will be the next order to coincide with the count in Digit Counter 306 at Pre-Index Clock. This order will determine the time at which the decimal output programmed in Symbol Coding section 1910 of Plugboard 124 (FIG. 19b) will be transmitted to Information Channels 208 via Encoder 219. When the "Dec. Time" is present at Pre-Index Clock time, hence after the digit just prior to the decimal point has been transmitted to Information Channels 208, the "Decimal Time" pulse on line 1610 will set Multiplier Buffer 308 to a count of eleven instead of five to allow enough time for both the decimal and the following digit to be printed. This setting occurs thru pulse gates 1551 and 1552 which turn "on" the "2" and "8" Toggles X120 and X140 (see FIG. 15) at Quarter clock when the "Decimal Time" pulse is present. The usual setting of the "1" Toggle X110 occurs but the "4" Toggle X130 does not set in this case, since one of the inputs to pulse gate 1553 is the level Decimal Time on line 1611. When Multiplier Buffer 308 has counted down to six, the level "Dec. Point" will be produced at output of And gate 1554 and through Or gate 1558, the level on line 1509 will go high. Thus, through the cables 1905 connected in Symbol Coding section 1910 of Plugboard 124 (FIG. 19b) to terminals 1902 supplied by line 1509 and to terminals 1901 of code lines 1911 through 1918 corresponding to the various channels, the decimal code programmed will be transmitted to Encoder 219 (FIG. 8) and from there to Information Channels 208 via the inverted Channel Input lines 801–808. The inverters 809 are required for compatibility with the polarity of signals provided by Readers 104, 104-2.

If Digit Detect Toggle X150 (FIG. 12) was not set before the "Decimal Time" pulse coinciding with Pre-Index clock, this toggle will be set at Quarter clock time through pulse gate 1228 so that subsequent zeroes can be transmitted to Information Channels 208 as such rather than as spaces. Digit Detect Toggle X150 will remain set until reset thru pulse gate 1229 at the end of the output sequence.

When Multiplier Buffer 308 has counted down from six to one, the next lower digit will be retrieved as before and /M Toggle 1803 will be set through pulse gate 1805. Because /M Toggle 1803 is set, the next order programmed will be interpreted as the stop position.

If Writing Machine 100 is "off" (Auto Print Toggle 2106 in reset condition) and Punch 106 is "on" (Punch Toggle 2104 in set condition), the Decimal Time pulse will set Multiplier Buffer 308 to a count of three instead of eleven, since less time is needed for merely punching the decimal code and the digit code. In this case transmission of the programmed decimal point code to information channels 208 will be enabled when Multiplier Buffer 308 is at the count of two through And gate 1555 rather than And gate 1554. When the level ("1" in "Ier") (Output Mode) appears on line 1556, the output of And gate 1557, the next lower digit will be retrieved and /M Toggle 1803 set, as previously described, to identify the next order programmed as the stop position.

As long as Type Now Toggle 1604 is set, information being read from selected Register 316 will be transmitted to information channels 208. After the last digit has been transmitted and Multiplier Buffer 308 has counted down to "1" at start of another disc revolution, Symbol Toggle 1306 will be set through pulse gate 1314 after the 1st Quarter of this revolution to allow transmission of a symbol code if Type Now Toggle 1604 is still set. Symbol Toggle 1306 and /C Toggle 1802 are arranged as a Counter at the end of output in order to sequence output of symbols and to terminate this mode of operation. If no symbol codes are to be transmitted, one terminal 1902 for the selected Register 316 in the Length of Type Out portion 1900 of Plugboard 124, will have a cable 1905 connected to the terminal 1901 labeled "Order S1." Type Now Toggle 1604 is then reset through pulse gate 1612 after the digit in the 1st order position has been transmitted and just before Multiplier Buffer 308 has counted down to zero. If at least one symbol is desired, a cable 1905 is connected to the terminal 1901 labeled "Order S2" and Type Now Toggle 1604 remains set. With Symbol Toggle 1306 also set, as described above, the level "Symbol Timing" will be produced on line 1556 thru And gate 1557 for the first three quarters of a revolution when Multiplier Buffer 308 is at the count of 0.

The level "Symbol Timing" is transmitted to Symbol Coding Circuit 1910 to condition And gates 1920 through 1923 for an output which will transmit to information channels 208, the corresponding symbol code programmed in Plugboard 124. The code programmed at the Pos. 1 symbol region in Symbol Coding section 1910 of Plugboard 124 will be transmitted through And gate 1920 if a positive number (Neg III Toggle 2003 reset, the level on line 2208 therefore being high) was read from the selected Register 316. The code programmed for the Neg 1 symbol will be transmitted through And gate 1921 if the output was a negative number (Neg III Toggle 2003 set, the level on line 2007 therefore being high). If only one symbol is to be transmitted, the stop position will be connected to order S2 and Type Now Toggle 1604 will be reset after the first symbol is transmitted. As can be seen from the inputs to And gate 1557, Type Now Toggle 1604 must be set in order to produce the level "Symbol Timing" and transmit the code for the symbols.

If the stop order is programmed for Order S2, Type Now Toggle 1604 will be reset after the first symbol is transmitted to Information Channels 208; therefore, only one symbol (Pos. 1 or Neg. 1) will be transmitted. If the stop order is programmed for S1 or any order higher, Type Now Toggle 1604 will be reset before level "Symbol Timing" can be produced; therefore, no symbols will be transmitted to Information Channels 208.

If both symbols are to be transmitted, the stop position is not programmed; therefore, Type Now Toggle 1604 will remain set until the end of this sequence. In this last case, after the first symbol has been transmitted, Buffer 308 having been counted down to 0 and there being an output on line 1315 from the set side of Symbol Toggle 1306, /C Toggle 1802 will be set through pulse gate 1806 to indicate that the second symbol can be transmitted if Type Now Toggle 1604 is still set. As above, through And gate 1922 or 1923, the code programmed for the Pos. 2 or Neg. 2 symbol, respectively, will be transmitted according to whether a positive or a negative number (Neg III Toggle 2003 reset or set, respectively) was read from the selected Register 316.

Previous to output of the first symbol code, the contents of the selected Register 316 will be cleared. After Multiplier Buffer 308 has sequenced the output of the numeric information and Symbol Toggle 1306 and /C Toggle 1802 have sequenced the output of the symbol codes, the PA3 sequence will terminate. If one symbol was transmitted, all toggles set during this sequence will be reset at Pre-Index Clock time except for Last Operation Output Toggle 1613. If two symbols were transmitted, when Digit Counter 306 has shifted to 11 and Multiplier Buffer 308 has counted down to 0, the levels "Go Tog→0" on line 1705 and "Output End" on line 1703 will reset Symbol Toggle 1306 and /C Toggle 1802 respectively, at Pre-Index time through pulse gates 1315 and 1807. The level "Output End" on line 1703 is the output of And gate 1706 and via line 1703a is itself an input to Or gate 1704 which gives rise to the level "Go Tog→0" on line 1705. Actually, all toggles set during this sequence will be reset at Pre-Index Clock time except for Last Operation Output Toggle 1613, Toggle X180 (FIG. 12) and the (Icand+Output On) Toggle 1808. Toggle X180 and (Icand+Output On) Toggle 1808 will be reset at the Quarter Clock that comes after the 1st Quarter. Last Operation Output Toggle 1613 is used to indicate that Buffer Registers 318 still contain information taken from the selected Register 316 and that if a Digit Entry (PA1 sequence) is to follow instead of an internal transfer (PA2 sequence), the Buffer Registers 318 must first be cleared. Accordingly, a "Clear Buffers 1-3" cycle is initiated during the first part of each PA1 sequence whenever Toggle 1613 is in "set" condition. During this "Clear Buffers 1-3" cycle, Toggle 1613 is reset through pulse gate 1614 at Pre-Index clock.

EXTRACT

The "Extract," or PA4, sequence differs from the just described normal output sequence (PA3) in that it is used to choose a pre-designated part of a selected Register 316 for output to Buffer Registers 318, and also, to Punch 106 and Writing Machine 100 (if either of them is enabled). The portion of the contents of the selected Register 316 that will be transmitted is determined by the program in the Extractor section 1940 of Plugboard 124, mentioned previously. If the selected format is programmed to extract order positions 1 thru 6, as shown in FIG. 19d, the digits stored in order positions 7 thru 10 of the selected Register will be transmitted, while zeros will be transmitted for orders 1 thru 6. The start, decimal and stop orders are not affected by the Extractor circuit.

If the second, or X2, format is desired for output, the 2 Code is used in the command sequence, as for example: PA4, Register, 2, and Process. The order of presentation as between the register code and the 2 code is not important. When the PA4 code (Ch. 3, 7 and 8) is transmitted to Processor Control 312, Toggles X160 and X180 (FIG. 12) will be set to indicate that a PA4 sequence is to take place. PA4 being an output sequence, none of the codes will print or punch, as described for PA3.

The rest of this sequence will be the same as the PA3 sequence except for times when the digit retrieved is to be extracted and again at the end of the sequence when the selected Register is always cleared in a PA3 sequence, but may or may not be cleared in a PA4 sequence depending on the connections in the Register Lock portion 1930 of Plugboard 124.

Extraction of a digit is performed after the digit has been retrieved and shifted into Input-Output Buffer 311 (as described in the PA3 sequence). At this point, Extractor section 1940 of Plugboard 124 will supply a level causing Input-Output Buffer 311 to be set to zero. Consequently, when the information in the Input-Output Buffer is shifted out, a zero instead of the digit retrieved will be transferred to Buffer Registers 318 and to Information Channels 208 for operation of appropriate elements of whichever of the recorders 100, 106 have been enabled. The manner of substitution of zeros for the digits at chosen positions in a selected register during read out, is performed as follows: In Extractor section 1940 of Plugboard 124, the timing levels produced by Digit Counter 306 when it counts down from "11" (line 611) through "2" (line 602) are supplied to terminals 1945 and 1946 of the Extract 1 and Extract 2 portions, respectively. By means of cables 1905 connecting any number of selected ones of terminals 1945 to the five terminals 1943 and 1944, respectively, of the Extract 1 line 1941 and the Extract 2 line 1942, suppression of two different groups of digits may be controlled. Through Or gate 1408, a "Clear Buffer" signal can be supplied to pulse gates 1409 through 1412 to reset Toggles X13 through X16 (FIG. 14) respectively, of Input-Output Buffer 311 at Pre-Index clock. The Extract 1 line 1941 is one input to a three-input And gate 1413 connected to Or gate 1408. Line 1233 from the reset (left) side of Order Code Toggle X190 (FIG. 12) is a second input to gate 1413, and the output of an And gate 1414 is the third input. And gate 1414 is controlled by the levels on lines 1235 and 1556, identified "(PA2)+(PA4)" and "("1" in Ier) (Output Mode)," respectively. The levels on these two lines are therefore high when a PA4 sequence has been initiated and Buffer 308 has counted down to one, which is also the interval when a digit is retrieved at the count of "1" in Digit Counter 306 by shifting the bits of the digit into Input-Output Buffer 311, as mentioned previously. Thus, in a PA4 sequence when the count in Digit Counter 306 at Pre-Index time causes the level on Extract 1 line 1941 to become high (through appropriate connections in section 1940 of Plugboard 124) following retrieval of a given digit, then through And gate 1413 and Or gate 1408, a "Clear Buffer" level will arm pulse gates 1409 through 1412 and at Pre-Index clock replace that digit with a zero by resetting all four toggles (X13–X16) of Input-Output Buffer 311. Operation of Extract 2 through And gate 1414 is identical, but requires Order Code Toggle X190 (FIG. 12) to have been set by sensing of the 2 code (or equivalent).

After the last digit has been transferred, the selected Register 316 will be cleared unless the PA4 terminals 1931 in the Register lock portion 1930 of Plugboard 124 have been connected by a cable 1905. In the latter case, a level will be supplied to Head Gating circuit 313 to prevent Write Head W1 from turning on and writing zeros in the selected Register 316, as mentioned previously. From FIG. 12, it is seen that when a PA4 sequence has *not* been selected, there will be a high output on line 1245, an input to the Register Lock section 1930 of Plugboard 124. Accordingly, if a cable 1905 has been connected between the terminal pair 1932, there will be a high output on line 1933 which is one of the inputs to And gate 2413. An output from And gate 2413 passes through Or gate 2414 to give an output on Write Head W1 Controls line 2402. A high output on line 2402 is necessary to permit information from Write Toggle 2501 to pass to Write Head W1 through And gates 2503 and 2504. It follows then, that with a cable 1905 connecting terminals 1932 for PA4 Clear, the sensing of a PA4 instruction will result in disappearance of the high output on line 1245, with consequent blocking of And gate 2413 to prevent its output when an input from the circuitry corresponding to the selected Register would normally open gate 2413 and permit Write Head W1 to write zeros in that register area (more complete details of the actual clearance are given in the above-mentioned Pat. 3,265,874).

OUTPUT WITH ENTRY IN MULTIPLICAND REGISTER

The PA5 sequence is performed in a manner similar to a PA3 sequence except for additional transfer of the output to the Multiplicand Register.

When the PA5 Code (Ch. 1, 3, 5, 7 and 8) is transmitted to Processor Control 312, Toggles X170 and X180 (FIG. 12) will be set in indicate that a PA5 sequence is to take place.

The rest of this sequence will be the same as a PA3 sequence except for the revolution during which the digits are written in Buffer Registers 318 and the revolution at the end of the sequence when the selected Register 316 is normally cleared. During the 4th Quarter of the revolution in which the digits are written in Buffer Registers 318, Write Head W2 will be turned on such that the digits are also written into the D3 portion of Multiplicand Register 317.

After the last digit has been transmitted the selected Register 316 will be cleared unless the PA5 clear terminals 1932 in Plugboard 124 are connected by a cable 1905. Again, if these terminals are connected, a level will be supplied to Head Gating Circuit 313 to prevent Write Head W1 from turning on and writing zeros in the selected Register 316 in manner similar to that just described for the PA4 sequence.

ZERO SCAN SEQUENCE

A "Zero Scan," or PA6, sequence is used to investigate whether or not a Register 316 is clear. If the selected Register 316 is clear, the code programmed in the PA6 portion of Symbol Coding section 1910 of Plugboard 124 will be transmitted to Information Channels 208. A PA6 sequence consists of the following codes:

PA6, Register, and Process.

These instruction codes are transmitted to Processor 107 in the manner previously described for a PA3 sequence, and again will not print or punch since PA6 also is an output sequence. The PA6 code (Ch. 2, 3, 5, 7 and 8) when present in Information Channels 208 is decoded in Input Decoder 217 and a signal transmitted to Processor Control 312 to set Toggle X180 (FIG. 12) and PA6 Toggle 1316. The "one" state of these two toggles indicates that a PA6 sequence is to take place.

When the Process Code (Ch. 3, 5, 6, 7 and 8) is received, Go Toggle 1601 will be set to start this sequence. At the same time, Neg II Toggle 2002 will be set. The unit state of Neg II Toggle 2002 will be used to indicate whether the selected Register 316 is clear.

During the first revolution of Disc 301 while in this sequence, Multiplier Buffer 308 will be set to a count of two and a Complement Cycle performed as previously described for a normal output sequence (PA3). During this cycle, as usual, the contents of selected Register 316 will be read, subtracted from zero in Adder-Subtractor 310, shifted through Input-Output Buffer 311, and written in the appropriate Temporary Register 319.

If a digit other than zero is shifted through Input-Output Buffer 311 during this cycle, the level "0 in In/ Out Buf" will be produced through Or gate 1406 and transmitted via lines 1407 and 1407a to the Minus and Complement circuit (a part of controls 309 which is shown in FIG. 20) to reset Neg II Toggle 2002 through a three input pulse gate 2009, having as second and third inputs the "PA6" level on line 1317 from the set right side of Toggle 1316 and the output of Or gate 2011 on line 2010. Or gate 2011 will have an output at all times when Product Register 316 has not been selected, and at limited times in the latter case as will be seen below.

If Product Register 316 was the one selected, pulse gate 2009 to the reset (left) side of Neg II Toggle 2002 will not be armed during the time the supplementary portions of this Register 316 are being read, i.e. this toggle will be armed only when the level "1 in the Word Counter" is high, thus opening And gate 2012, which gate provides a second input to Or gate 2011. The above-described limitation is necessary because a round-off value is stored in the most significant position of the PP1 area. Also, if Product Register 316 was selected, Neg III Toggle 2003 is set at start of the PA6 sequence to detect presence of products requiring a negative half-cent round-off. If Product Register 316 does not contain a true zero, i.e. though Neg. II Toggle 2002 is still set, the half-cent round-off value is no longer present so that Neg III Toggle 2003 remains set, the set condition of this Toggle indicates not only the need for output of a "0.1 Credit," as previously discussed, but also for suppression of the "0" sensed output on line 1301.

After the Complement Cycle, Multiplier Buffer 308 will be counted down once per revolution of Disc 301. When Multiplier Buffer 308 arrives at the count of zero, the state of Neg II Toggle 2002 will show whether the selected Register 316 was clear. If Neg II Toggle 2002 is in the reset state, the code programmed for PA6 in Symbol Coding circuit 1910 of Plugboard 124 will not be transmitted to Information Channels 208. If Neg II Toggle 2002 is still set, i.e., only zeros were read from the selected Register 316 during the Complement Cycle, and Neg III Toggle 2003 is reset, the level " '0' Sensed" will be sent to line 1301 thru And gate 1318 on for the first three quarters of the revolution with count " '0' in Ier." The level (PA6) ("0" in Ier) (Output Mode) on line 1319 produced by And gate 1320, is used in the "0" sensed gate 1318 to indicate that a PA6 sequence is being performed, and the information in the selected Register 316 has been read, and the complement has been stored in the corresponding Temporary Register 319. This level on line 1319 is also used to indicate that it is time ("0" in Ier) to transmit the desired code to Information Channels 208. The level "Neg II" on line 2013 is used in And gate 1318 to indicate that the digits read during the Complement Cycle were zeros; otherwise, Toggle would have been reset. The level $\overline{4\text{th}}\ \overline{\text{Qt.}}$ is used in And gate 1318 to extend the transmission of the level "0 Sensed" to three Quarters of a revolution of Disc 301. This is done to insure that the code programmed in PA6 portion of Symbol coding Section 1910 of Plugboard 124 will be present in Information Channels 208 for the duration of the timing signal TF provided by multivibrator 401, as described below. The level $\overline{\text{Neg III}}$ is used in And gate 1318 to indicate that a negative product of a half-cent was not rounded off to zero, as discussed previously. The "0 Sensed" level on line 1301 is also transmitted to Or gate 1502 in the TF timing logic circuits (shown in FIG. 15), to enable the TF multivibrator 401 via line 1503, as explained previously. Presence of the level "0 Sensed" on line 1301 causes the code programmed in the PA6 portion of the Symbol Coding Section 1910 of Plugboard 124 to be transmitted to the information channels 208 via Code lines 1911 through 1918 and Encoder 219 (see FIG. 8).

All toggles except for Last Operation Output Toggle 1613 will be reset at the end of this revolution of Disc 301. As before, "Last Operation Output" Toggle 1613 will be used to control clearance of Buffer Registers 318 and Temporary Registers 319 when the next Digit Cycle is performed.

CLEAR SEQUENCES (A) Clear Storage—A "Restore Key" and a "Clear Storage Key" (neither shown specifically) form part of control keyboard 121. Depression of the Restore Key together with the Clear Storage Key will initiate a "Clear Storage Cycle." During this Cycle the contents of the unlocked Registers 316 will be erased and all toggles conditioned for an input or an output, as follows. Depression of these two keys together will close two of the switches 409 and 407. The high level on these lines will set Multiplier Buffer 308 (see FIG. 15) to a count of 15, as described below. Multiplier Buffer 308 will start to count down one count per revolution of Disc 301 after the Restore Key is released (note the Inverter 1558 which prevents an output to Or gate 1521 from And gate 1559 and thus prevents counting down so long as a ground level is present on line 406). During the time Multiplier Buffer 308 is at the counts of 15 and 14, a Clear Toggles Cycle will be present. The Clear Toggles Cycle level on line 1567 will reset all toggles except for Last Operation Output 1613, Type Now 1604, and Neg. III 2003. The Last Operation Output Toggle 1613 will remain set until a Digit Entry Cycle is started. This Toggle is used to cause clearance of Buffer Registers 318 (Buf. 1, 2 and 3) and Temporary Registers ($T_F$, $T_G$, $T_H$, $T_I$, $T_J$ and $T_K$). If Type Now Toggle 1604 has been set, it will be reset by the first TF pulse received on line 402 from the Control Unit 122. Similarly, if Neg. III Toggle 2003 is set, it will be reset at the start of the next PA sequence of any kind.

In detail, four identical pulse gates 1563 are arranged to set Buffer 308 to 15 (all four toggles in the unit state) at Digit Clock time when both the Clear Storage Key and the Restore Key are depressed. Buffer 308 will remain at the count of 15 until the Restore Key is released, as noted above. When the Restore Key is released, a count down potential (through And gate 1562 and Or gate 1521) will be present during the 4th Quarter so that Buffer 308 will count down to 14 in response to the next Quarter Clock. During the time the count is 15 or 14, the "one" outputs of Toggles X120, X130 and X140 (FIG. 15) are And gated (gates 1564 and 1565) to produce the output level "Clear Togs. Cyc." on line 1567 through Or gate 1566. The level "Clear Togs. Cyc." resets all other toggles (except Last Operation Output Toggle and the self correcting ones in the timing counters), as seen in FIG. 15.

At the beginning of the next revolution, Buffer 308 is counted down to 13, at which count, Write Head W2 will write zeros in Buffer Registers 318 (Buf. 1, 2 and 3), Temporary Registers 319 ($T_F$, $T_G$, $T_H$, $T_I$, $T_J$, and $T_K$), and in Multiplicand Register 317 (D1, 2 and 3). Also, during this time, Input-Output Buffer 311 will be set to a value of five. These steps are done in the following manner. The "one" state of Toggles X110, X130 and X140 and the "zero" state of X120 are gated (And gates 1564 and 1568) to produce the output levels "Half-Cent R.O. Cyc." and "Positive Half-Cent R.O. Cyc." on lines 1569 and 1570, respectively. The level "Half-Cent R.O. Cyc." is transmitted to Input-Output Buffer 311 through Or gate 1424 to set it at a value of "5" at Quarter clock time through four identical pulse gates 1425. The level "Positive Half-Cent R.O. Cyc." is transmitted to the Recording Circuit 321 to enable Write Head W2 to write zeros on the inner track.

At the beginning of the next revolution, Multiplier Buffer 308 is counted down to 12. At this count of 12, Write Head W1 will turn on. Registers, F, G, H, I, J and K will be cleared by Write Head W1 if they are not locked by the program in the Register Lock portion 1930 of Plugboard 124. Write Head W1 will also clear the Product Primary Register ($PP_1$, $PP_2$ and $PP_3$), except for the 12th position of PP1, and the Product Secondary Register (PS1, PS2 and PS3). During the time Write Head W1 is over the 12th position of PP1, the "five" in Input-Output Buffer 311 will be shifted out and written in this position for the purpose of providing means to round off products to the nearest half-cent (assuming the usual decimal location), as the products are recorded in Product Register 316. Also during this revolution of Disc 301 a "Clear Storage" light (not shown) will be turned on and remain on until the next PA sequence is initiated. In detail, during this revolution the "one" state of toggles X130 and X140 and the zero state of toggles X110 and X120 are gated (gates 1571, 1564 and 1573) to produce the output level "Clear Memory Cyc." on line 1574. This level is transmitted to Head Gating Circuits 313 and Recording Circuit 321 to enable Write Head W1 to write zeros on the outer track except for locked registers and for the 12th position of PP1, of course, note that for the sample application discussed later, the presence of a cable 1905 between terminal pair 1931 for register F will put a low level on line 1935 thus blocking And gate 2415 such that there is no output on Write W1 Controls line 2402 (through Or gate 2416, And gate 2417, Or gate 2418, And gate 2419 and Or gate 2414) during the period (2 in Word Counter and 2nd Quarter) when the F register 316 passes under Write Head W1, thus preventing clearance of that register. During the time that Write Head W1 is over the 12th position of PP1, the digit 5 previously set in Input-Output Buffer 311 will be transferred to Write Head W1 and recorded in this position. This is accomplished through And gate 2505 which enables output from Toggle X16 of Input/Output Buffer 311 to Write Toggle 2501 through pulse gates 2506 and 2507 by putting a high level on line 2508, Write Toggle Controls. The high output on line 2508, directly connected to Or gate 2420, results in a high output on "Shift Buffers" line 2421, to produce the desired shifting from Input/Output Buffer 311.

Following the count of 12, each successive revolution will merely count Buffer 308 down one more count until it reaches zero.

(B) *Restore During Digit Entry (PA1)*—Ordinarily, the program tape 123 contains the sequence control information for all programs, including those in which data are to be manually entered. In the latter instances, the program tape 123 in Reader 104 will supply the PA1 and Entry Order codes to Processor 107 before turning over control of the system to the operator for entry of numeric information. Should an error be made after entry of several digits, the operator might return the carriage 108 of Writing Machine 100 to the original position manually rather than by repeated depressions of the Backspace Key (not shown, but available in the keyboards of most commercial versions of Writing Machine 100—see keyboard FIG. 10, U.S. Pat. 2,905,298, for examples). In the first case, the Digit Counter 306 would remain at the setting which it had when the error was discovered, i.e. at some count one or more units lower than the original value set by the Entry Order code. In the latter case, the Digit Counter might have in it a value greater or less than the original value because of intermittent failure to backspace or occurrence of a double backspace due to maladjustment of the backspace mechanism. In either case then, the carriage 108 might start anew in the original position, but the corrected numeric information entered digit-by-digit on the document, would be accumulated in the wrong positions of the selected registers 316.

To obviate the possibility of incorrect results due to operator error or backspace failure, according to this invention Field Control 103 is used to prevent clearance of digit entries and to prevent restoring Digit Counter 306 to its original setting at other than one pre-programmed position of carriage 108 in any entry field, as follows. Field Control 103 in the system of the invention is of the form described in Pat. 3,120,301. Briefly, a length of perforated paper tape 2301 of the type prepared in Punch 106 for processing by Readers 104, 104–2, is mounted on the carriage 108 of Writing Machine 100 and eight sets of flexible electrical brushes (represented schematically by 2306, 2307 and 2308) sense tape 2301 (an insulator) for perforations 2304 located essentially in registration with letter-space rest positions of carriage 108. Where such perforations 2304 exist, the brushes 2306, 2307 will contact a conductive backing strip 2302 which is at a different potential (preferably ground as shown in FIG. 23). In the embodiment shown, Track (channel) 7 is used for control of the effectiveness of the Restore Key. As depicted, brush 2307 is in contact with an imperforate portion of tape 2301 and thus the level on 2307 is low. Were the carriage to be moved one space to the right, i.e. backspaced one position, brush 2307 would enter hole 2305 and make contact with backing plate 2302 and thus be brought to ground level.

Depression of the Restore Key during a PA1 sequence with the carriage 108 of Writing Machine 100 in a position such that brush 2307 is in a hole 2305, the program in Track 7 of Field Control 103 thus being effective, produces the following: Digits entered in Buffer Registers 318 are cleared; Decimal Modifier Toggles 1802 and 1803, Sign Reversal Toggles 2001, 2002 and 2003 and Register Indication Toggles 1804, 1808, 1809 and 1813 are reset and the original Order Entry value is restored in Digit Counter 306. The Restore Key must be depressed before the Process Code is received, otherwise the PA2 portion of the entry sequence might well have been initiated. During such a "Restore" operation, with neither Reader 104 "on," and with carriage 108 in a position to provide a high level on brush 2307, labeled "Field Control Ch. 7" in FIG. 23, all inputs (2203, 406 and 2307) to And gate 1615 are high and there is thus an output on line 1616.

Consequently, Toggle X160 (FIG. 12) is set at Quarter Clock through pulse gate 1230 because the level "Go" is present on line 1602 (because the Process Code has not been received) and because the level on line 1239 (output of And gate 1238, with inputs on lines 1237a from an And gate output of the reset side of Toggle X160 and line 1236c from the set side of Toggle X170 and the reset side of Toggle X180, FIG. 12) is also high. Through Or gate 1231 there will then be an output on line 1232, labeled "(PA2)+Output Sequence." With a high level on lines 1232, 1616a and 1602a, Type Now Toggle 1604 will be set at Digit Clock time through pulse gate 1617. Through And gate 1618, a "Clear Sequence" will therefore be initiated for one revolution of Disc 301. The "Clear Sequence" level on line 1619 is used to reset any of the Decimal Modifier, Sign Reversal or Register Indication Toggles that may have been set during the early part of the PA1 Sequence. This is seen from FIG. 17 where line 1619 leads to Or gate 1706, the other of the two inputs of which is "Clear Toggles Cycle" on line 1567. The output of Or gate 1706 supplies other Or gates and the high level on line 1619 thus gives rise to outputs on lines 1707, 1708, 1709 and 1710, labeled "Reg Togs→0," "Prod. Tog→0," "(Icand+Output On) Tog→0," and "Neg I and II Togs→0," respectively. These lines lead to various pulse gates 1810 and 2016 which reset the respective toggles at Pre-Index time. Note that the signal "Neg I and II Togs→0" also resets Decimal Modifier Toggles 1802 and 1803 together with Ier Toggle 1813, through more of the pulse gates 1810. At the end of this revolution Go Toggle 1601 will be set, stopping the Clear Sequence.

During the next revolution of Disc 301 a "Clear Buf 1–3 Cycle" will occur. In this cycle, Write Head W2 will clear Buffer Registers 318 and Temporary Registers 319. The Digit and Word Counters (306 and 307, respectively) will be reset to zero during the 1st Quarter of the revolution. The original Order Entry value stored in Multiplier Buffer 308 will be used during the 2nd Quarter to set the Digit Counter 306 to a corresponding count. The setting occurs through the armed ones of pulse gates 615 through 618 when triggered by a Digit Clock. The arming of pulse gates 615 through 618 occurs through outputs from And gate 624 and from the set side of the toggles in Buffer 308 on lines 1575 through 1578. Go Toggle 1601 will be reset at the end of this revolution.

Because Type Now Toggle 1604 is still set, and Go Toggle 1601 has been reset, an output on line 1622 will turn on a "Restore" light. This indicator will remain on until the first digit of a new PA1 sequence is entered and produces a TF pulse to reset Type Now Toggle 1604 at Pre-Index time through pulse gate 1623.

(C) *Skip.*—The term "Skip" refers to an idle advance of the media in an active Reader 104 (or 104–2) to by-pass a part of a program. Special Skip refers to an idle advance of a tape loop in Reader 104 to a start position even when the other Reader 104–2 is active, i.e. sensing and transmitting codes. Initiating a Skip or a Special Skip operation after receipt of one or more of the codes in a PA1 sequence, excluding the Process Code, will reset the PA toggles (X150, X160, etc., FIG. 12) and condition the other toggles for a different PA sequence.

The level "(SkL)+(R̄d̄r̄2̄) (SpSk)" is transmitted to Processor 107 when a Skip or a Special Skip operation has been initiated. The first term "Skip Logic" (SkL) is produced if Reader 1 (104) is "on" and Skipping, or if Reader 2 (104–2) is "on" and Skipping, or if Reader 1 (104) is "on" and Special Skipping. The circuitry for producing this level on a line 2208, as shown in FIG. 22, uses inverted logic comprising three Or gates 2205 the outputs of which pass through an And gate 2206 and an inverter 2207 supplying line 2208.

If Reader 2 is off, but Reader 1 is Special Skipping, the second term "Reader Two and Special Skip" is produced through And gate 2209. The combination of the two terms is supplied to line 2211 by Or gate 2210. When the level "(SkL)+($\overline{\text{Rdr2}}$) (SpSk)" is present on line 2211 and the Process Code has not been received ($\overline{\text{Go}}$ Level therefore present on line 1602), And gate 1575 will give an output which will reset Multiplier Buffer 308 to zero through Or gate 1575 and pulse gates 1522 through 1525 at the next bit clock. Additionally, through Or gate, 1566, there will be an output on line 1567 and a Clear Toggles Cycle will be initiated. Multiplier Buffer 308 is reset to zero so that it will not start to sequence the output of information before the Clear Toggles Cycle can prevent output by resetting the toggles in Process Control Circuit 312 which indicate the PA sequence. Also, this cycle will reset all of the other toggles (Go Toggle 1601, Neg I and Neg II Toggles 2001 and 2002, respectively, etc., see FIG. 17) except for Last Operation Output 1613, Type Now 1604 and Neg III 2003, as mentioned previously.

TYPICAL CIRCUITS

The circuit elements used in this structure are not novel, or if novel, are described in the copending applications identified earlier. The And gates and Or gates used in these circuits are, in general, ordinary diode gates. The "toggles" referred to herein are Eccles-Jordan type circuits, also known as flip-flops or bistable multivibrators, and can be conventional transistorized units such as are described in chapter 11 of "Design of Transistorized Circuits for Digital Computers" by A. I. Pressman, published by John F. Rider, March 1959. The pulse gates referred to herein are multi-input resistance gate modules as described in chapter 8 of the above-mentioned reference, with the sole difference that, as mentioned earlier, an isolation diode is connected to the output of each gate and that a clock signal line is capacitively coupled in parallel with the resistance elements of the gate. Thus, these gates give an output only when all inputs are high and a clock signal is applied to the capacitor, as will be clear to those skilled in the art. With two exceptions, all inverters are simple one-stage common emitter amplifiers, the output of which is obtained from the transistor collector in well-known fashion. The two exceptions are inverters 713 and 723, which also provide buffering (because of heavy current requirements) between the output gating and the solenoids used for operating the recording elements of punch 106 and typewriter 100. These two elements are inverting transistor amplifier circuits each having three stages of amplification. Many buffers have been used elsewhere in the circuits, but are not indicated in the logic diagrams since they have no logic function. These buffers are, in general simple one-stage transistor amplifiers connected as emitter followers. Clock shaper 403 comprises an RC differentiating circuit in combination with an inverter. The RC circuit differentiates the leading and trailing edges of the TF pulse, but only the latter (negative) has any effect upon the inverter. The RC circuit output is negative for about 500 microseconds which determines the duration of the positive-going clock pulses.

Typical circuits and design information for these kinds of components may also be found in "Digital Computer Principles," contributed by the staff of Burroughs Corp., McGraw-Hill Book Co. 1962, chapters 9, 10, and 14 or the "Transistor Manual," contributed by the staff of the General Electric Co., published by the General Electric Co., 6th edition, 1962, chapter 11, or "Transistor Circuit Design," contributed by the staff of the Texas Instrument Co., McGraw-Hill Book Co., 1963.

SAMPLE APPLICATION

FIG. 26 shows a sample application which, though it may not represent the best programming technique, does serve to illustrate the advantages of several aspects of this novel computer control system. The example chosen is an invoice operation and the program required for automatic processing of fixed data from tape (or edge-punched cards) with operator intervention for entry of variable data is shown in FIG. 27. The program comprises an assembly of instruction characters on a tape loop 123, together with other assemblies of instruction characters and invariable data (item identification, price, description, taxes, etc.) on edge-punched cards, which are equivalent to tape strip 125. The program is interrupted in known fashion at appropriate locations to permit the above-mentioned operator entry of variable data. In this program each of the characters on tape loop 123 and the edge-punched cards (equivalent to tape strip 125) is presented in a sequence in a respective column and identified by an abbreviation of the code name, each code name being described briefly when first introduced for ease of understanding. The input unit sensing the media (tape or card) which the code is read is also identified by an appropriate column heading. The propagation of information is shown in a column which indicates the output recorded by paper-tape Punch 106.

The program instructions are provided to Processor 107 a character at a time and its ability to accept instructions interspersed with other data will be illustrated in connection with these two figures. As examples, the date at 2602 in the heading of and the item designation codes sample invoice 2601, the item identifications at 2603, and the /M or decimal modifier code at 2605 in the body of invoice 2601 will be considered. Use of a PA6 instruction to eliminate an operator decision when there is no discount in a line entry as at 2604 in the body of 2601 will also be described.

At start of a day's set of invoicing operations, an "Initial Loading" operation controlled by a program on a special card precedes preparation of any invoices. In this Initial Loading, all registers 316, 317, 318 and 319 are cleared, the number to be assigned to the first invoice is entered into storage, and the month and day of the date are also entered into storage for automatic recall under control of the main program loop as each invoice is prepared. As seen at 2701 in FIG. 27a, a PA1 is provided in this "Load Card" (125) to prepare for operator entry of six digits for indication of the first invoice number to be typed on the first invoice of the day. The character following the PA1 code is a 6. As previously described, this digit will be treated as the order code inasmuch as it follows the PA1 code. It will not therefore print or punch but will merely set Digit Counter 306 and Multiplier Buffer 308 to the initial entry order value "6." The stop code—indicated by the letters STP—which is sensed next, stops Reader 1 (104) and turns control of the systems over to the operator. The operator then types the six digits of the next invoice number and these are entered into Buffer Register 318 beginning with the sixth ordinal position as required by the setting of Digit Counter 306. As the last digit is typed and the carriage 108 escapes into the next typing position, hole 2305 in Field Control track 8 of tape 2301 will turn Reader 1 (104) on and control will then pass to the automatic system such that the F Register code at 2702 and the Process code following it will be sensed and the invoice number stored in the F Register, as previously described. If the operator made an error during entry of the six digits, it would merely be necessary to depress the Restore key (not shown, but one of the control keys 121) with carriage 108 returned to initial digit entry position and Buffer Register 318 would be cleared, the original order code, "6," would be transferred from Multiplier Buffer 308 to Digit Counter 306, as previously explained, and the system would then be ready for insertion of the correct digits of the invoice number. If an error in just one digit was made, then it would merely be necessary to depress the Backspace key (not shown, but one of the keys found in a standard typewriter keyboard, such as keyboard 120) and the count down process would be delayed such that the count in Digit Counter 306 would be restored to the previous count after one revolution of Disc 301 as previously described. Thus upon depression of the correct digit key, the correct value would be entered into the position where the error was made previously. As to the typed form, the incorrect digit could be erased or merely struck over by the correct value.

A first example of the interruption of a Processor instruction while the system responds to other data is shown beginning at 2703 in FIG. 27a. At that point, a PA1 instruction is provided to prepare for subsequent operator entry of two digits for identification of the month and two digits for identification of the day upon which the invoice operation is taking place (Corresponding to 2602 in FIG. 26). The zero following the PA1 code will be treated as the order entry indicator, also as described previously, and consequently the first digit of the month will be entered in the tenth position of each of Buffer Registers 318 for subsequent entry to the selected register. In FIG. 26, a virgule is shown between the digits for the month and the digits for the day. As shown in FIG. 27a, to afford automatic entry of the virgule in the Initial Loading operation, Field Control 103 turns on Reader 1 (104) after the operator has typed two digits for the month and the program interrupts the PA sequence to insert a Code Control Off code, the virgule, and a Code Control On code successively at 2704. The Code Control Off code is necessary because a virgule code sensed in Reader 1 (104) during a Processor Instruction sequence would otherwise be ignored and there would be no output to Printer 100 or Punch 106. After entry of two digits of the date, Field Control 103 again turns control of the operation to Reader 1 (104) to terminate the "Initial Loading" operation, the "Process" code being followed by a number of codes which return the system to a neutral state in preparation for removal of the Load Card (125) and insertion of program loop 123 in Reader 1 (104). The operator is then ready to commence preparation of the various invoices. For this purpose, it is not necessary for tape loop 123 to be inserted with any particular position at the reading station as the operator may bring it to starting position by depressing a Special Skip key, causing the tape to feed to the position defined by the Special Skip Off code, i.e. the starting position as shown in the tape loop portion of the program at 2700 in FIG. 27a. The operator inserts the proper form 2601 in writing machine 100, sets carriage 108 at the "Sold To" position, and turns on Reader 1 (104). The first instructions on program loop 123 deal with invoice heading operation and therefore are necessary only at the beginning of each invoice 2601. During this heading operation, program loop 123 provides control information necessary to obtain the fixed data such as the customer name from the Header Card (125) in Reader 2 (104–2) and to allow the operator to enter variable information such as shipping information—name, address, etc. of the destinatee—as indicated by descriptions in the leftmost column in FIG. 27b. The codes for this purpose were omitted as they are not pertinent to the present discussion. After entry of this information, there will be an automatic read-out of the invoice number from the F register, where it was stored originally by the "Initial Loading" operation. This read-out is obtained by means of the PA5 code at 2706 in FIG. 27b. The PA5 code is preceded by a "Punch On" code identified by the leters P1N and, further, the PA5 instruction word includes a 2 code for selection of the second format for the output from the F register. The latter is necessary because the high order end of the F register will be used for temporary storage of the quantity of each line item, as will be seen later. The connections in Plugboard 124 for this example are shown in part on FIG. 19a where it is seen that the F register terminals 1902 for the second format are connected by cables 1905 to the "Order 6" output line 1907, to the "No-Decimal" output line 1906, and to the "Order S1" output line 1907. All six digits of the invoice number will then be available for read-out. Inasmuch as there is nothing in the F register at this time in the higher order positions, it is not necessary to use an "Extract" or PA4 instruction. Of interest here also is the fact that the 2 code, a digit code that is normally punched or printed neither punches nor prints at this time even though both recording devices are enabled, because the digit code is recognized as an instruction code rather than data. Similarly, the next Processor Access word at 2707, a PA5 instruction word for reading out the two digits for the month stored in the H register during the original Loading Operation, also includes the 2 code for selection of the second format. Again the 2 code will neither print nor punch for the reasons given above. This second PA5 sequence is followed by a virgule preceding a third PA5 sequence for reading out from this same H register the two digits for the day stored during the original Loading Operation. The 2 code is not included because the first format is desired. The H register plugboard connections are not shown in FIG. 19a, but for this example it is necessary that the first format be provided by connections to "Order 8" line 1907 (start), "No-Decimal" line 1906, and "Order 6" line 1907 (stop). The second format for the H register must be connected, on the other hand, to "Order 10" line 1907 (start), No-Decimal line 1906, and "Order 8" line 1907 (stop). Thus, with the 2 in the PA5 sequence beginning at 2707, the second format which starts output at Order 10 and ends it at Order 8 will be used and therefore will print out the two digits of the month. These digits are then followed by the printing of the virgule under control of program loop 123 and the printing of the digits of the day by the PA5 sequence at 2708 in which the contents of the H register are again read out, but this time—under control of the first format connections—starting at Order 8 and terminating at Order 6. In this instance, the virgule is not preceded by a Code Control Off code and succeeded by a Code Control On code. These are unnecessary here because the virgule does not occur within the PA5 sequence of instructions. The remainder of the instructions in this portion of tape loop 123 relate to completion of the heading operation and, not being pertinent to the invention, will not be discussed. At conclusion of the heading operation, the Header Card (125) is removed from Reader 2 (104–2).

The operator is then ready to begin the next phase of the program, and therefore inserts an Item Card (125) in Reader 2 (104–2) and turns on Reader 1 (104) to initiate reading of instructions for processing the line item entries in invoice 2601. The form is automatically spaced over to the beginning of the quantity field, followed by an instruction code P1N for turning on Punch 106 and by a PA1 code at 2709, in preparation for the operator's typing of the quantity of the item. The PA1 code is followed by the code for a "9" to determine the order entry position and thereafter by a Stop code which permits the operator to take over control and enter three digits for the quantity. It should be pointed out that the limitation to three digits is not essential because if the operator needs to enter four digits of quantity, operation of the backspace key will increase the digit identifying the order by a value of 1 (to a "10" in this instance) such that the most significant digit will be entered one position higher than indicated by the digit code set up by the PA1 instruction the ("9"). After the operator has entered this quantity, the F and D codes, which come next, cause the quantity to be stored beginning with the ninth position of the selected registers, the F register and D register in this case. The form will then be automatically tabulated to the next field for automatic entry of an item-identification. In this sample application, the item-identification is a mixed series of letters and numbers, which serve the additional purpose of supplying the unit cost for storage in memory Disc 301 pending subsequent use. The unit cost must be masked, of course, as this information is not intended for the customer. The item-identifications for the three items represented by the Item Cards 1, 2, and 3 (125), are shown at 2603 in invoice 2601. For entry of this data, the next code in tape loop 123 is a PA1 code at 2710 followed by the usual entry order code (a "6" in this case) and a Switch code to transfer control to Reader 2 (104–2) in which the Operator has placed the first item card (125). The information present on each Item Card 125 inserted in Reader 2 is shown under three columns labeled Reader 2. The information from three cards is shown in correspondence with the three lines of items in the invoice of FIG. 26. Considering first the initial line item, the data for which is in Item Card 1, at 2711 the first instruction code in that item card is a Code Control Off code in response to which the Code Control toggle 2105 will be reset, putting a low level on line 2108. The next two codes, the 5 and the C (see 2603, uppermost line), will be reproduced by Punch 106, but though normally effective these will not now have any effect on Processor 107 because the low level on line 2108 will prevent an output on line 1302 through And gate 1322, therefore preventing the "Sync" signal which would transfer information in lines 701'–708' to the code lines 1111–1118 of Processor 107. The Code Control On code reverses the setting of Toggle 2105, thus signifying that succeeding data or instruction codes are to be responded to by Processor 107. The next two codes turn off Punch 106 and the Printer (Writing machine 100) because the two space codes following are to be sent only to Processor 107, where they are required since the entry order code at 2712 allows for six digit code numbers, but only four digits are used in the code number of the first item card. Following these space codes, Printer 100 and Punch 106 are turned on again (Toggles 2106 and 2104 being set, and the levels on lines 2107 and 2109 being high, therefore) and the remainder of the item identification number, four digits in length and representing the unit cost of the item, will be both printed and punched. The next code in Item Card 1 (125) will switch control of the system back to program loop 123 in Reader 1 (104) where the J code will select register J for storage of the unit cost information. Note that if desired, further ineffective codes could have been interspersed within the cost information for better masking. In Item Card 2, on the other hand, the code contains a letter M which signifies a decimal modifier; however, this decimal modifier produces an effect only when the operation to be performed is a multiplication, i.e. involves the multiplicand (D) register 317. The code has no effect in a simple entry into one of the other storage registers 316 such as is being performed in this instance, as was explained previously. The M cannot be ignored entirely, however, because it must be recorded by Punch 106 along with the rest of the codes. Accordingly, the sequence of the codes is first, codes which turn off Punch 106 and Writing Machine 100, followed by a space code for the most significant digit, then codes turning on the printer again for entering the next most significant digit (a "4") into Processor 107 and for recording it by Punch 106. The succeeding code is a "Code Control Off" code to ensure that the M code which follows will not have any effect upon the decimal control circuits 309 of Processor 107. Though there would be no effect upon the positioning of the information since the entry in this instance is to the J register and not into the D or R registers. This precaution is taken because the /M toggle 1803 has a dual control function as mentioned earlier. The alternate function of Toggle 1803 is that of indicating the occurrence of the decimal point output, and if allowed to set here, it might interfere with a subsequent output operation. The Code Control On code which follows assures in turn that the "9915" of the cost information will be both entered in Processor 107 and recorded by Punch 106. The Switch code then returns control to program loop 123 in Reader 1 (104). The item-identifying code in the third item card 125 is essentially the same as that in the second card except for the fact that the Q code has no significance insofar as the control system of Processor 107 is concerned. Following entry of the masked unit cost, there is a non-recorded entry (PA1) of the price from the item cards into the R register and initiation of multiplication in the manner briefly described previously. Note that in Item card 2 the price information is succeeded at 2713 by an M which will be effective in this PA1 sequence to cause a decimal shift of three places in the product generated, also as briefly described previously. The reason for a non-recorded entry of price at this point is that computation can be performed while the description is being typed and the time for computation thus masked. Following the typing of the description, there is another tabbing of the form to the price field where the price is now printed in the desired location on the form. The second price information in item card 125 does not follow a PA1 code on program loop 123; hence, it has no effect insofar as Processor 107 is concerned. During tabulation to the price field, there will be a non-recorded transfer of the Product Register 316 to Multiplicand (D) Register 317. From the price field of invoice 2601, tape 123 will cause tabulation to the discount field. At the discount field, the program in tape loop 123 has provision for operator entry of two discounts, each two digits in length. After the operator types the two digits of the first discount, Reader 1 (104) will be automatically turned on (via Field Control Track #8) and the program will enter the first discount in the R register and also in the K register for purposes explained subsequently, both entries being performed negatively such that the product will be accumulated negatively with the original amount in the P register, thus generating a net (discounted) amount. Following multiplication, a PA6 operation is scheduled for scanning of the K register as seen at 2714. The reason for this is that if there was no entry of a first discount, as is the case at 2604 on invoice 2601, scanning of the K register will reveal a zero content and develop a signal on the "0" Sensed line 1301, as previously explained. Then, through the Symbol Coding section 1910 of Plugboard 124, as shown in FIG. 19d, a Skip-On code (Ch. 1, 3, 8) will be generated to bypass program codes (note SKF code at 2715) for entry of the second discount and performance of a second multiplication. There will then be a read-out of the net amount (or the original amount if there was no discount) initiated by a PA3 sequence at 2716, followed by a transfer of this net amount into the G register for development of a total. Another PA3 at 2717 for read-out of the K register is required for the purpose of clearing the K register, inasmuch as a new entry will be made to K at the discount field during processing of the next line item. Should that discount be zero and a previous value still be in the K register, the desired "0" Sensed level would be produced on line 1301. Following computation of the net amount, the program in tape loop 123 provides for extraction of quantity from the F register, where it was stored in the most significant positions adjacent to the storage positions of the invoice number. This extraction is performed by the PA4 code at 2718 and is controlled by the connections in the Extract 1 and Extract 2 sections of the Plugboard 124, shown at 1940 in FIG. 19d. The second format of the extraction is the one chosen in this PA4 (note the 2 code) and it is seen from FIG. 19d that zeroes will be inserted for all digits of the invoice number, thus leaving only the quantity number to be used substantially. With the extracted quantity in Buffer registers 318, a PA2 sequence will now transfer it to both the D and the F registers negatively because of the N code at 2719. The subtraction is required to clear the F register of the quantity in preparation for entry of the new quantity during processing of the next line item. The next codes in tape loop 123 are a PA3 sequence at 2720 to read out the J register, in which the unit cost has been stored, for the purpose of printing the unit cost and having it accessible for transfer to the R register and multiplication of unit cost times quantity. This transfer is initiated by the PA2 sequence which follows at 2721. It will be noted at 2722 that in Item card 2, the "Code Control Off" code is followed by a virgule, an "Upper Case" code, the "M" code, a "Lower-Case" code, and the "Code Control On" code. This sequence is provided for the purpose of causing the /M to be printed by Writing Machine 100 (as shown at 2605 on invoice 2601) and recorded by Punch 106 because the M code alone, though effective in PA2 sequence of instructions, would not be recorded. Upon inserting a Code Control On code and repeating the M code, the M will then set Toggle 1803 causing the decimal modifier action in the manner described previously. The Switch code following the M code returns control to the program loop tape 123 in Reader 1 (104). The unit cost having been entered in the R register together with any appropriate modifiers, a multiplication is initiated when the Process code is read at 2723, the product being stored in register P (316), from which it will be caused to read out by the subsequent PA3 code at 2724. The cost amount is then subsequently transferred (PA2 code at 2725) to register I for maintaining a total of this entry.

The codes on program loop 123 which have just been presented with respect to the line item operations will be repeated three or more times to allow for an average number of line items in an invoice so that it is not necessary to return program loop 123 to the initial point and have to skip the heading information each time.

Having completed the line items, the operator removes the last Item card (125) and inserts the Tax and Freight Computation card (125) in Reader 2 (104-2). The program in this card does not present any examples of operation according to the novel control system except at 2726, where a PA1 code and a "4" code prepare Processor 107 for manual entry of four digits of freight charges. If there is no freight charge, then the operator depresses the Skip key and the effects of the PA1 code and 4 code at 2726 will be nullified through the Clear Cycle initiated by the Skip circuitry when a PA1 sequence of characters was begun, as previously described. After the freight computation, a total computation is performed according to the program in a Total Card (125). The Total program will not be gone into in detail as it presents no further examples of the advantages of the current invention. It might be of interest though to note that the Special Skip On code at 2727 causes Reader 1 (104) to idly advancce the tape loop 123 while Total Card (125) is being processed. This movement continues until tape loop 123 arrives at its initial position at the beginning of the "Heading" operation. Further, the terminal PA1 sequence at 2728 in Total Card 125 provides for augmenting the invoice number by one. Both these operations prepare the machine for insertion of the next invoice form.

While specific forms of the invention have been described for purposes of illustration, it is evident that many changes (including use of different codes) could be made without departing from the spirit of the invention. As a matter of economy for instance, logic disclosed could be further optimized by application of De Morgan's laws in many places to reduce the number of components though it has not been done herein to avoid complexity of explanation. Such is considered to be within the scope of the disclosure. The present embodiment is therefore to be considered in all respects as illustrative and not restrictive, the scope of the invention being indicated by the claims rather than by the foregoing description and all changes which come within the meaning and range or equivalency of the claims are therefore intended to be embraced therein.

We claim:

1. In a computer controlled by record media containing instruction words formed by a variable-length series of characters, including alphanumeric characters, the combination of:

a reader for sequentially sensing characters in the record media;
a control character stored on the media, said control character determining a particular computer operation;
a plurality of alphanumeric characters stored on the media following said control character;
means providing at least some of said alphanumerics with a control significance in response to the prior sensing of said control character;
an "Execute the Instruction" character stored on the media following said alphanumeric characters;
a plurality of bi-stable elements;
means responsive to the sensing of said some alphanumeric characters to set related ones of said bi-stable elements in one of two states; and
sequence control means in said computer for performing said particular operation as determined by the states of said related bi-stable elements, in response to the setting of said bi-stable element related to said "Execute the Instruction" character.

2. A computer as defined in claim 1, and further including:

means for idly advancing the record through said reader while permitting response only to an instruction halting said idle advance;
means providing a discrete signal for initiating said idle advance; and
means for resetting said set bi-stable elements to the other of said two stable conditions in response to the occurrence of said discrete signal prior to the sensing of said "Execute the Instruction" character in said word.

3. A computer control as defined in claim 2 wherein said discrete signal is generated by said computer as a result of an internal operation.

4. In a computer controlled by record media containing instruction words formed by a variable-length series of characters, and having a plurality of storage registers containing data, the combination of:

a reader for sequentially sensing characters in the record media;
a control character stored on the media, said control character determining a particular computer operation;
an alphanumeric character stored on the media following said control character;
means providing said alphanumeric with a register-selection significance in response to the prior sensing of said control character;
an "Execute the Instruction" character stored on the media;
a plurality of bi-stable elements;
means responsive to the sensing of said characters to set related ones of said bi-stable elements in one of two states; and
sequence control means in said computer for performing said particular operation on the contents of said selected register as determined by the states of said related bi-stable elements in response to the setting of said bi-stable element related to said "Execute the Instruction" character.

5. In a data processing system having a system control, a normally-enabled recording device, an externally-programmed computer, a record medium storing the program, and a reader for sensing the information on the record sequentially by character; said information comprising data and a plurality of control characters variously indicative of computer operations, system control operations, and operations of the recording device, the data including alphanumeric characters; the combination of:

a first control character in said record indicative of a first mode of operations such that succeeding control characters are to be responded to, and the recording device disabled with respect to such characters;
a second control character in said record indicative of a second mode of operations such that succeeding control characters are to be recorded, and response to such characters disabled;

a bi-stable element settable to one state in response to sensing of said first control character by said reader and settable to the other state in response to sensing of said second control character by said reader;

a plurality of characters in said record comprising a computer instruction including an initial character defining the computer operation, said plurality of instruction characters being located after said first control character in said record;

means responsive to the sensing of said initial instruction character to cause subsequently sensed alphanumeric characters to be treated as control characters when the system is in said first mode of operation;

an alphanumeric character inserted in said plurality of computer instruction characters, said alphanumeric being preceded by said second mode control character; and means responsive to said other state of said bistable element to inhibit said means for disabling the recording of control characters, whereby said inserted alphanumeric character will be recorded.

6. In a data processing system having a system control, a normally-enabled recording device, an externally programed computer, a record medium storing the program, and a reader for sensing the information on the record, said information comprising data and a plurality of control characters variously indicative of computer operations, system control operations, and operations of the recording device, the data including alphanumeric characters; the combination of:

a first control character in said record indicative of a first mode of operation such that succeeding control characters are to be responded to, and the recording device disabled with respect to such characters;

a second control character in said record indicative of a second mode of operation such that succeeding control characters are to be recorded, and response to such characters disabled;

a bistable element settable to one in response to sensing of said first control character by said reader and settable to said other state in response to sensing of said second control character by said reader;

a plurality of characters in said record comprising a computer instruction, including an initial character defining a data entry operation, said plurality of instruction characters being located after said first control character in said record;

means responsive to the sensing of said initial character to disable the recording of alphanumeric characters by said recording device;

an alphanumeric character inserted in said plurality of computer instruction characters, said alphanumeric being preceded by said second mode control character, means responsive to said other state of said bistable element to inhibit said means for disabling the recording of alphanumeric characters, whereby said inserted alphanumeric character will be recorded, first signal means indicative of a control character as a class, operable in response to sensing any of said control characters;

second signal means responsive to sensing of said initial character;

a source of timing signals enabled in response to sensing of said first control character; and an And gate supplying an output to operate said first signal means, said And gate being jointly controlled by a signal from said second signal means and a timing signal from said source.

7. A data processing system as defined in claim 6, wherein said initial character in the computer instructions alternatively defines a transfer of information from the computer to the recording device.

8. A data processing system as defined in claim 5 and further including:

a control character identical to said first control character, said identical control character being located in said record immediately following said alphanumeric character inserted in said plurality of computer instruction characters; and a final character in said computer instruction having the significance of an "Execute" command, whereby said inserted character is recorded by the recording device and the succeeding mode control character renders the remaining computer instruction characters, including the "Execute" command, effective.

9. A data processing system as defined in claim 8, wherein the computer instruction characters include predetermined ones of alphanumeric characters having significance variously as register selectors, sign modifiers and decimal position modifiers, and said inserted alphanumeric character is chosen from said predetermined ones of the alphanumeric characters, whereby said preceding second control character and said succeeding first control character provide for recording said inserted alphanumeric character while inhibiting any effect on the computer instruction.

10. In a data processing system having a system control, a normally-enabled recording device, an externally-programmed computer, a record medium storing the program, and a reader for sensing the information on the record, said information comprising data including alphanumeric characters and a plurality of control characters variously indicative of computer operations, system control operations, and operations of the recording device, the combination of:

a first control character in said record indicative of a mode of operation such that succeeding control characters are to be responded to, and the recording device disabled with respect to such characters;

a bi-stable element settable to one state in response to sensing of said first control character by said reader;

a plurality of characters in said record comprising a computer instruction, said instruction having an initial character defining a computer entry and including numeric data to be entered, said plurality of characters being located after said first control character on said record;

means responsive to the sensing of said initial instruction character to cause subsequently sensed alphanumeric characters to be treated as control characters when said bi-stable element is in said one state;

signal means indicative of a numeric character as a class, operable in response to sensing any numeric; and means responsive to a particular output from said signal means to inhibit said means for causing subsequently sensed alphanumeric characters to be treated as control characters, whereby all numeric characters sensed after occurrence of said particular output are entered and recorded.

11. A data processing system as defined in claim 10, wherein said means to cause subsequently sensed alphanumeric characters to be treated as control characters comprises a second bi-stable element settable to one state in response to the sensing of said initial instruction character and means responsive to the one state of said second bi-stable element and to an output from said numeric signal means to generate a signal identifying said numeric character as a control character, and means for setting said second bi-stable element to its other state in response to an output from said signal means whereby the entry and recording of the first numeric character is inhibited while all numeric characters sensed subsequent thereto are entered and recorded.

12. In a data processing system having a system control, a normally-enabled recording device, and externally-programmed computer, a record medium storing the program, and a reader for sensing the information on the record, said information comprising data including alphanumeric characters and a plurality of control characters variously indicative of computer operations, system control operations, and operations of the recording device, the combination of:

a first control character in said record indicative of a mode of operation such that succeeding control characters are to be responded to, and the recording device disabled with respect to such characters;
  a first bi-stable element settable to one state in response to sensing of said first control character by said reader;
  a plurality of characters in said record comprising a computer instruction, said instruction having an initial character defining a computer entry and including numeric data to be entered, said plurality of characters being located after said first control character on the record;
  means responsive to the sensing of said initial instruction character to cause subsequently sensed alphanumeric characters to be treated as control characters, said means comprising a second bi-stable element settable to one state upon sensing of said initial character defining an entry operation, and an And gate having two inputs, one of said inputs being the one state of said second bi-stable element;
  signal means indicative of a numeric character as a class, comprising an Or gate having an output in response to sensing of any numeric; and further including:
  a first inverter for the output of said And gate, an output signal from said inverter being required to operate said recorder;
  a second inverter for said Or gate output, the output of said second inverter being supplied to the other input of said two-input And gate, whereby sensing of said numeric characters will prevent an output by said second inverter, thereby permitting said first inverter to provide an enabling input to said recording device for recording said numerics.

13. A data processing system as defined in claim 12, wherein said Or gate has additional inputs representative of a space character, a backspace character, decimal modifier characters, a decimal point character, and a negative sign character.

14. In a computer controlled by record media containing instruction words formed by a series of characters and having numerical address information preceding numerical data information in the series, the combination of:

a control character on the media indicative of a data entry operation;
  reading means for sequentially sensing the characters in the record media;
  a bi-stable element;
  means responsive to the sensing of said control character to set said bi-stable element in one of two conditions;
  means for detecting numeric information in the sequence and providing a signal indicating such detection;
  address storage means;
  means for storing said numeric information in said address storage means in response to said signal when said bi-stable element is in said one condition;
  means responsive to said signal to reset said bi-stable element to the other of said two conditions;
  a register for storing numeric information at a plurality of addresses; and
  means responsive to said signal, when said bi-stable element is in said other condition, to store succeeding numeric information in said register at the address controlled by the information in said address storage means.

15. In an externally-programmed computer system wherein the program comprises a variable-length series of alphanumeric and control characters on a record medium, together with a reader for sensing the characters on the record medium sequentially, and a device for recording alphanumeric characters, the combination of:

a numeric character recorded in the medium, said character having a discrete value;
  a storage register having a plurality of storage positions;
  means uniquely defining each of said positions;
  a control character on the medium, indicative of data entry into said storage, said control character preceding said numeric character;
  a bi-stable control element;
  means responsive to the sensing of said control character by said reader to set said bi-stable element in a first one of the two stable states;
  first signal means indicative of a numeric character as a class, operable in response to sensing all numerics, including said numeric character;
  second signal means indicative of a control character as a class, operable in response to sensing of all control characters, including said data entry character;
  means for enabling the recording device;
  means for disabling the recording device in response to operation of said second signal means;
  normally-enabled means for storing a numeric character in a position controlled by said position-defining means, in response to sensing a numeric character in said medium;
  means operable to control said position-defining means selectively according to said discrete value when said bi-stable element is in said first state, and
  means jointly responsive to said first signal when said numeric character is sensed, and to said first state of said bi-stable element, for operating said second signal means and for disabling said normally-enabled storing means, whereby said storing and recording of said numeric character is prevented, and said position-defining means is selectively controlled according to said discrete value of said numeric character.

16. In an externally-programmed computer system wherein the program comprises a variable-length series of alphanumeric and control characters on a record medium, together with a reader for sensing the characters on the record medium sequentially, and a device for recording alphanumeric characters, the combination of:

a plurality of numeric characters recorded in the medium;
  a storage register having a plurality of storage positions;
  means uniquely defining each of said positions;
  a control character on the medium, indicative of data entry into said storage, said control character preceding said numeric characters;
  a first and a second bi-stable control element;
  means responsive to the sensing of said control character by said reader to set each of said two bi-stable elements in a first one of the two stable states;
  first signal means indicative of a numeric character as a class, operable in response to sensing any of said numeric characters;
  second signal means indicative of a control character as a class, operable in response to sensing of all control characters including said data entry character;
  means for enabling the recording device;
  means for disabling the recording device in response to operation of said second signal means;
  normally-enabled means for storing a numeric character in a position controlled by said position-defining means, in response to sensing a numeric character in said medium;

means jointly responsive to said first signal when a first one of said numeric characters is sensed, and to said first state of said first bi-stable element, for operating said second signal means and for disabling said normally-enabled storing means, thereby preventing said storing and recording of said first numeric character;

a cyclic source of clock pulses, including a pulse marking a major point in the cycle;

means for setting said first bi-stable element to its second state, responsive jointly to said first signal means when a first one of said numeric characters is sensed, to the first state of said second bi-stable element, and to said marking pulse; and means re-enabling said normally-enabled storing means in response to said second state of said first bi-stable element, whereby upon sensing of further ones of said plurality of numeric characters, each said further numeric character will be stored in said storage register at a position controlled by said position-defining means and each said character will be recorded by said recording device.

17. A computer as defined in claim 15 wherein each said numeric character has an individual value and said means uniquely defining said positions of said register is a counter, and further including means responsive to the sensing of said numeric character for setting said counter to a count related to said value of said first numeric character.

18. A computer as defined in claim 17, wherein said counter comprises four toggles arranged to form a counter and said means for setting said counter comprises:

a source of clock pulses;

a converter for changing the numeric characted sensed by the reader into binary-coded decimal form, said decoder having four output lines weighted according to said coded form;

a plurality of gates connecting said counter toggles individually to corresponding ones of said four weighted output lines, each said gate being jointly controlled by operation of said first signal means, the first state of said first and second bi-stable control elements, and a clock pulse from said source.

References Cited

UNITED STATES PATENTS

| | | | |
|---|---|---|---|
| 3,250,367 | 5/1966 | Lubkin | 197—19 |
| 3,277,448 | 10/1966 | Borrelli et al. | 340—172.5 |

MAYNARD R. WILBUR, Primary Examiner

T. J. SLOYAN, Assistant Examiner

U.S. Cl. X.R.

340—172.5

UNITED STATES PATENT OFFICE
CERTIFICATE OF CORRECTION

Patent No. 3,522,416      Dated   August 4, 1970

Inventor(s)   Winsor Soule, Jr., et al.

It is certified that error appears in the above-identified patent and that said Letters Patent are hereby corrected as shown below:

Column 11, line 57, insert a comma after "trol)". Column 17, line 72, "signal" should read -- sign --. Column 18, line 23, "DB CT SkL" should read -- DB CT SkL --; Column 22, line 6, "211" should read -- 311 --. Column 28, line 66, '"0.1 Credit,"' should read -- ".01 Credit," --. Column 34, line 25, "identifications" should read -- designation codes --. Column 36, line 59, "the ("9")" should read -- (the "9") --. Column 38, line 61, "substantially" should read -- subsequently --. Column 41, line 41, claim 6, after "one" insert -- state --.

Signed and sealed this 13th day of April 1971.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,522,416 - Dated August 4, 1970

Inventor(s) Winsor Soule, Jr., et al.

It is certified that error appears in the above-identified patent and that said Letters Patent are hereby corrected as shown below:

Column 11, line 57, insert a comma after "trol)"; Column 17, line 72, "signal" should read -- sign --. Column 18, line 23, "DB CT SkL" should read -- DB CT SkL --. Column 22, line 6, "211" should read -- 311 --. Column 28, line 66, '"0.1 Credit,"' should read -- ".01 Credit," --. Column 34, line 25, "identifications" should read -- designation codes --. Column 36, line 59, "the ("9")" should read -- (the "9") --. Column 41, line 41, claim 6, after "one" insert -- state --. Column 38, line 61, "substantially" should read -- subsequently --.

Signed and sealed this 17th day of August 1971.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,522,416          Dated August 4, 1970

Inventor(s) Winsor Soule, Jr., et al.

It is certified that error appears in the above-identified patent and that said Letters Patent are hereby corrected as shown below:

Column 32, lines 5 and 6, cancel "an And gate output of"; line 7, after "from" insert -- an And gate output of --. Column 34, line 24, cancel "and the item designation codes".

Signed and sealed this 7th day of December 1971.

(SEAL)
Attest:

EDWARD M. FLETCHER, JR.          ROBERT GOTTSCHALK
Attesting Officer                 Acting Commissioner of Patents